(12) United States Patent
Li et al.

(10) Patent No.: US 11,013,036 B2
(45) Date of Patent: May 18, 2021

(54) METHOD AND APPARATUS ON ENHANCEMENTS OF NR RANDOM ACCESS FOR UNLICENSED OPERATIONS

(71) Applicant: Samsung Electronics Co., Ltd., Suwon-si (KR)

(72) Inventors: Yingzhe Li, Mountain View, CA (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/417,327

(22) Filed: May 20, 2019

(65) Prior Publication Data

US 2019/0387546 A1    Dec. 19, 2019

Related U.S. Application Data

(60) Provisional application No. 62/684,945, filed on Jun. 14, 2018, provisional application No. 62/718,718, (Continued)

(51) Int. Cl.
*H04W 74/08* (2009.01)
*H04L 27/26* (2006.01)
*H04W 72/04* (2009.01)

(52) U.S. Cl.
CPC ..... *H04W 74/0833* (2013.01); *H04L 27/2607* (2013.01); *H04W 72/042* (2013.01)

(58) Field of Classification Search
CPC ............. H04L 27/0006; H04L 27/2607; H04L 27/2613; H04L 5/0048; H04W 74/0808; H04W 74/0833; H04W 72/042
See application file for complete search history.

(56) References Cited

U.S. PATENT DOCUMENTS

2015/0057011 A1* 2/2015 Di Girolamo .... H04W 74/0808
455/454
2017/0332410 A1* 11/2017 Babaei ................ H04B 17/318
(Continued)

FOREIGN PATENT DOCUMENTS

CN      106993335 A      7/2017
EP        3407662 A1 * 11/2018   ........ H04W 74/085
(Continued)

OTHER PUBLICATIONS

Park et al., "Radio Link Failure Detection", Jun. 16, 2017, U.S. Appl. No. 62/520,943, Total Pages: 63 (Year: 2017).*
(Continued)

*Primary Examiner* — Un C Cho
*Assistant Examiner* — Shah M Rahman

(57) ABSTRACT

A method of a user equipment (UE) in a wireless communication network is provided. The method comprises determining a set of time and frequency domain resources to transmit a physical random access channel (PRACH) preamble over a PRACH, determining a format of the PRACH preamble, wherein the PRACH preamble includes one or more repeated preambles based on a sequence and a cyclic prefix (CP) preceding repeated preamble sequences for the one or more repeated preambles, determining a set of time and frequency domain resources to perform a listen-before-talk (LBT) operation in an unlicensed spectrum, determining whether to transmit the PRACH preamble associated with the LBT operation in the unlicensed spectrum, and transmitting, to a base station (BS), the PRACH preamble in the unlicensed spectrum based on a result of the determination of the LBT operation to transmit PRACH preamble.

18 Claims, 24 Drawing Sheets

Related U.S. Application Data filed on Aug. 14, 2018, provisional application No. 62/796,898, filed on Jan. 25, 2019, provisional application No. 62/828,165, filed on Apr. 2, 2019, provisional application No. 62/836,399, filed on Apr. 19, 2019.

(56) References Cited

U.S. PATENT DOCUMENTS

| | | | |
|---|---|---|---|
| 2018/0199332 A1* | 7/2018 | Islam | H04W 72/0413 |
| 2018/0368205 A1* | 12/2018 | Park | H04W 16/28 |
| 2019/0037601 A1* | 1/2019 | Noh | H04L 1/1812 |
| 2019/0132871 A1* | 5/2019 | Suzuki | H04W 72/14 |
| 2019/0141752 A1* | 5/2019 | Kim | H04B 7/0617 |
| 2019/0149380 A1* | 5/2019 | Babaei | H04L 27/2602 370/330 |
| 2019/0191459 A1* | 6/2019 | Kim | H04W 74/0808 |
| 2019/0261407 A1* | 8/2019 | Irukulapati | H04W 74/008 |
| 2019/0320467 A1* | 10/2019 | Freda | H04W 74/0833 |
| 2019/0327766 A1* | 10/2019 | Zhang | H04L 27/0014 |
| 2019/0363843 A1* | 11/2019 | Gordaychik | H04L 1/0013 |
| 2019/0387550 A1* | 12/2019 | Pan | H04L 5/0094 |
| 2019/0394805 A1* | 12/2019 | Kim | H04W 56/00 |
| 2020/0045735 A1* | 2/2020 | Kim | H04W 16/28 |
| 2020/0288503 A1* | 9/2020 | Sahlin | H04W 72/04 |
| 2020/0359426 A1* | 11/2020 | Pan | H04W 52/36 |
| 2020/0383147 A1* | 12/2020 | Yoon | H04W 74/0808 |

FOREIGN PATENT DOCUMENTS

| | | | |
|---|---|---|---|
| WO | 2017188763 A1 | 11/2017 | |
| WO | WO-2019104545 A1 * | 6/2019 | H04W 72/1268 |

OTHER PUBLICATIONS

Park et al., "Grant Free Resource", Jun. 20, 2017, U.S. Appl. No. 62/522,263, Total Pages: 68 (Year: 2017).*

Huawei et al., "R2-1812657 Four-step RACH procedure for NR-U", Aug. 20-24, 2018, 3GPP TSG-RAN WG2 Meeting #103 R2-1812657, Gothenburg, Sweden, Aug. 20-24, 2018, Total Pages: 3 (Year: 2018).*

ZTE, "Considerations on RAR window size for NR-U", Nov. 12-16, 2018, 3GPP TSG RAN WG2 NR #104 Meeting, Spokane, US, Nov. 12-16, 2018, Total Pages: 2 (Year: 2018).*

ISA/KR, International Search Report and Written Opinion of the International Searching Authority, International Application No. PCT/KR2019/007237, dated Oct. 17, 2019, 10 pages.

Qualcomm Incorporated, "Initial access and mobility procedures for NR unlicensed," R1-1807390, 3GPP TSG RAN WG1 Meeting #93, Busan, Korea, May 21-25, 2018, 4 pages.

Qualcomm Incorporated, "Potential phy procedure designs for NR unlicensed," R1-1804831, 3GPP TSG RAN NG1 Meeting #92bis, Sanya, China, Apr. 16-20, 2018, 9 pages.

ZTE et al., "Considerations on channel access procedure for NR-U," R2-1804349, 3GPP TSG RAN WG2 Meeting #101bis, Sanya, China, Apr. 16-20, 2018, 4 pages.

"3rd Generation Partnership Project; Technical Specification Group Radio Access Network; NR; Physical channels and modulation (Release 15)", 3GPP TS 38.211 V15.4.0, Dec. 2018, 96 pages.

"3rd Generation Partnership Project; Technical Specification Group Radio Access Network; NR; Multiplexing and channel coding (Release 15)", 3GPP TS 38.212 V15.4.0, Dec. 2018, 100 pages.

"3rd Generation Partnership Project; Technical Specification Group Radio Access Network; NR; Physical layer procedures for control (Release 15)" 3GPP TS 38.213 V15.4.0, Dec. 2018, 104 pages.

"3rd Generation Partnership Project; Technical Specification Group Radio Access Network; NR; Physical layer procedures for data (Release 15)", 3GPP TS 38.214 V15.4.0, Dec. 2018, 102 pages.

"3rd Generation Partnership Project; Technical Specification Group Radio Access Network; NR; Radio Resource control (RRC) protocol specification (Release 15)", 3GPP TS 38.331 V15.4.0, Dec. 2018, 474 pages.

"3rd Generation Partnership Project; Technical Specification Group Radio Access Network; Study on NR-based access to unlicensed spectrum (Release 16)", 3GPP TR 38.889 V16.0.0, Dec. 2018, 119 pages.

"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 87 pages.

IEEE Std 802.11-2016, "Part 11: Wireless LAN Medium Access Control (MAC) and Physical Layer (PHY) Specifications", 2016, 3534 pages.

ETSI EN 301 893 V2.1.1, "5 GHz RLAN; Harmonised Standard covering the essential requirements of article 3.2 of Directive 2014/53/EU", 2017, 135 pages.

ETSI EN 302 567 V2.1.1, "Multiple-Gigabit/s radio equipment operating in the 60 GHz band; Harmonised Standard ,covering the essential requirements of article 3.2 of Directive 2014/53/EU", 2017, 40 pages.

* cited by examiner

METHOD AND APPARATUS ON ENHANCEMENTS OF NR RANDOM ACCESS FOR UNLICENSED OPERATIONS

CROSS-REFERENCE TO RELATED APPLICATIONS AND CLAIM OF PRIORITY

The present application claims priority to:
U.S. Provisional Patent Application Ser. No. 62/684,945, filed on Jun. 14, 2018;
U.S. Provisional Patent Application Ser. No. 62/718,718, filed on Aug. 14, 2018;
U.S. Provisional Patent Application Ser. No. 62/796,898, filed on Jan. 25, 2019;
U.S. Provisional Patent Application Ser. No. 62/828,165, filed on Apr. 2, 2019; and
U.S. Provisional Patent Application Ser. No. 62/836,399, filed on Apr. 19, 2019.

The content of the above-identified patent documents is incorporated herein by reference.

TECHNICAL FIELD

The present disclosure relates generally to wireless communication systems and, more specifically, to NR random access operation for unlicensed spectrum.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide an NR random access for unlicensed spectrum.

In one embodiment, a user equipment (UE) in a wireless communication network is provided. The UE comprises a processor configured to determine a set of time and frequency domain resources to transmit a physical random access channel (PRACH) preamble over a PRACH, determine a format of the PRACH preamble, wherein the PRACH preamble includes one or more repeated preambles based on a sequence and a cyclic prefix (CP) preceding repeated preamble sequences for the one or more repeated preambles, determine a set of time and frequency domain resources to perform a listen-before-talk (LBT) operation in an unlicensed spectrum, and determine whether to transmit the PRACH preamble associated with the LBT operation in the unlicensed spectrum. The UE further comprises a transceiver operably connected to the processor, the transceiver configured to transmit, to a base station (BS), the PRACH preamble in the unlicensed spectrum based on a result of the determination of the LBT operation to transmit the PRACH preamble.

In another embodiment, a base station (BS) in a wireless communication network is provided. The BS comprises a transceiver configured to receive, from a user equipment (UE), a physical random access channel (PRACH) preamble in an unlicensed spectrum based on a listen-before-talk (LBT) operation. A set of time and frequency domain resources is determined, by the UE, for the PRACH preamble over a PRACH. A format of the PRACH preamble that is determined by the UE includes one or more repeated preambles based on a sequence and a cyclic prefix (CP) preceding repeated preamble sequences for the one or more repeated preambles. A set of time and frequency domain resources is determined, by the UE, to perform the LBT operation in the unlicensed spectrum.

In yet another embodiment, a method of a user equipment (UE) in a wireless communication network is provided. The method comprises determining a set of time and frequency domain resources to transmit a physical random access channel (PRACH) preamble over a PRACH, determining a format of the PRACH preamble, wherein the PRACH preamble includes one or more repeated preambles based on a sequence and a cyclic prefix (CP) preceding repeated preamble sequences for the one or more repeated preambles, determining a set of time and frequency domain resources to perform a listen-before-talk (LBT) operation in an unlicensed spectrum, determining whether to transmit the PRACH preamble associated with the LBT operation in the unlicensed spectrum, and transmitting, to a base station (BS), the PRACH preamble in the unlicensed spectrum based on a result of the determination of the LBT operation to transmit PRACH preamble.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
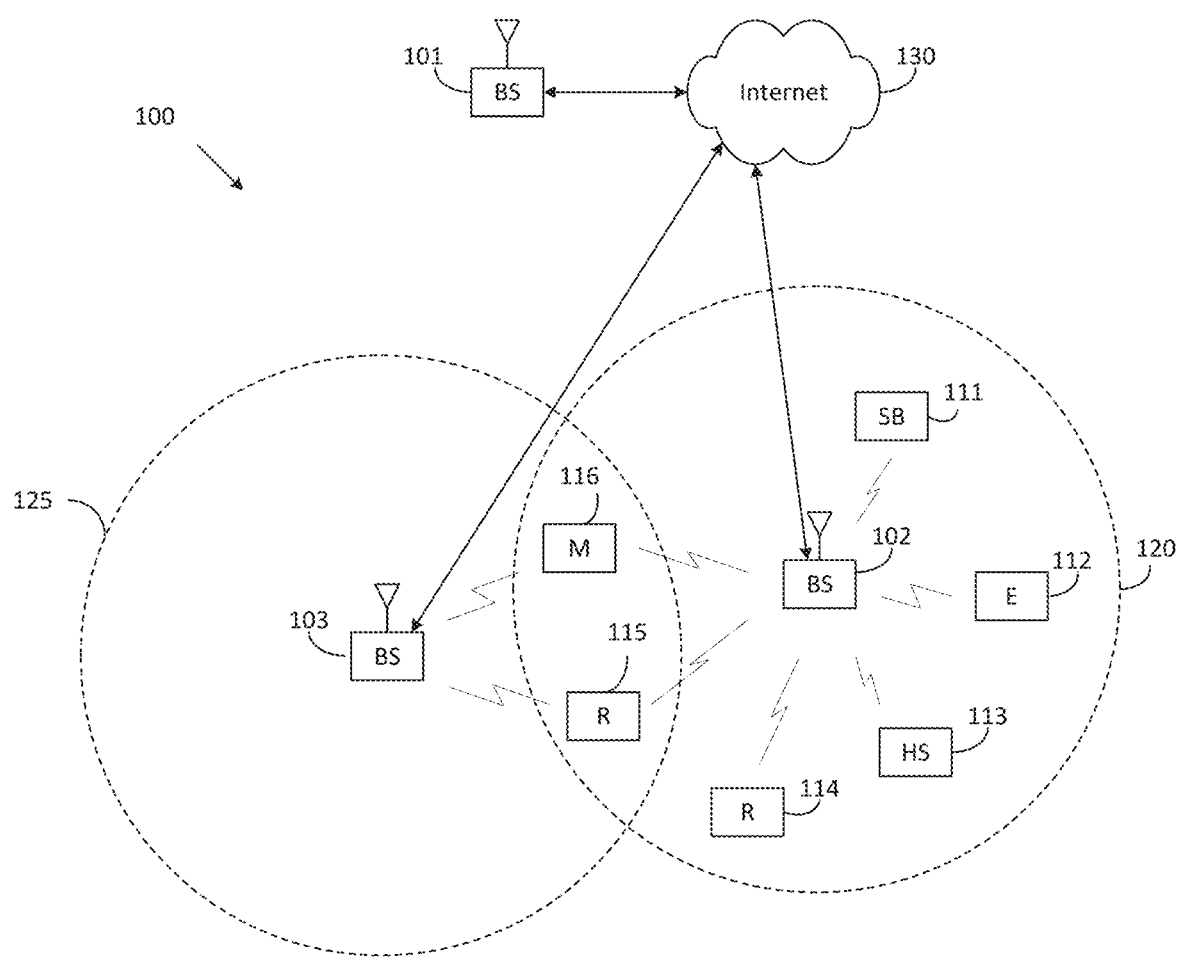
FIG. 1 illustrates an example wireless network according to embodiments of the present disclosure.

FIG. 1 through FIG. 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 38.211 v15.4.0, "NR, Physical channels and modulation;" 3GPP TS 38.212 v15.4.0, "NR, Multiplexing and Channel coding;" 3GPP TS 38.213 v15.4.0, "NR, Physical Layer Procedures for Control;" 3GPP TS 38.214 v15.4.0, "NR, Physical Layer Procedures for Data;" 3GPP TS 38.331 v15.4.0, "NR, Radio Resource Control (RRC) Protocol Specification;" ETSI EN 301 893 V2.1.1, "5 GHz RLAN; Harmonised Standard covering the essential requirements of article 3.2 of Directive 2014/53/EU," 2017; ETSI EN 302 567 V2.1.1, "Multiple-Gigabit/s radio equipment operating in the 60 GHz band; Harmonised Standard covering the essential requirements of article 3.2 of Directive 2014/53/EU," 2017; 3GPP TR 36.889 V13.0.0, "Study on Licensed-Assisted Access to Unlicensed Spectrum," 2015; 3GPP TR 38.889 V16.0.0, "Study on NR-based Access to Unlicensed Spectrum," 2018; and IEEE Std. 802.11-2016, "Part 11: Wireless LAN Medium Access Control (MAC) and Physical Layer (PHY) Specifications", 2016.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
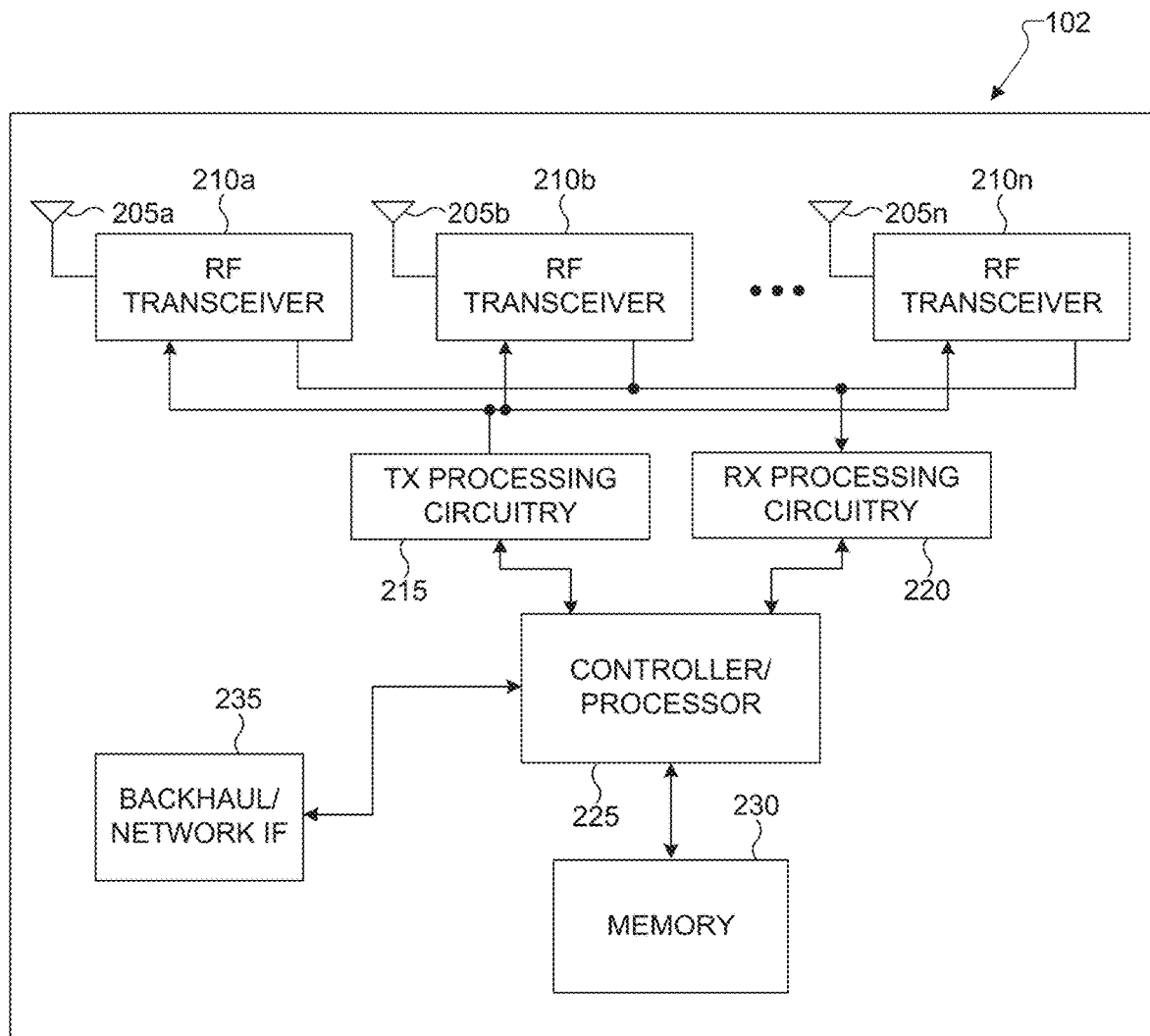
FIG. 2 illustrates an example gNB according to embodiments of the present disclosure.
Figure 3:
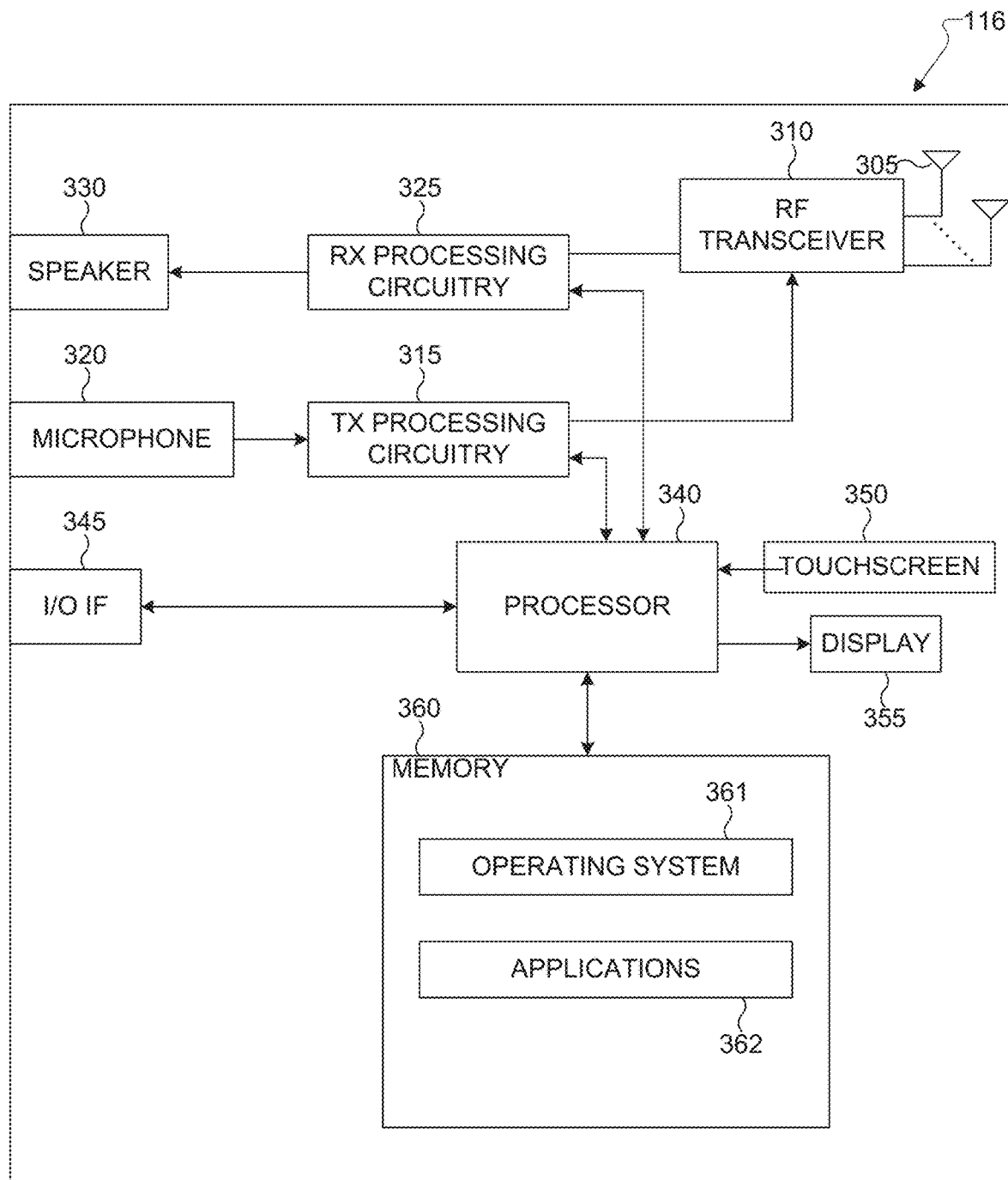
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (a gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient NR random access for unlicensed spectrum. In certain embodiments, and one or more of the gNBs 101-103 includes circuitry, programming, or a combination thereof, for efficient NR random access for unlicensed spectrum.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting the PSS and SSS over downlink channels.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of generating a primary synchronization signal (PSS) including one of multiple PSS sequences that is generated based on a binary phase shift keying (BPSK) modulated length-127 M-sequence in a frequency domain, wherein the PSS includes part of cell identification (ID) information.

In some embodiments, the controller/processor 225 is capable of generating a secondary synchronization signal (SSS) including one of multiple SSS sequences that is generated based on multiple BPSK modulated length-127 M-sequences in the frequency domain, wherein the SSS includes the cell identification (ID) information.

In some embodiments, the controller/processor 225 is capable of determining a number of PSS sequences corresponding to a number of cell ID hypotheses carried by PSS, respectively and a number of SSS sequences corresponding to the number of cell ID hypotheses carried by the PSS and SSS, respectively.

In some embodiments, the controller/processor 225 is capable of determining a polynomial for an M-sequence generating the PSS sequence and a cyclic shift for the M-sequence based on the cell ID information carried by PSS, and generating the PSS sequence by performing the cyclic shift to the M-sequence for a cell ID.

In some embodiments, the controller/processor 225 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)] \mod 2$, $0 \le i \le 119$, the polynomial for the first M-sequence is given by $x^7+x^4+1$ and a corresponding recursive construction scheme is given by $d_M(i+7)=[d_M(i+4)+d_M(i)] \mod 2$, $0 \le i \le 119$, and the polynomial for the second M-sequence is given by $x^7+x+1$ and a corresponding recursive construction scheme is given by $d_M(i+7)=[d_M(i+1)+d_M(i)] \mod 2$, $0 \le i \le 119$.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving a primary synchronization signal (PSS) and a secondary synchronization signal (SSS) over downlink channels.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining the PSS including one of multiple PSS sequences that is generated based on a binary phase shift keying (BPSK) modulated length-127 M-sequence in a frequency domain, wherein the PSS includes part of cell identification (ID) information and the SSS including one of multiple SSS sequences that is generated based on multiple BPSK modulated length-127 M-sequences in the frequency domain, wherein the SSS includes the cell identification (ID) information.

In some embodiments, the processor 340 is capable of determining a number of PSS sequences corresponding to a number of cell ID hypotheses carried by PSS, respectively; and a number of SSS sequences corresponding to the number of cell ID hypotheses carried by the PSS and SSS, respectively.

In some embodiments, the processor 340 is capable of determining a polynomial for an M-sequence generating the PSS sequence, a cyclic shift for the M-sequence based on the cell ID information carried by PSS, and generating the PSS sequence by performing the cyclic shift to the M-sequence for a cell ID.

In some embodiments, the processor 340 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)]\mod 2$, $0 \le i \le 119$, the polynomial for the first M-sequence is given by $x^7+x^4+1$ and a corresponding recursive construction scheme is given by $d_M(i+7)=[d_M(i+4)+d_M(i)]\mod 2$, $0 \le i \le 119$, and the polynomial for the second M-sequence is given by $x^7+x+1$ and a corresponding recursive construction scheme is given by $d_M(i+7)=[d_M(i+1)+d_M(i)]\mod 2$, $0 \le i \le 119$.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
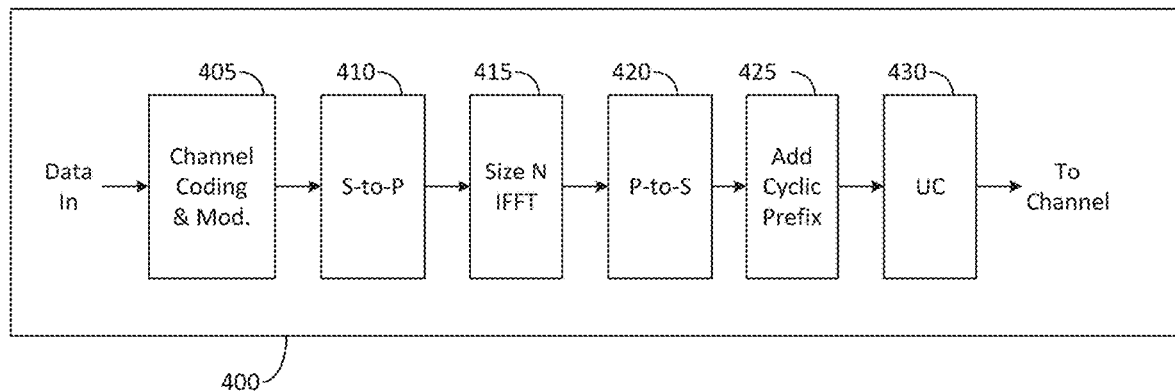
FIG. 4A illustrates a high-level diagram of an orthogonal frequency division multiple access transmit path according to embodiments of the present disclosure.
Figure 4B:
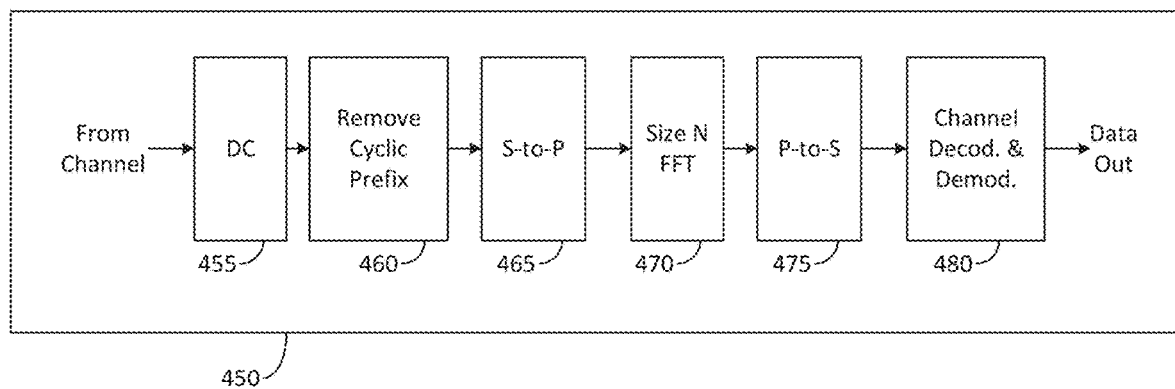
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred to as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different Ms that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$ where $N_{SRS}=1$ if a last subframe symbol is used to transmit SRS and $N_{SRS}=0$ otherwise.

Figure 5:
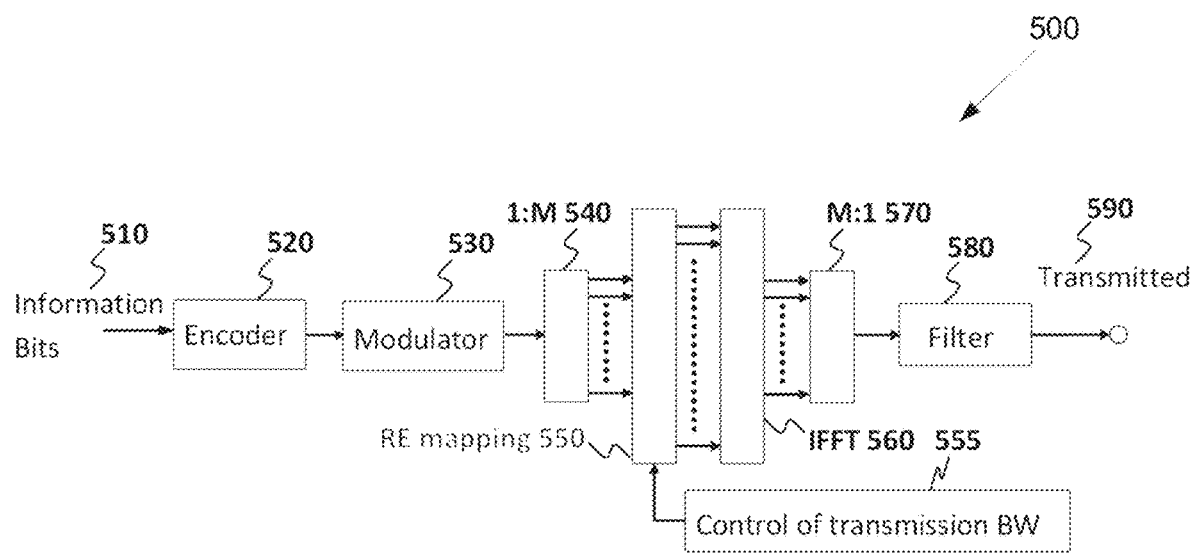
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
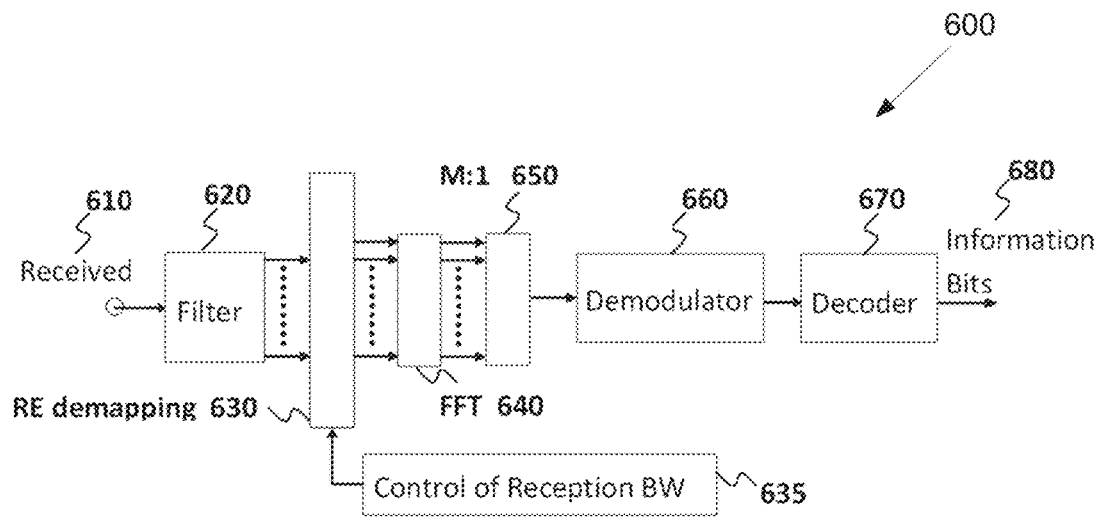
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
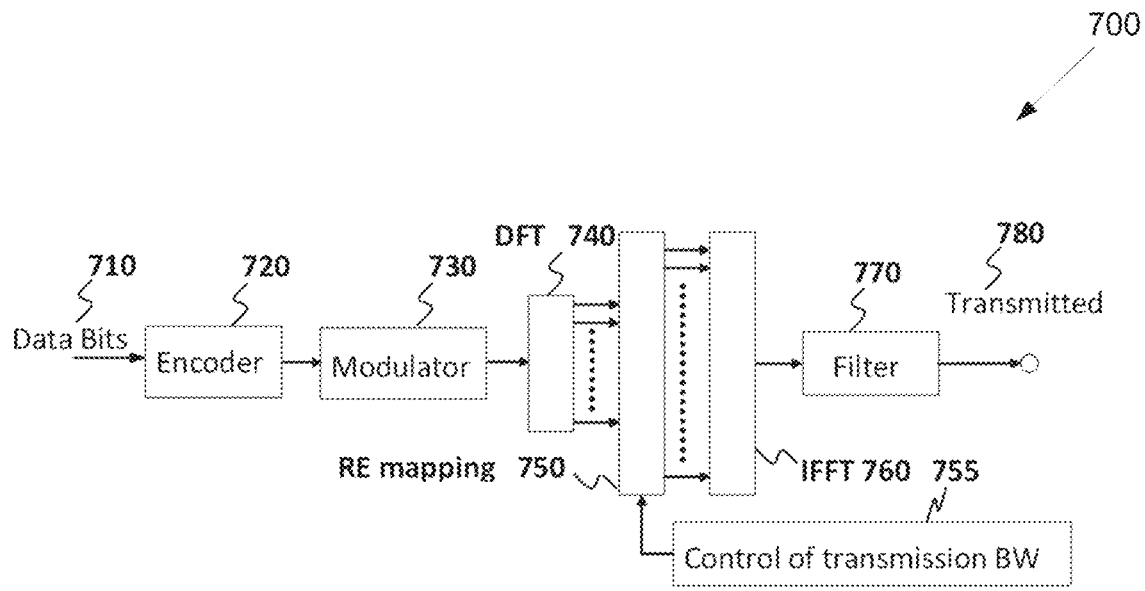
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
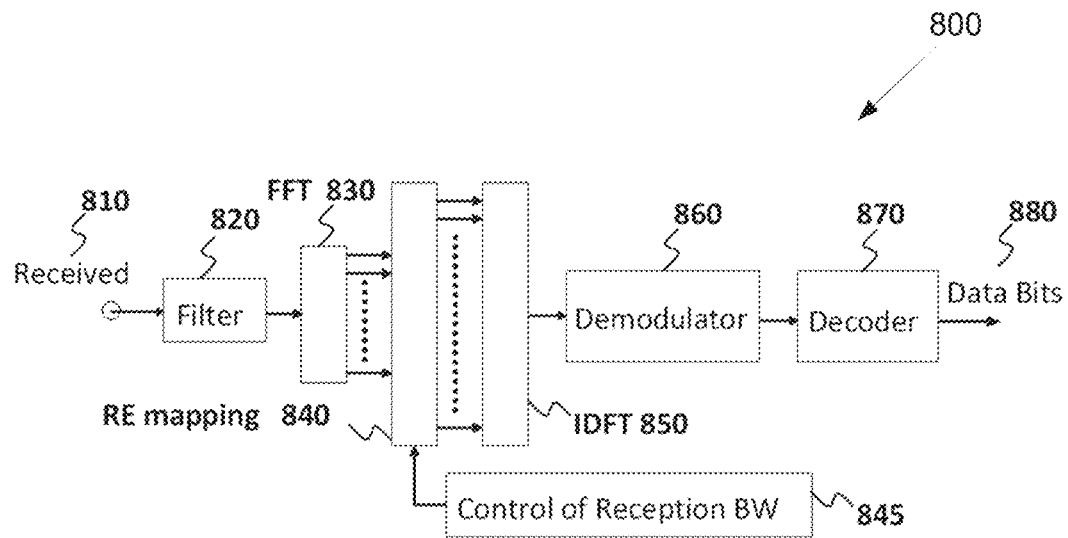
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
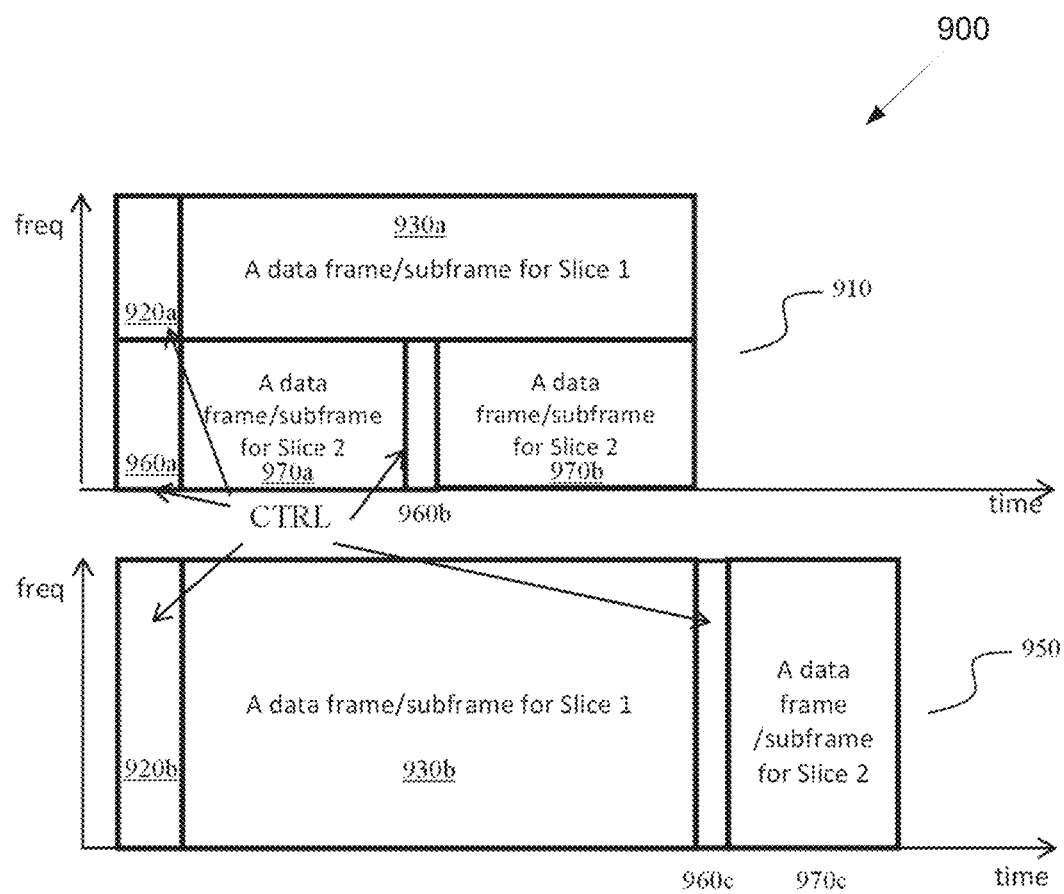
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
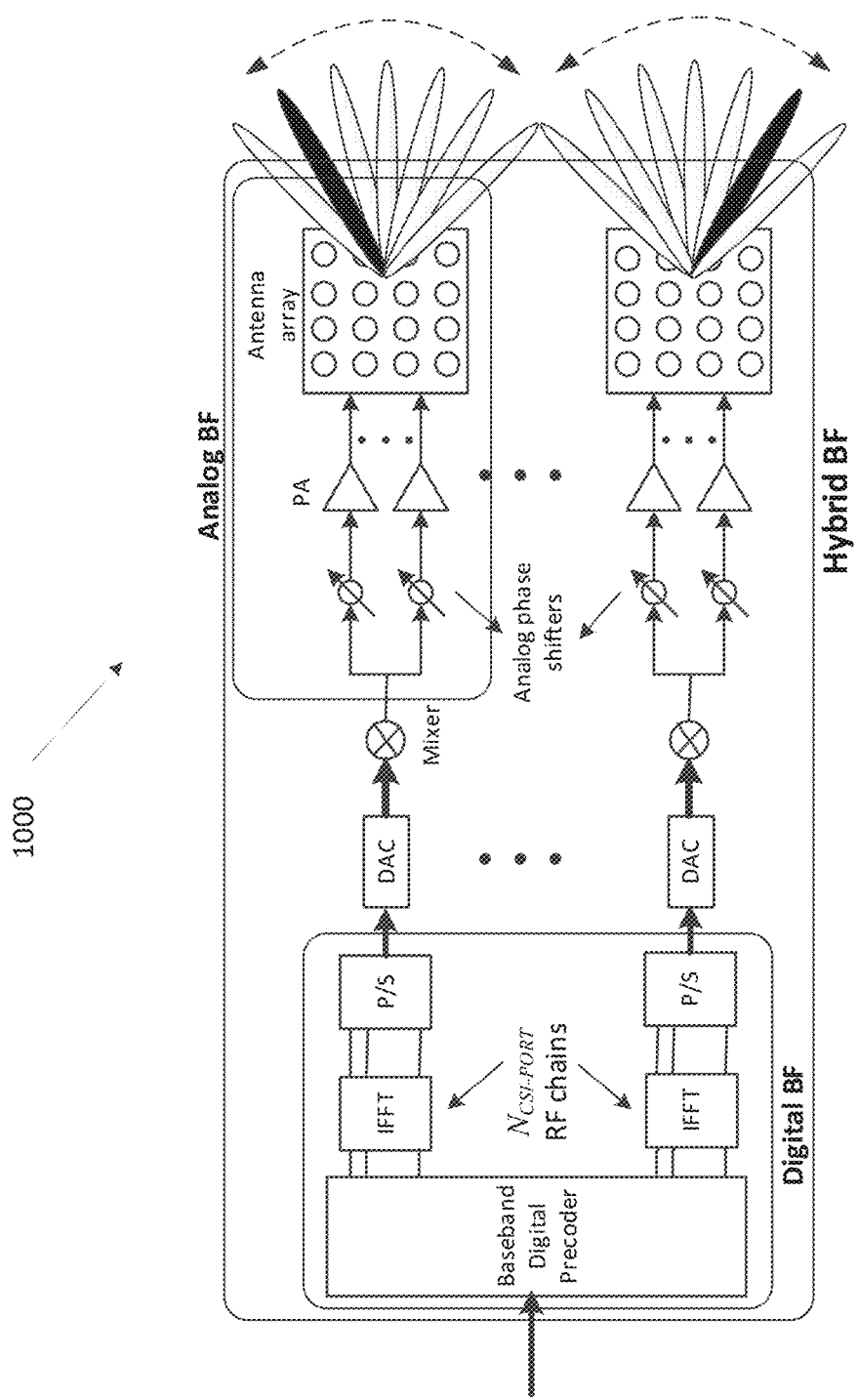
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
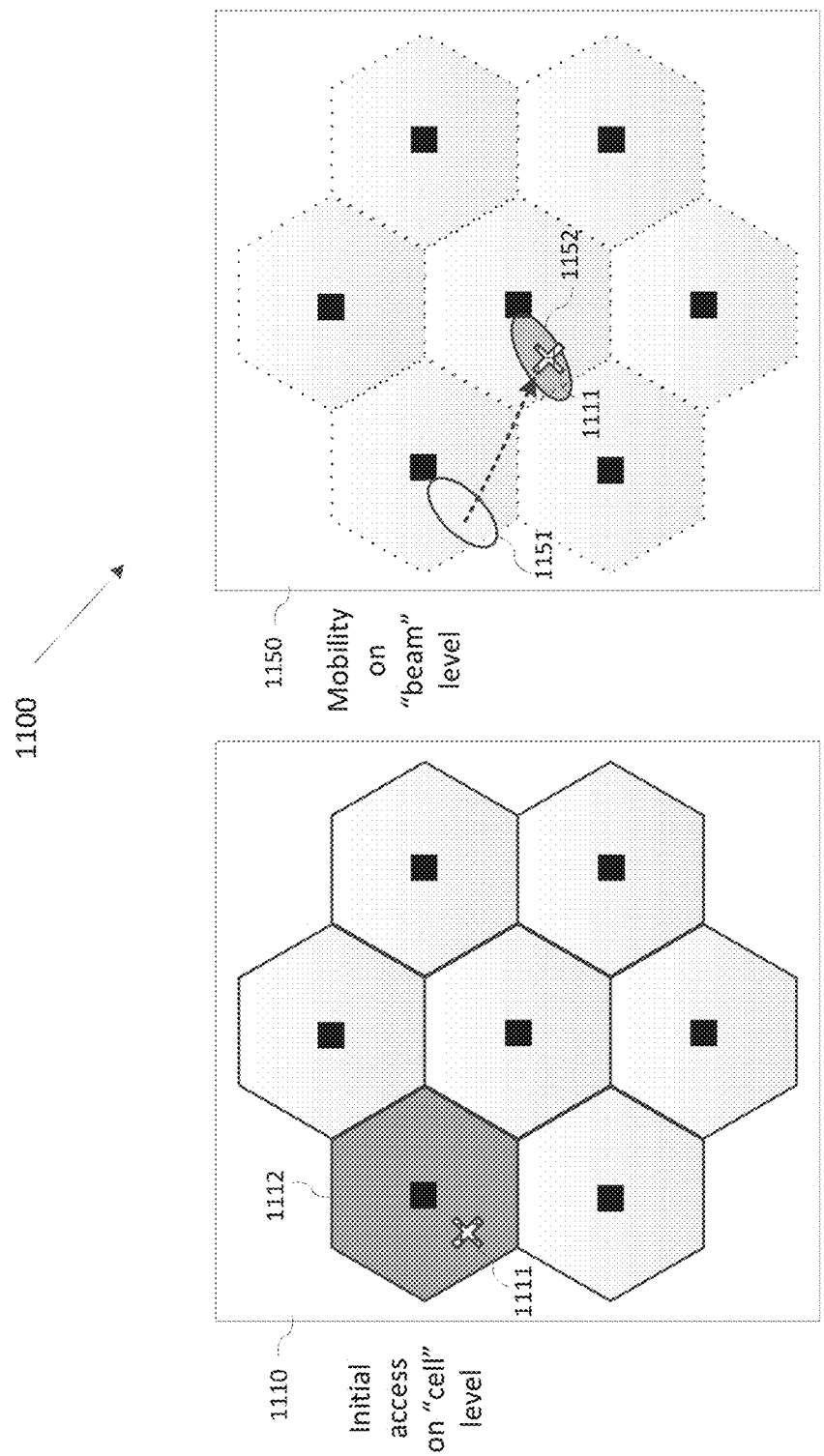
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

Figure 12:
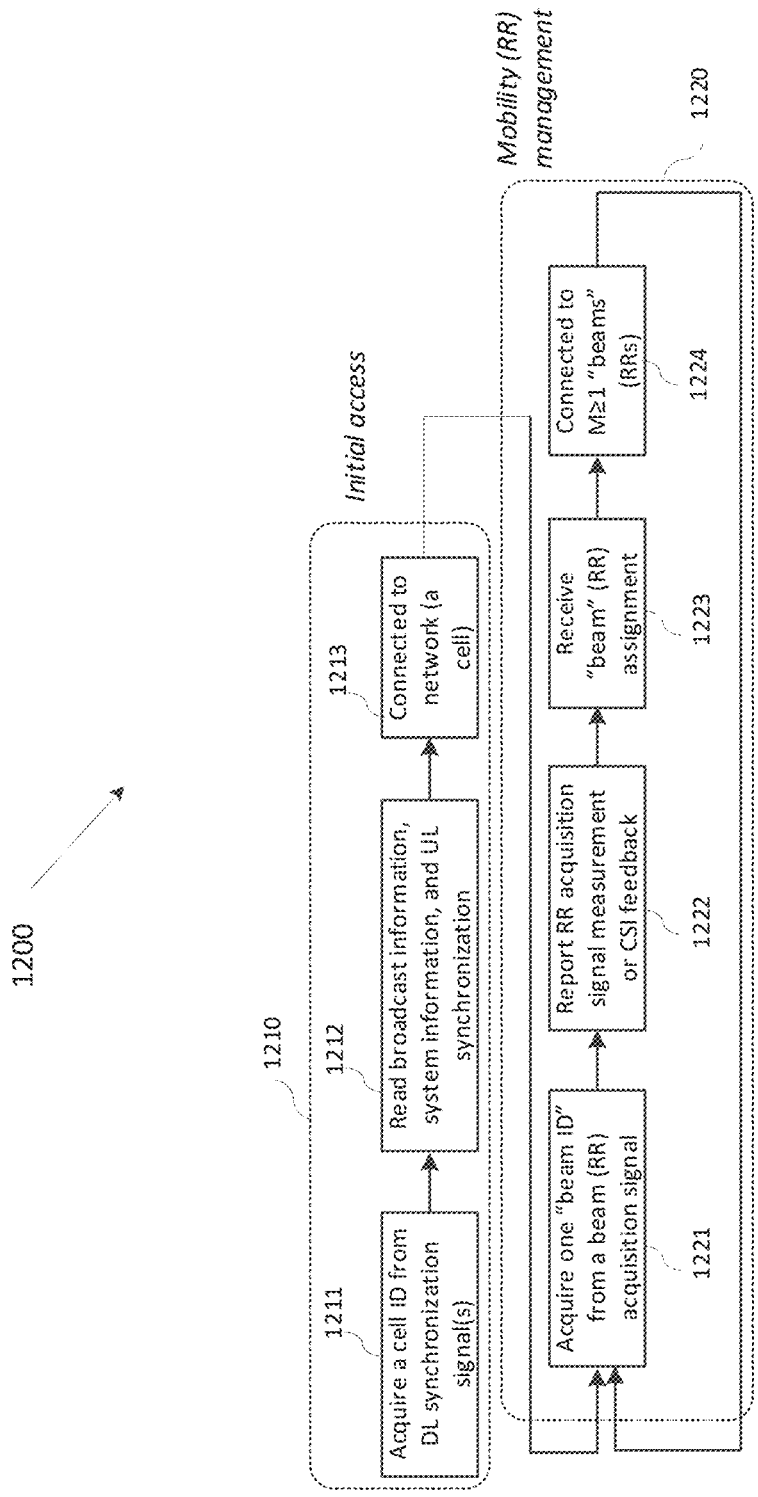
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure). Once the UE completes 1211 and 1212, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report the RS power to the TRP (or network). Second, the UE can measure each of the K CSI-RS resources, calculate an associated CSI (which can include CQI and potentially other CSI parameters such as RI and PMI), and report the CSI to the TRP (or network). Based on the report from the UE, the UE is assigned M≥1 "beams" or RRs either via a higher-layer (RRC) signaling or an L1/L2 control signaling 1223. Therefore the UE is connected to these M "beams"/RRs.

For certain scenarios such as asynchronous networks, the UE can fall back to cell ID based or cell-level mobility management similar to 3GPP LTE system. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping (as shown in FIG. 12) or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

Therefore, considering the above new challenges in initial access procedure and RRM for the new radio access technology (NR), there is a need for designing synchronization signals (along with their associated UE procedures) and primary broadcast channel which carries broadcast information (e.g., master information block or MIB).

In the present disclosure, numerology refers to a set of signal parameters which can include subframe duration, sub-carrier spacing, cyclic prefix length, transmission bandwidth, or any combination of these signal parameters.

After a UE detects a synchronization signal and decodes the broadcasted system information, the UE may initiate the random access process by transmitting a physical random access channel (PRACH) preamble in uplink, based on the PRACH configuration that would indicate at which resources that the UE is allowed to transmit a PRACH preamble as well as the PRACH preamble type.

In NR, an association exists between one or multiple SS/PBCH blocks and a subset of RACH occasions (ROs). A UE can select the subset of RACH resources through the UE's downlink measurement and this association. Contention-based random access (CBRA) in NR is based on a 4-step procedure, where the UE first transmits a physical random access channel (PRACH) preamble (Msg1) to a gNB through selected RACH resources: the gNB replies with the random access response (RAR) in Msg2; then the UE transmits a Msg3 in the uplink and the gNB transmits the Msg4 in the downlink.

Figures 13, 14:
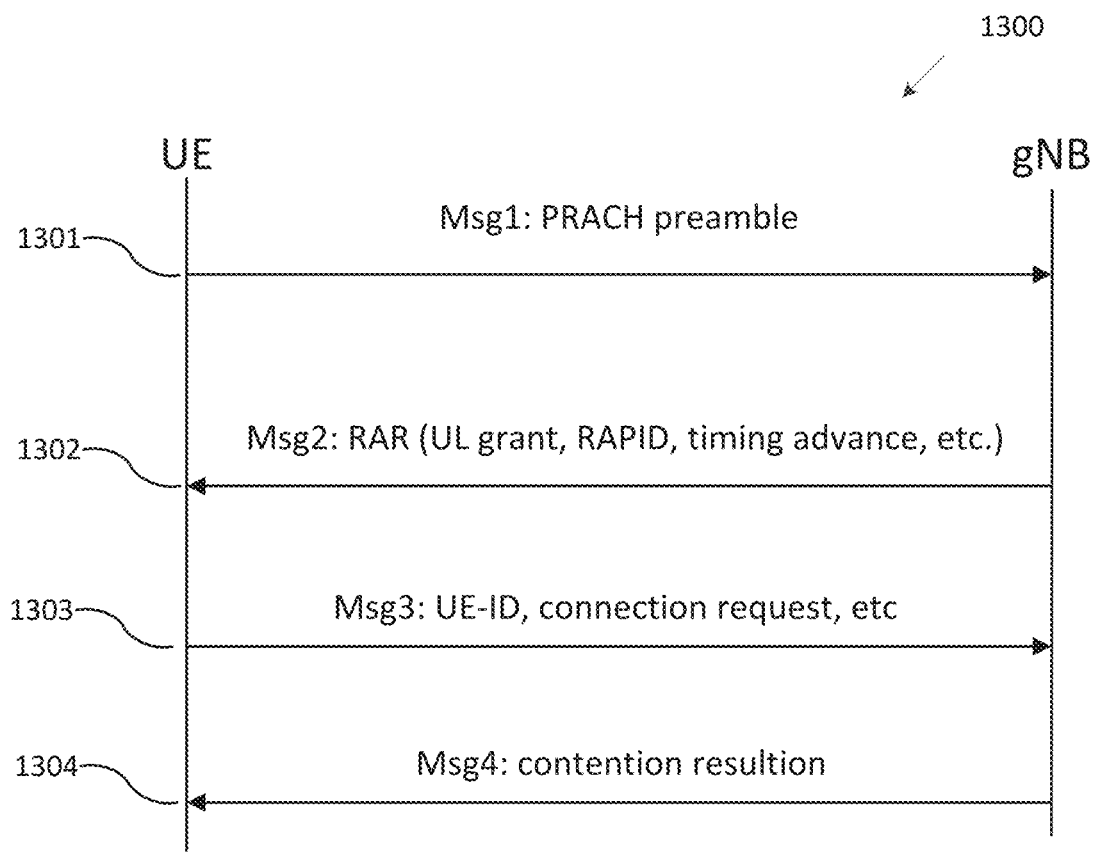
FIG. 13 illustrates an example general procedure for the 4-step RA according to embodiments of the present disclosure.
FIG. 14 illustrates an example general structure of the short preamble format according to embodiments of the present disclosure.

Such random access procedure is supported for both IDLE mode and CONNECTED mode UEs. A general procedure for the 4-step RA is shown in FIG. 13. A contention-free random access (CFRA) is also supported for NR, such as for the purpose of handover and DL data arrival, wherein dedicated preamble is assigned to the UE and no contention resolution (i.e., Msg4) is needed.

FIG. 13 illustrates an example general procedure for the 4-step RA 1300 according to embodiments of the present disclosure. The embodiment of the general procedure for the 4-step RA 1300 illustrated in FIG. 13 is for illustration only. FIG. 13 does not limit the scope of this disclosure to any particular implementation.

An NR supports PRACH preambles with either long sequence length of L=839 symbols and subcarrier spacing (SCS) of 1.25 KHz or 5 KHz, or short sequence length of L=139 symbols with SCS of 15, 30, 60, or 120 kHz. In particular, for the short preamble sequence, the NR supports transmission of multiple/repeated preamble sequences to enhance the coverage or supports a gNB receiver beam-sweeping, and also CP/GP are required.

FIG. 14 illustrates an example general structure of the short preamble format 1400 according to embodiments of the present disclosure. The embodiment of the general structure of the short preamble format 1400 illustrated in FIG. 14 is for illustration only. FIG. 14 does not limit the scope of this disclosure to any particular implementation.

FIG. 14 illustrates the general structure of the short preamble format, and the detailed supported preamble formats with short sequence length for 15 KHz subcarrier spacing in NR are shown in TABLE 1. In TABLE 1, unit is Ts where Ts=1/30.72 MHz, and PRACH preambles are aligned with OFDM symbol boundary for data with same numerology. For format A, GP can be defined within the last RACH preamble among consecutively transmitted RACH preambles. For other SCS values (e.g., 30, 60, and 120 kHz), preamble formats can be defined similar to TABLE 1 by scaling Ts according to SCS.

TABLE 1

| Preamble format | | | | |
|---|---|---|---|---|
| Preamble format | #of sequence | TCP | TSEQ | TGP |
| A1 | 2 | 288 | 4096 | 0 |
| A2 | 4 | 576 | 8192 | 0 |
| A3 | 6 | 864 | 12288 | 0 |
| B1 | 2 | 192 | 4096 | 96 |
| B2 | 4 | 360 | 8192 | 216 |
| B3 | 6 | 504 | 12288 | 360 |
| B4 | 12 | 936 | 24576 | 792 |

TABLE 1-continued

| Preamble format | | | | |
|---|---|---|---|---|
| Preamble format | #of sequence | TCP | TSEQ | TGP |
| C0 | 1 | 1240 | 2048 | 1096 |
| C2 | 4 | 2048 | 8192 | 2912 |

In order to operate NR in unlicensed spectrum, unlicensed spectrum regulations across different unlicensed bands and different regions need to be satisfied, such as the listen-before-talk (LBT), occupied channel bandwidth (OCB) regulation, and power spectral density (PSD) regulation.

For example, the ETSI regulation in the 5 GHz unlicensed band and 60 GHz requires that LBT is required before the channel access is granted. Given the requirement of LBT, each message of the NR-U random access procedure is not guaranteed to have channel access at the pre-defined and/or scheduled time and frequency resource, thereby potentially increasing the overall random access delay. In addition, extra resource overhead may also be incurred for NR-U random access procedure due to the LBT requirement.

As a result, the present disclosure is focused on the enhancements of NR 4-step random access procedure for NR-U, which include the enhancements of PRACH configuration and supported PRACH formats, enhancements of PRACH waveform, enhancement to increase NR-U PRACH transmission opportunities, enhancements to the association of SSBs and RACH occasions, and enhancements to Msg2/Msg3/Msg4. Note the enhancements in the present disclosure can be applied to both the CBRA and CFRA (if applicable) procedures of NR-U.

The present disclosure includes several embodiments, principles, approaches and examples that can be used in conjunction or in combination with one another, or can operate as standalone. The embodiments/principles/approaches/examples in this disclosure can be applied to FBE-based NR-U, LBE-based NR-U, or both FBE-based and LBE-based NR-U.

In the rest of this disclosure, FR1 NR-U refers to NR-U that operates in the unlicensed/shared bands in FR1, such as the 5 GHz unlicensed bands or the 6 GHz unlicensed/shared bands; and FR2 GHz NR-U refers to NR-U that operators in the unlicensed/shared bands in FR2, such as the 60 GHz unlicensed bands.

Component 1: Listen-Before-Talk for NR-U PRACH.

The LBT regulation in unlicensed band requires a UE and a gNB to perform LBT before each transmission. Specifically, LBT can be performed before the transmission of PRACH is granted. One design consideration is the LBT procedure for NR-U PRACH transmission.

In one embodiment, LBT for PRACH can be a single-shot LBT of fixed time duration. In one sub-embodiment, the LBT duration can be of PCF inter-frame space (PIFS) duration of the coexisting Wi-Fi system. For instance, the PIFS duration can be 25 μs for FR1 NR-U system, and/or 8 μs for FR2 NR-U system.

In another sub-embodiment, the single-shot LBT can be utilized for transmitting PRACH, if the corresponding RACH occasion is within the channel occupancy time (COT) obtained by a gNB, such as through CAT-4 LBT.

In another sub-embodiment, the single-shot LBT can be utilized for transmitting PRACH, if the corresponding RACH occasion is within the channel occupancy time (COT) obtained by a gNB-initiated CAT-4 LBT, and that the gap between end of last DL transmission and expected start of RACH occasion is larger than short inter-frame space (SIFS) duration and shorter than PCF inter-frame space (PIFS) duration. For example, the SIFS and PIFS duration can be 16 μs and 25 μs respectively for FR1 NR-U.

In another sub-embodiment, the single-shot LBT can be supported for transmitting PRACH, irrespective of if the PRACH occasion is inside or outside a gNB-initiated COT. In the rest of this disclosure, the single-shot LBT is also referred to as the Category 2 (CAT-2) LBT.

In another embodiment, LBT for PRACH can follow the Category 4 (CAT-4) LBT of LTE-LAA, which is LBT with random back-off with a contention window size (CWS) of variable size.

In one sub-embodiment, the CAT-4 LBT for NR-U PRACH can have higher priority class or equivalently lower priority class value, such as LBT priority class 1 with a minimum CWS of 3 and maximum CWS of 7.

In another sub-embodiment, the CWS adaptation rule for PRACH transmission depends on the design of remaining random access procedures. In one example, if a UE fails to receive RAR and that RAR transmission is also subject to LBT, the CWS for PRACH does not need to increase. In another example, if a UE fails to receive RAR within the RAR monitoring window, the UE can increase the CWS for PRACH re-transmission. In another example, if a UE detects RAR corresponding to the transmitted PRACH, but the contention resolution message (i.e., Msg4) indicates a gNB did not correctly detect PRACH (e.g., due to collision), then the UE increases CWS for PRACH re-transmission.

In another example, if a UE detects the RAR corresponding to the transmitted PRACH, the CWS for future PRACH transmission can re-set to minimum. In another example, if the UE successfully completes the 4-step RA procedure, the CWS for PRACH is re-set to minimum for future PRACH transmissions.

In another sub-embodiment, the CAT-4 LBT for PRACH LBT can follow the CAT-4 LBT with the lowest priority class value, such that the CAT-4 LBT for PRACH can have higher channel access chance.

In another sub-embodiment, the CAT-4 LBT for PRACH LBT can introduce a new CAT-4 LBT channel access priority class, wherein only one contention window size is supported, and therefore CWS adjust is not needed. In one example, the CW size can be one of {3, 7, 15, 63, 127, 255, 511, 1023}. In another example, the new CAT-4 LBT priority class value can be 0.

In another sub-embodiment, the CAT-4 LBT can be considered as failed if it has not been completed with certain duration after it stared. For example, the duration can be defined in the units of NR-U slots for millisecond.

In another embodiment, LBT for PRACH can follow the Category 3 (CAT-3) LBT of LTE-LAA, which is LBT with random back-off with a fixed CWS.

In one sub-embodiment, the CWS can be chosen from one of {3, 7, 15, 31, 63, 127, 255, 511, 1023}.

In another sub-embodiment, the CWS can be one of pre-defined by the spec, configured by DCI, or configured by higher layer parameter (e.g., RRC configured).

In another sub-embodiment, the CAT-3 LBT can be treated as a special case of CAT-4 LBT, and vice versa, when the corresponding LBT priority class of the CAT-4 LBT has the same minimum and maximum contention window size.

In another sub-embodiment, the CAT-3 LBT can be considered as failed if it has not been completed with certain duration after it stared.

The LBT procedures defined above can be utilized to grant transmissions other than PRACH as well, such as Msg2/Msg3/Msg4 during the RA procedure.

The configuration for the PRACH LBT procedure, including at least one of the type of LBT and/or the corresponding parameters of each type of LBT (e.g., at least including one of the energy detection threshold, and/or LBT priority class for CAT-4 LBT (if specified/configured), and/or CWS and/or MCOT for CAT-3 LBT), can be configured through one or multiple of the following embodiments, and it is possible that part of the configurations are using different embodiments.

In one embodiment, the PRACH LBT configuration or part of the configuration can be indicated by higher layer parameters, such as through the SystemInformationBlock-Type1 (SIB1) or SIBs other than SIB1 from the RRC layer.

In another embodiment, the PRACH LBT configuration or part of the configuration can be indicated by layer 1 signaling. In one example, PRACH LBT configuration can be indicated through PBCH. In another example, PRACH LBT configuration can be indicated through DCI for PDCCH triggered PRACH.

In another embodiment, PRACH LBT configuration or part of the configuration can be indicated in the PRACH configuration table. In one example, this can be applied to the scenario with single-shot LBT.

In yet another embodiment, PRACH LBT configuration or part of the configuration can be fixed by the specification.

In yet another embodiment, PRACH LBT configuration or part of the configuration can be up to UE's implementation.

The spatial RX parameter for LBT operation of PRACH can be as follows.

In one embodiment, the spatial RX parameter for LBT operation of PRACH can be omni-directional.

In another embodiment, the spatial RX parameter for LBT operation of PRACH can be quasi-omni-directional.

In another embodiment, the spatial RX parameter for LBT operation of PRACH can be directional. In one sub-embodiment, the spatial RX parameter can correspond to the intended spatial TX filter for PRACH transmission.

In another embodiment, the directionality of the spatial RX parameter for PRACH LBT can be different at different unlicensed band, such as omni-directional for FR1 NR-U, and quasi-omni-directional or directional for FR2 NR-U.

In another embodiment, the directionality of the spatial RX parameter for PRACH LBT can be determined by UE implementation.

Another design consideration is regarding frequency domain bandwidth over which NR-U PRACH LBT is performed on each unlicensed carrier wherein the PRACH occasion(s) is assigned to the UE, wherein the frequency domain bandwidth refers to the frequency unit for the UE to perform LBT in granting the transmission of assigned PRACH occasion(s).

In one embodiment, the NR-U PRACH LBT can be performed over the initial UL bandwidth part (BWP) for each UE.

In one sub-embodiment, the initial active UL BWP can be of 20 MHz.

In another sub-embodiment, for connected UEs (i.e., non-initial access UEs), this embodiment can be extended to any active UL bandwidth wherein the UE is assigned with PRACH occasion(s). In one example of this embodiment, when a UE is assigned PRACH occasions on multiple UL BWPs (e.g., a connected UE is assigned PRACH occasions on multiple active UL BWPs, or an initial access UE is assigned PRACH occasions on multiple initial active BWPs), the UE can perform multiple LBT operations over each UL BWP in parallel.

In another embodiment, the NR-U PRACH LBT can be performed over the entire UL system bandwidth.

In another embodiment, NR-U PRACH LBT can be performed over the nominal channel bandwidth of the unlicensed band, which may be defined in Component 3.

In one sub-embodiment, for FR1 NR-U, the nominal channel bandwidth can be 20 MHz.

In another sub-embodiment, if a UE is assigned with PRACH occasions that are located on different nominal channel bandwidths of the unlicensed bands, the UE can perform multiple LBT processes in parallel, with each LBT process being performed over the nominal channel bandwidth wherein the UE is assigned with PRACH occasion(s). In one example of embodiment, for a FR1 NR-U, if the current active UL BWP is 40 MHz that includes two nominal channel bandwidths each with 20 MHz BW; then the UE can perform 2 LBT processes over each 20 MHz nominal channel bandwidth in parallel within the UL BWP, if the UE is assigned PRACH occasion(s) on every nominal channel bandwidth.

In yet another embodiment, NR-U PRACH LBT can be performed over the frequency resource over which the PRACH may be transmitted within the UL BWP.

In one sub-embodiment, when the PRACH is allocated with continuous frequency-domain resource, this embodiment indicates that the LBT is performed over the continuous frequency range of the PRACH, which can thus increase the multiplexing capacity of PRACH.

In another sub-embodiment, when the PRACH is allocated with non-continuous frequency-domain resource such as interlaced structure, this embodiment indicates the PRACH LBT is performed over the frequency range of the non-continuous frequency-domain resource for PRACH.

In yet another embodiment, when the UE is assigned PRACH occasion(s) on multiple unlicensed carriers or cells, the frequency domain bandwidth over which NR-U PRACH LBT is performed on each of the carriers or cells can follow one of the embodiments on the frequency domain bandwidth over which NR-U PRACH LBT is performed on each carrier or cell wherein the PRACH occasion(s) is assigned to the UE.

In one sub-embodiment, the frequency domain bandwidth over which NR-U PRACH LBT is performed on different unlicensed carriers can only use the same embodiment on the frequency domain bandwidth over which NR-U PRACH LBT is performed on each unlicensed carrier wherein the PRACH occasion(s) is assigned.

In another sub-embodiment, the frequency domain bandwidth over which NR-U PRACH LBT is performed on different unlicensed carriers can use different embodiments on the frequency domain bandwidth over which NR-U PRACH LBT is performed on each unlicensed carrier wherein the PRACH occasion(s) is assigned.

Component 2: Enhancements to PRACH Configuration for NR-U.

In NR, the PRACH preamble can only be transmitted in the time resources given by the higher-layer parameter PRACHConfigurationIndex, based on which the RACH occasions can be derived from the PRACH configuration table. In particular, the RO(s) within a RACH slot are allocated consecutively in NR. Given the LBT is required before PRACH transmission, extra time-domain resource overhead may potentially be incurred. As a result, another important design consideration is how to incorporate the effect of time-domain overhead for performing LBT on the available time-domain RACH occasions within RACH slot(s). The enhancements in this component can be combined with other enhancements in this disclosure, e.g., the enhancement to the PRACH waveform for NR-U as detailed in Component 3.

In one embodiment, RACH occasions within the same RACH slot(s) are consecutively allocated without any time-domain gap in between neighboring time-domain RACH occasions similar to NR, and LBT is performed by the UE before the RACH occasion(s) associated with the UE.

In one sub-embodiment, after the LBT for PRACH is successful, the RACH occasion(s) (potentially multiple ROs consecutively in time-domain) which are allocated to the UE within the MCOT corresponding to the successful LBT can be utilized for PRACH transmission; otherwise if the LBT fails in granting the PRACH transmission(s) in current available RACH occasion(s), the UE re-attempts to transmit PRACH in next available RACH occasion(s) assigned to the UE.

In one example of the sub-embodiment, if a UE is allocated multiple ROs consecutively in time-domain, a single LBT operation can be performed before the first RO, and the ROs associated to the UE within the MCOT corresponding to this LBT operation can be utilized after this LBT is successful. The single LBT operation can be one of the single-shot/CAT-2 LBT, CAT-4 LBT, or CAT-3 LBT.

In another example, if a UE is allocated multiple ROs consecutively in time-domain, a single LBT operation can be performed before each RO, and the RO can be utilized if the corresponding LBT is successful.

In another sub-embodiment, a subset of PRACH configuration indexes from the existing NR PRACH configuration can be reused to support this option, and the time-domain RACH occasions can be allocated according to the PRACH configuration table, similar to NR.

In another sub-embodiment, this embodiment can be applied to scenarios when enhancements to waveform and/or resource allocation of NR-U PRACH are adopted, such as when the UE PRACH is allocated with multiple ROs consecutively in time-domain, which may be detailed in Component 3 and Component 4.

In another sub-embodiment, the time-domain position for UE to perform PRACH LBT depends on the LBT type, which can be chosen such that the expected ending position of PRACH LBT can be aligned at the symbol preceding the RACH occasion allocated to the UE.

In one example, if PRACH LBT is single-shot/CAT-2 LBT with deterministic duration, LBT can be performed in the N symbols preceding the RACH occasion, wherein N=ceil(single-shot LBT duration/PRACH symbol duration). With 25 μs single-shot LBT, N=1, 1, 2 respectively for PRACH SCS of 15 kHz, 30 kHz and 60 kHz respectively; and with 8 us single-shot LBT, N=1, 1, 2 respectively for PRACH SCS of 60 kHz, 120 kHz and 240 kHz respectively.

In another example, if PRACH LBT is CAT-4 LBT or CAT-3 LBT with a given CWS W, LBT can be performed in the N symbols preceding the RACH occasion, wherein N=ceil(expected LBT duration with CWS W/PRACH symbol duration), and the expected LBT duration with CWS W can be the duration assuming each step of back-off is successful, or the duration assuming each step of back-off is successful plus certain guard duration D to incorporate potential LBT failure during the procedure.

In another embodiment, neighboring RACH occasions within the same PRACH slot(s) can be non-consecutive, with a gap duration introduced between two neighboring ROs, wherein the gap can be utilized as least for incorporating the LBT resource overhead for transmitting PRACH in the RO that comes after this gap.

In one sub-embodiment, the gap duration between neighboring ROs depends on the PRACH LBT type, which can be chosen such that it is not less than the expected PRACH LBT duration.

In one example, if PRACH LBT is single-shot/CAT-2 LBT with deterministic duration, the gap can be (at least) N symbols wherein N=ceil(single-shot LBT duration/PRACH symbol duration).

In another example, if PRACH LBT is CAT-4 LBT or CAT-3 LBT with a given CWS W, the gap duration can be (at least) N symbols, wherein N=ceil(expected LBT duration with CWS W/PRACH symbol duration), and the expected LBT duration with CWS W can be the duration assuming each step of LBT procedure is successful, or the duration assuming each step of LBT is successful plus certain guard duration D to incorporate potential LBT failure during the procedure.

In another example, the gap duration between neighboring ROs within the same RACH slot(s) can be of fixed duration, wherein the fixed gap duration can be utilized as a defer duration.

In one sub-example, this example can be utilized when a CAT-4 LBT is used in transmitting PRACH. For instance, the fixed gap duration can be utilized such that the UE attempting CAT-4 LBT can continue the CAT-4 LBT process (e.g., pass the eCCA defer period), if the CAT-4 LBT process has been blocked due to a neighboring UE PRACH transmission that utilizes an earlier RO.

In another sub-example, for FR1 NR-U, the fixed gap duration can be 34 μs plus a non-negative duration, where the 34 μs incorporates the eCCA defer period and the additional duration intends for the UE to continue reducing the backoff counter. For instance, with 15 kHz SCS, the fixed gap duration can be 1 OFDM symbol. In another instance, with 30 kHz SCS, the fixed gap duration can be 1 OFDM symbol or 2 OFDM symbols.

In another sub-embodiment, according to the configuration of the gap duration, the PRACH configuration table can be enhanced from NR to explicitly indicate the gap durations and the available RACH occasions within RACH slot(s).

In one example, the PRACH configuration table from NR can be enhanced by adding a column on the number of LBT symbols for each RO, e.g., "number of symbols for LBT." In addition, the PRACH configuration table column "number of time-domain PRACH occasions within a RACH slot" can be re-defined to incorporate the LBT overhead; while the "starting symbol" can be interpreted as either the first symbol for LBT of first RO within the RACH slot, or first symbol for the RO within the RACH slot.

Figure 15:
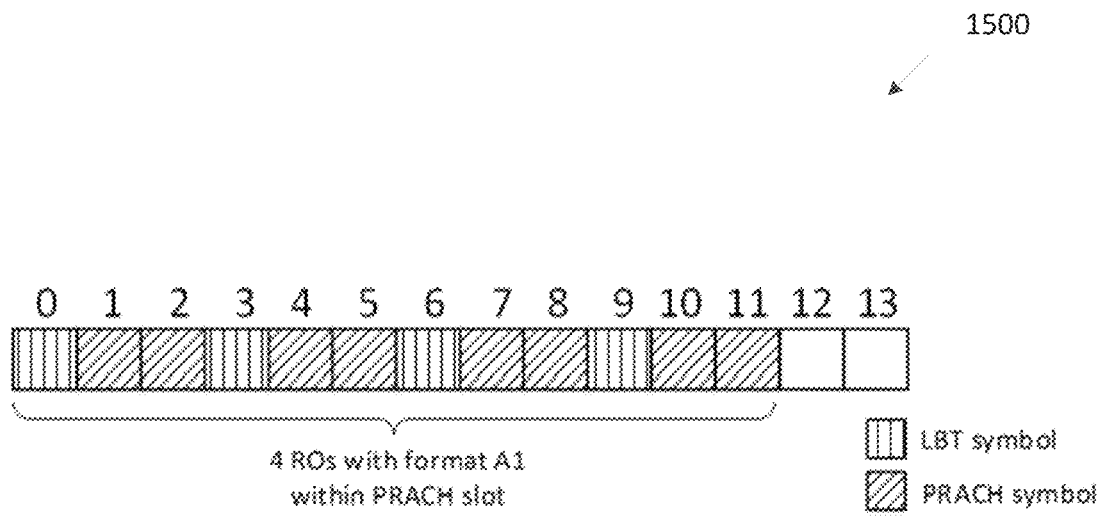
FIG. 15 illustrates an example available RO within the RACH slot according to embodiments of the present disclosure.

FIG. 15 illustrates an example available RO within the RACH slot 1500 according to embodiments of the present disclosure. The embodiment of the available RO within the RACH slot 1500 illustrated in FIG. 15 is for illustration only. FIG. 15 does not limit the scope of this disclosure to any particular implementation.

In one specific example, if a PRACH configuration table indicates: number of symbols for LBT=1; number of time-domain PRACH occasions within a RACH slot=4; starting symbol=0; and preamble format=A1; then the available ROs within the RACH slot can be shown in FIG. 15.

In another sub-embodiment, the PRACH configuration table can be reused from NR, while the RACH occasions can be implicitly inferred by re-interpreting the entries of the PRACH configuration table, based on the configured gap/LBT duration.

In one example, the gap/LBT duration can be indicated by higher layer parameters (e.g., through PRACH LBT type defined by RRC layer).

In another example, the available ROs within the RACH slot can be determined based on the number of symbols for gap/LBT and the "starting symbol," which can be interpreted as either the first symbol for LBT of first RO within the RACH slot, or first symbol for the RO within the RACH slot.

In a specific instance, if higher layer indicates number of symbols for LBT=1; and PRACH configuration table indicates starting symbol=0 and preamble format=A1; then the available ROs within the RACH slot can be shown in FIG. 15, which can be independent of the number of time-domain PRACH occasions within a RACH slot entry.

In another example, for the NR PRACH configurations wherein multiple time-domain RACH occasions are configured within a PRACH slot, a subset of the configured PRACH occasions can be reserved for LBT operations, while the remaining configured PRACH occasions can be utilized for PRACH transmission if the corresponding LBT operation is successful.

In yet another embodiment, time domain location(s) to transmit PRACH can be confined within a RACH occasion window (ROW), such that depending on the PRACH LBT ending position, the time domain location(s) to transmit the PRACH can be flexible within the ROW.

In one sub-embodiment, this embodiment can be applied to when PRACH LBT is CAT-4 or CAT-3, such that the duration of LBT is non-deterministic as opposed to single-shot LBT.

In one example, if the CAT-4 LBT or CAT-3 LBT is not completed within the ROW, the LBT for this ROW can be considered as failed; and the UE re-initiates LBT in the next available ROW.

In another sub-embodiment, this embodiment can also be applied to when PRACH LBT is single-shot/CAT-2, wherein one or multiple single-shot/CAT-2 LBT attempts can be performed to transmit PRACH at the configured PRACH occasion(s) within the ROW.

In one example of this sub-embodiment, when multiple potential RO positions are configured within the ROW, if the single-shot LBT fails for one potential RO position within the ROW, the UE can still re-attempt the single-shot LBT for remaining potential RO position(s) within the ROW; and if all the single-shot LBT fails for potential RO position(s) within the ROW, the LBT for this ROW can be considered as failed and the UE re-initiates LBT in the next available ROW.

In another example, the UE can attempt single-shot LBT for every potential RO position within the ROW.

In another example, attempting single-shot/CAT-2 LBT for ROs within the ROW can be performed when the ROW is within the MCOT of the gNB.

Another design consideration for ROW is the starting position for a UE LBT attempt in order to transmit PRACH at the configured PRACH occasion(s) within the ROW.

In one sub-embodiment, a UE can start to perform LBT from the beginning of the ROW. In one example of this sub-embodiment, this sub-embodiment indicates that the ROW duration needs to include at least the expected LBT duration.

In another sub-embodiment, a UE can start to perform LBT before the ROW, wherein the UE can align the desired ending position of LBT (e.g., assuming each step of LBT procedure is successful) in certain OFDM symbol (in terms PRACH SCS) with respect to the ROW.

In one example of the sub-embodiment, the desired ending position can be the OFDM symbol before the start of ROW, such that the UE can transmit in the PRACH occasion at the beginning of the ROW.

In another example of this sub-embodiment, the desired ending position can be the first OFDM symbol (in terms of PRACH SCS) within ROW.

In another example of this sub-embodiment, the desired ending position can be the latest OFDM symbol (in terms of PRACH SCS) that comes before the first configured PRACH occasion within ROW.

In another sub-embodiment, the starting position of UE LBT can be in the middle of ROW.

In one example of this sub-embodiment, this sub-embodiment can be used when multiple PRACH occasions are configured within the ROW, the UE can attempt one or multiple LBTs in the middle of the ROW to utilize the configured PRACH occasions.

In another example of this sub-embodiment, the starting position of the UE LBT can be chosen such that a UE can align the desired ending position of LBT (e.g., assuming each step of LBT procedure is successful) in certain OFDM symbol (in terms PRACH SCS) within the ROW, wherein the desired ending position can be the OFDM symbol that comes before the next available configured PRACH occasions within the ROW.

In another example of this sub-embodiment, if there is a recent PRACH transmission within the ROW, and a new LBT operation is needed to utilize remaining configured PRACH occasions within the ROW, then the starting position of next UE LBT may come after the previous PRACH transmission is completed.

In yet another sub-embodiment, the starting position of UE LBT can be at the beginning of the PRACH slot that contains ROW.

Another design consideration is the available time locations for PRACH occasions within the ROW, wherein there can exist one or multiple potential PRACH occasions for PRACH transmissions within the ROW.

In one sub-embodiment, the potential time-domain PRACH locations within the ROW can be pre-allocated, and the earliest pre-allocated PRACH location after PRACH LBT is completed can be utilized for PRACH transmission.

One example of this sub-embodiment is to pre-allocate non-overlapping ROs within the ROW consecutively similar to NR.

This example is easier for a gNB to detect PRACH occasions, but may potentially cause UE to lose channel if gap between LBT and start of PRACH location is too large, e.g., for format with large number of symbols.

In one sub-example, if the PRACH LBT completes before the start of the earliest pre-allocated PRACH location, a UE can transmit reservation signal, or extended cyclic prefix of PRACH, or certain preamble before the start of PRACH, such that it may not lose the channel.

Figure 16:
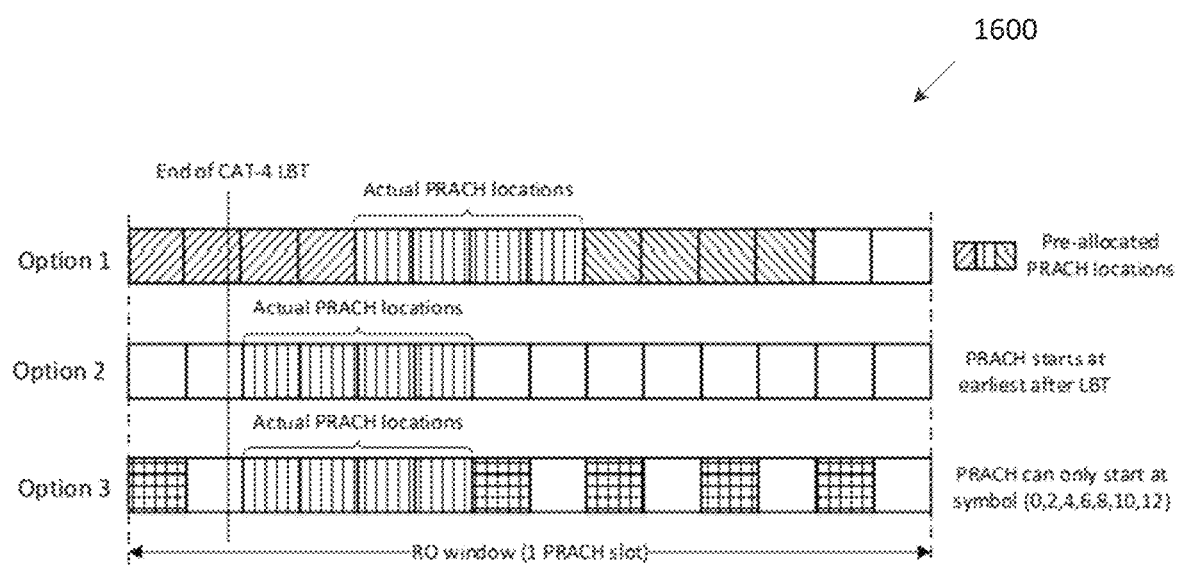
FIG. 16 illustrates an example PRACH location according to embodiments of the present disclosure.

FIG. 16 illustrates an example PRACH location 1600 according to embodiments of the present disclosure. The embodiment of the PRACH location 1600 illustrated in FIG. 16 is for illustration only. FIG. 16 does not limit the scope of this disclosure to any particular implementation. An instance of this sub-embodiment is illustrated in Option 1 of FIG. 16. Another example of this sub-embodiment is to pre-allocate non-overlapping ROs within the ROW, while a gap duration is introduced between neighboring ROs.

In one sub-example, the gap duration can be utilized such that UE can continue the CAT-4 LBT process, if the current CAT-4 LBT process has been interrupted due to PRACH transmission from another UE utilizing the previous RO(s).

In another sub-embodiment, PRACH can start at the earliest symbol after the LBT is completed.

In one example of this sub-embodiment, this can be applied when the PRACH LBT is CAT-4 or CAT-3, such that the LBT completion time instance is non-deterministic within the ROW.

In another example of this sub-embodiment, this can be applied when the PRACH LBT is single-shot/CAT-2 LBT, such that PRACH can be transmitted at the earliest symbol that comes after LBT successful completion time instance.

In another example of this sub-embodiment, the potential time-domain PRACH positions can be treated either as non-deterministic within the ROW, or as every OFDM symbol can be a potential PRACH starting position.

This sub-embodiment is more efficient in terms of channel utilization. But the detection for start of ROs at gNB side can be more complicated since different UEs may start at different position. An instance of this sub-embodiment is illustrated in Option 2 of FIG. 16.

In another sub-embodiment, PRACH can start at given subset of symbols within the ROW, and PRACH can start at the earliest symbol within this subset after LBT is completed. This option has a better trade-off between channel utilization and detection complexity at the gNB side. An instance of this sub-embodiment is illustrated in Option 3 of FIG. 16.

In one example, the subset of possible starting symbols for PRACH within the ROW can be one of pre-defined by spec, configured through DCI, and configured through higher layer parameters. FIG. 16 illustrates example of these three options, wherein the PRACH format occupies 4 symbols, and the LBT is of CAT-4 with variable duration.

In another sub-embodiment, each UE can be allowed to transmit at most 1 PRACH transmissions within the ROW, and the earliest available PRACH occasions after LBT is completed can be used.

In another sub-embodiment, each UE can be allowed to transmit more than 1 PRACH transmissions within the ROW. In one example of the sub-embodiment, the maximum allowed number of PRACH transmission is subject to the ROW duration, duration of the PRACH, and the MCOT corresponding to the PRACH LBT. In another example of the sub-embodiment, allowing multiple PRACH transmissions within the ROW can improve the detection performance at the gNB, given that each PRACH transmission is subject to the PSD limit according to the unlicensed regulation.

Another design consideration is when more than one PRACH transmissions are allowed within the ROW, how a UE transmits PRACH in the remaining of the ROW after a first LBT for PRACH succeeds.

In one sub-embodiment, after a first LBT for PRACH succeeds, a UE can transmit at most one PRACH within the ROW, without performing another PRACH LBT operation.

In one example of the sub-embodiment, after a first LBT for PRACH succeeds, a UE may only utilize the first available configured PRACH occasion, which is chosen according one of the sub-embodiments for available time locations for PRACH occasions within the ROW, to transmit PRACH; while the UE may not transmit PRACH in the remaining ROW without performing an extra LBT operation.

In another example of this sub-embodiment, this sub-embodiment can be applied when single-shot/CAT-2 LBT is used for PRACH transmission, and/or when the UE intends to use different spatial TX parameters in transmitting the PRACH at different PRACH occasions.

In another example of this sub-embodiment, a UE can transmit as many PRACH transmissions as possible after the respective LBT operation for the PRACH transmission is successful, subject to the PRACH transmission is within the.

In another example of this sub-embodiment, a UE can transmit a maximum N (N>1) number of PRACH transmissions after the respective LBT operation for the PRACH transmission is successful, subject to the PRACH transmission is within the ROW.

In another example of this sub-embodiment, the multiple PRACH occasions utilized for PRACH transmissions after the successful LBT can be non-consecutive in time-domain.

In another sub-embodiment, after a first LBT for PRACH succeeds, a UE can transmit multiple PRACH within the ROW, without performing another PRACH LBT operation.

In one example of this sub-embodiment, a UE can transmit as many PRACH transmissions as possible after a successful PRACH LBT operation, subject to the PRACH transmission is within the ROW and is within the MCOT corresponding to the LBT operation, and some other potential constraints. For instance, the potential constraint (if any) can be that same intended spatial TX parameter for the PRACH transmissions is used.

In another example of this sub-embodiment, a UE can transmit a maximum N (N>=1) number of PRACH transmissions after a successful PRACH LBT operation, subject to the PRACH transmission is within the ROW and is within the MCOT corresponding to the LBT operation, and some other potential constraints. For instance, the potential constraint (if any) can be that same intended spatial TX parameter for the PRACH transmissions is used. In another instance, the potential constraint (if any) can be that the total number of PRACH transmissions is up to a limit.

In another example of this sub-embodiment, the multiple PRACH occasions utilized for PRACH transmissions after the successful LBT can be consecutive in time-domain.

In another example of this sub-embodiment, the multiple PRACH occasions utilized for PRACH transmissions after the successful LBT can be non-consecutive in time-domain.

Another design consideration for ROW is the time-domain duration of each ROW.

In one sub-embodiment, ROW duration can be 1 PRACH slot.

In another sub-embodiment, ROW duration can be k1 PRACH slots with k1>1. For example, this sub-embodiment can be applied to preamble formats with higher number of symbols, e.g., format A3/B3/B4/C2.

In another sub-embodiment, the ROW duration can be k2 symbols of PRACH SCS with 1<=k2<14. For example, this sub-embodiment can be applied to preamble formats with smaller number of symbols, e.g., format A1/A2/B1/B2/C0. In another example, k2 can be determined based on the number of ROs within the ROW, and/or the LBT gaps between neighboring ROs, and/or the number of symbols for each RO.

In yet another sub-embodiment, the ROW duration can be k3 symbols of PRACH SCS with k3>14. In one example, k3 can be determined based on the number of ROs within the ROW, and/or the LBT gaps between neighboring ROs, and/or the number of symbols for each RO.

In yet another sub-embodiment, the ROW duration can be fixed to be T milliseconds.

In yet another sub-embodiment, the exact value of the ROW duration (e.g., in terms of number of symbols or slots) can also be chosen according to at least one of the PRACH preamble format, the time-domain configuration of the PRACH occasions within the ROW, and the LBT configuration.

In one example of the sub-embodiment, the ROW duration can be only of the number of OFDM symbols of the corresponding PRACH format. This example can be applied to the scenario that LBT may be performed before ROW and expected to complete before the start of ROW, and this scenario can coincide with the first embodiment of this component in terms of the time-domain resource allocation for RACH occasions.

In another example of the sub-embodiment, the ROW duration can be the number of OFDM symbols of the corresponding PRACH format; plus $M=\text{ceil}(T/\tau)$ number of OFDM symbols, wherein T is the expected duration of the LBT operation (assuming each LBT step is successful) and $\tau$ is the OFDM symbol duration. This example can be applied to the scenario that LBT can be performed from the start of the ROW and is expected to complete before the start of PRACH occasion, and this scenario can coincide with the second embodiment of this component in terms of the time-domain resource allocation for RACH occasions.

In another example of the sub-embodiment, the ROW duration can be P (P>1) times the number of OFDM symbols of the corresponding PRACH format; plus $M=\text{ceil}(T/\tau)$ number of OFDM symbols, wherein T is the expected duration of the LBT operation (assuming each LBT step is successful) and $\tau$ is the OFDM symbol duration. This example can be applied to the scenario that LBT can be performed from the start of the ROW and is expected to complete before the start of the first PRACH occasion, and the UE can utilize a maximum of P consecutive RACH occasions within the ROW after the LBT is completed.

In yet another sub-embodiment, the ROW can be treated as the time-domain unit in allocating the RACH resources for NR-U UE.

In yet another sub-embodiment, the ROW can be start at one of the NR-U slot boundary or NR-U symbol boundary.

Another design consideration is how to configure the ROW, including duration, available PRACH time locations, start of LBT, etc.

In one sub-embodiment, the ROW configuration can be explicitly defined through higher layer parameters, such as through the SystemInformationBlockType1 (SIB1) or SIBs other than SIB1 from the RRC layer.

In another sub-embodiment, the ROW configuration can be indicated through the PRACH configuration table by adding new entries and/or adding new columns to the PRACH configuration table, and/or re-interpreting existing columns in the PRACH configuration table.

For example, start of LBT can be determined from "starting symbol," available PRACH time locations can be inferred from "number of time-domain PRACH occasions within a RACH slot" and "preamble format." ROW duration can be indicated by adding a new column, which for example can be named "number of PRACH slots per ROW" which can be smaller than 1 (e.g., ROW is a few OFDM symbols), equal to 1 (e.g., 1 PRACH slot), or greater than 1 (e.g., greater than 1 PRACH slot); or assumed to be 1 PRACH slot by default.

As a specific example, if "starting symbol=2;" "number of time-domain PRACH occasions within a RACH slot=6," "preamble format=B1," and "number of PRACH slots per ROW=1;" then UE associated with ROW can attempt to start CAT-4 LBT at the beginning of PRACH slot (such that ideally the LBT can end before "starting symbol"); and if the CAT-4 LBT is successful within this ROW, the earliest symbol positions from the following set can be chosen to transmit PRACH with format B1: {(2, 3), (4, 5), (6, 7), (8, 9), (10, 11), (12, 13)} (this set is derived from "number of time-domain PRACH occasions within a RACH slot" and "starting symbol").

In yet another sub-embodiment, the ROW configuration can be indicated by both higher layer parameters (e.g., ROW duration), and through PRACH configuration table.

In another sub-embodiment, for any given method to configure the ROW as specified above, the time-domain PRACH resource location can be allocated in the unit of ROW, as opposed to a RO as in NR.

For example, when a group-wise SSB to RO association is used (detailed in Component 4), wherein the grouping for ROs is in time-domain, the group ROs that are associated with the same SSB can be treated as within the ROW, and the time-domain RACH resource is allocated in the unit of ROW, or equivalently the group ROs.

More details on the association between SS/PBCH block(s) and PRACH resource are detailed in Component 5.

In NR, the frequency resources for PRACH preamble can be obtained from parameter prach-FDM and prach-frequency-start. Specifically, the FDM'ed RACH occasions are consecutive within the UL BWP, wherein the allowed number of FDM'ed ROs (i.e., prach-FDM) are 1, 2, 4, and 8.

In one embodiment, NR-U can support FDM'ed RACH occasions similar to NR.

In one sub-embodiment, the FDM'ed RACH occasions can be consecutive to each other in frequency domain without any gaps in between two neighboring RACH occasions, as in NR.

In another sub-embodiment, the FDM'ed RACH occasions can be non-consecutive in frequency domain. In one example of this sub-embodiment, the FDM'ed RACH occasions can be divided into multiple groups, wherein the ROs belonging to different groups are non-consecutive in frequency domain, while ROs belonging to the same group are consecutive in frequency domain.

In one instance of this example, there can exist a frequency gap of P RBs (P can be larger than or smaller or equal to 1) for every N (N>=1) consecutively FDM'ed RACH occasions; wherein there exists a frequency gap of P RBs between every RACH occasions when N=1.

In another instance of this example, when the UL BWP is composed of multiple nominal channel bandwidths of the unlicensed band (e.g., each nominal channel BW can be a sub-band of 20 MHz for FR1 NR-U), different group can belong different nominal channel bandwidth within the UL BWP, while same group can belong to one nominal channel bandwidth. In addition, a same offset from the starting frequency of the nominal channel bandwidth to the starting frequency of the RO group within this nominal channel bandwidth can be potentially applied for different RO groups.

In one sub-embodiment, the supported number of FDM'ed ROs can be all or a subset of {1, 2, 4, 8}.

In another example of this sub-embodiment, when the UE is assigned with multiple FDM'ed RACH occasions on different nominal channel bandwidths within the same UL BWP (e.g., this can happen when the maximum number of supported FDM'ed ROs is higher than 8 with 30 kHz PRACH SCS, and/or the FDM'ed ROs are non-consecutive in frequency domain), and that NR-U PRACH LBT can be performed over the nominal channel bandwidth of the unlicensed band according to Component 1, then the UE can perform multiple LBT processes in parallel, with each LBT process being performed over the nominal channel bandwidth wherein the UE is assigned with RACH occasion(s). As a result, the UE has higher chance in successfully transmitting the PRACH.

In another sub-embodiment, the supported number of FDM'ed ROs can be enhanced to support numbers other than those from NR, i.e., {1, 2, 4, 8}.

In one example of this sub-embodiment, additional number of supported number of FDM'ed ROs can be supported, such as 5, 7, 10, or 16. For instance, the maximum supported number of FDM'ed ROs can be larger than 8, which is the largest number of FDM'ed ROs supported by NR.

In one example, this can be used when interlace-based waveform is introduced for PRACH.

In another example of this sub-embodiment, when the UE is assigned with multiple FDM'ed RACH occasions on different nominal channel bandwidths within the same UL BWP (e.g., this can happen more often compared to NR when the maximum number of supported FDM'ed ROs is higher than 8), and that NR-U PRACH LBT can be performed over the nominal channel bandwidth of the unlicensed band according to Component 1, then the UE can perform multiple LBT processes in parallel, with each LBT process being performed over the nominal channel bandwidth wherein the UE is assigned with RACH occasion(s). As a result, the UE has higher chance in successfully transmitting the PRACH.

In another sub-embodiment, the maximum number of FDM'ed ROs for given bandwidth for UL BWP containing PRACH occasions BW, SCS of PRACH SCS, and number of PRBs for PRACH L, can be floor (BW/L/SCS).

In an instance of this sub-embodiment, when BW of the UL BWP is 40 MHz, L=12, and SCS=30 kHz, then the maximum number of FDM'ed ROs is floor(40 MHz/12/30 kHz)=9.

In another example of this sub-embodiment, when the UE is assigned with multiple FDM'ed RACH occasions on different nominal channel bandwidths within the same UL BWP (e.g., when the maximum number of FDM'ed ROs are used and the UL BWP BW is larger than the nominal channel bandwidth of the unlicensed band), and that NR-U PRACH LBT can be performed over the nominal channel bandwidth of the unlicensed band according to Component 1, then the UE can perform multiple LBT processes in parallel, with each LBT process being performed over the nominal channel bandwidth wherein the UE is assigned with RACH occasion(s). As a result, the UE has higher chance in successfully transmitting the PRACH.

In another sub-embodiment, the exact frequency resource for PRACH transmission also depends on the PRACH waveform design, which can be consecutive or non-consecutive in frequency domain, and may be detailed in next component.

Besides the resource configuration for PRACH occasions, another design consideration regarding PRACH configuration is the supported PRACH preamble formats. In NR, both long preamble formats (i.e., format 0/1/2/3 for 15 kHz PRACH SCS) and short preamble formats (i.e., format A1/A2/A3/B1/B2/B3/B4/C0/C2 for 15/30/60/120 kHz PRACH SCS).

For NR-U, the supported preamble formats can be provided.

In one embodiment, all formats of NR can be supported by NR-U.

In another embodiment, only short preamble formats can be supported NR-U, while the long preamble formats are not supported. This is because NR-U mainly targets the small cells with a shorter coverage range, and long preamble formats are restrictive for 15 kHz PRACH SCS. In one sub-embodiment, a subset of short preamble formats can be further supported, such as the short preamble formats except C2 and/or C0, which also targets cells with larger coverage area.

In yet another embodiment, in addition to supporting all or subset of NR PRACH preamble formats (according to previous two embodiments), new preamble formats can be supported for NR-U.

In one example, compared to NR PRACH formats, the new PRACH formats for NR-U can include different CP duration, and/or different guard period, and/or different number of repeated PRACH sequences, and/or different waveform/resource allocation for PRACH in frequency domain.

In one example, format A0 can be supported for NR-U, which is given by TABLE 2 (parameter definitions in are following that in TABLE 1). Format A0 can be supported for NR-U such that more RACH occasions can be allocated within a fixed duration (e.g., PRACH slot), such that more transmit opportunities for PRACH transmissions can be achieved to compensate PRACH LBT failure.

TABLE 2

| Preamble format | | | | |
| --- | --- | --- | --- | --- |
| Preamble format | #of sequence | TCP | TSEQ | TGP |
| A0 | 1 | 144 | 2048 | 0 |

In yet another embodiment, the NR-U PRACH configuration table can be updated to indicate the supported preamble formats, which can be only a subset of NR preamble formats and/or new preamble format(s) for NR-U; and the corresponding supported combinations of preamble formats within PRACH slot(s).

Component 3: Enhancement to PRACH Waveform.

EU regulations require that PRACH occasions need to span at least 80% or 70% of the nominal bandwidth in order to satisfy the OCB requirement in the 5 GHz or 60 GHz unlicensed band, respectively. At least for 5 GHz unlicensed band, during a channel occupancy time (COT), equipment may operate temporarily with an OCB of less than 80% of nominal channel bandwidth with a minimum of 2 MHz. The PRACH waveform of NR-U may need to be modified in order to satisfy the regulatory requirements over the unlicensed spectrum.

One important consideration regarding OCB regulation is notion of the nominal channel bandwidth, which depends on the regulation for unlicensed band. For 5 GHz unlicensed band, the nominal channel bandwidth of a single operating channel can be 20 MHz; while alternatively, equipment may implement a lower nominal channel bandwidth with a minimum of 5 MHz, providing the equipment still complies with the nominal center frequencies. For 60 GHz unlicensed band, the nominal channel bandwidth can be smaller than 100 MHz, between 100 MHz and 500 MHz, or larger than 500 MHz (e.g., 2.16 GHz). In addition, for both 5 GHz and 60 GHz bands, when equipment has simultaneous transmissions in adjacent channels, these transmissions may be considered as one signal with an actual nominal channel bandwidth of "n" times the individual nominal channel bandwidth where "n" is the number of adjacent channels.

When equipment has simultaneous transmissions in non-adjacent channels, each power envelope may be considered separately. Based on the unlicensed regulations, the nominal channel bandwidth for NR-U, which can be the frequency unit utilized to determine if OCB regulation is satisfied by NR-U, can be as follows.

In one embodiment, the nominal channel bandwidth for FR1 NR-U can be 20 MHz. In one sub-embodiment, the center frequencies fc of NR-U in 5 GHz unlicensed band can be complied with that defined by 5 GHz regulation, such as fc=5 160+(g×20) MHz, where 0≤g≤9 or 16≤g≤27 and where g may be an integer. In one sub-embodiment, this implies that the initial active UL BWP can be 20 MHz, and the UL BWPs can be in the units of 20 MHz.

In another embodiment, the nominal channel bandwidth for FR1 NR-U can be lower than 20 MHz with a minimum of 5 MHz. In one sub-embodiment, this can be applied for NR-U in 5 GHz unlicensed band if the nominal center frequencies are aligned with 5 GHz band regulation. In one sub-embodiment, the legacy NR PRACH waveform can meet the OCB regulation directly, such as with 30 kHz SCS.

In another embodiment, the nominal channel bandwidth for FR2 NR-U can be 50 MHz, 100 MHz, 200 MHz, or 400 MHz. In one sub-embodiment, the subcarrier spacing for PRACH in 60 GHz unlicensed band can be 60 kHz, 120 kHz as in NR, or higher than 120 kHz such as 240 kHz, 480 kHz, or 960 kHz.

In another embodiment, the nominal channel bandwidth for FR2 NR-U can be 2.16 GHz. In one sub-embodiment, the subcarrier spacing for PRACH can be higher than 120 kHz, such as $120 \times 2^n$ kHz, with $n>1$.

In yet another embodiment, for FR1 NR-U, the nominal channel bandwidth can follow that as NR-U in 5 GHz unlicensed band; while for FR2 NR-U, the nominal channel bandwidth can follow that as NR-U in 60 GHz unlicensed band.

Given the definition of nominal channel bandwidth for NR-U, and the OCB regulation, the PRACH waveform for NR-U can be chosen from one or multiple of the following options.

In one embodiment, the legacy continuous waveform of NR PRACH can be reused by NR-U.

In one sub-embodiment, this can be allowed by (at least in 5 GHz band) the regulation such that temporal OCB can be less than 80% during a COT.

In another sub-embodiment, this can be allowed by allocating FDM'ed RACH occasions to a UE, such that the OCB regulation can be satisfied.

In one example, within 20 MHz initial active UL BWP for FR1 NR-U, allocating 4 FDM'ed RACH occasions with 30 kHz PRACH SCS to a UE can meet the OCB regulation; allocating 8 FDM'ed RACH occasions with 15 kHz PRACH SCS to a UE can meet the OCB regulation; or allocating 2 FDM'ed RACH occasions with 60 kHz PRACH SCS to a UE can meet the OCB regulation.

In another example, with multiple FDM'ed RACH occasions allocated to a UE, the UE can use the same spatial TX parameter in transmitting PRACH in these FDM'ed RACH occasions, which can improve the coverage of the PRACH. In addition, the gNB can respond a single RAR to the FDM'ed RACH occasions, if the UE transmits in these FDM'ed ROs for coverage extension purpose, potentially using the same PRACH preamble.

In another example, with multiple FDM'ed RACH occasions allocated to a UE, the UE can use different spatial TX parameter in transmitting PRACH in these FDM'ed RACH occasions (e.g., if a UE supports hybrid beamforming), which can facilitate the UE UL transmit beamforming, such as when UE does not have UL beam correspondence.

In another example, a UE can choose the same PRACH preamble across the allocated FDM'ed RACH occasions; or choose PRACH preambles independently across the allocated FDM'ed RACH occasion, given the parameters derived from higher layer in determining the root sequence and the cyclic shift.

In another example, the FDM'ed ROs allocated to a UE can be consecutive in frequency domain, or non-consecutive in frequency domain.

In another sub-embodiment, the PRACH resource can be determined from the legacy procedure as in NR.

In another embodiment, the PRACH waveform for NR-U can be constructed through direct repetition of the NR PRACH waveform in the frequency domain, such that the OCB regulation is satisfied.

In one sub-embodiment, the PRACH waveform configuration including the interval between adjacent PRACH repetition, number of PRACH repetition within nominal BW (or UL BWP), can indicated by higher layer parameters, such as through the SystemInformationBlockType1 (SIB1) or SIBs other than SIB1 from the RRC layer.

In another embodiment, the PRACH for NR-U can be constructed through the interlace-based waveform, such as the block interleaved FDM (B-IFDM) waveform, such that OCB regulation can be met. Specifically, denote by M the number of RBs per cluster, N the number of clusters per interlace, L the number of RBs between neighboring clusters, $N_{RB}$ the total number of RBs within the nominal channel bandwidth for NR-U, $N_P$ the number of RBs for PRACH, $\eta$ the minimum fraction of allowed OCB versus nominal BW (e.g., $\eta$ is 80% for the 5 GHz band or 70% for the 60 GHz band), then the B-IFDM based NR-U PRACH waveform may satisfy that $$\frac{MN + L(N-1)}{N_{RB}} \geq \eta,$$

$MN=N_P$, and the interlace is contained within the nominal BW or UL BWP. A cluster refers to the consecutively allocated frequency resources that belongs to one interlace.

Figure 17:
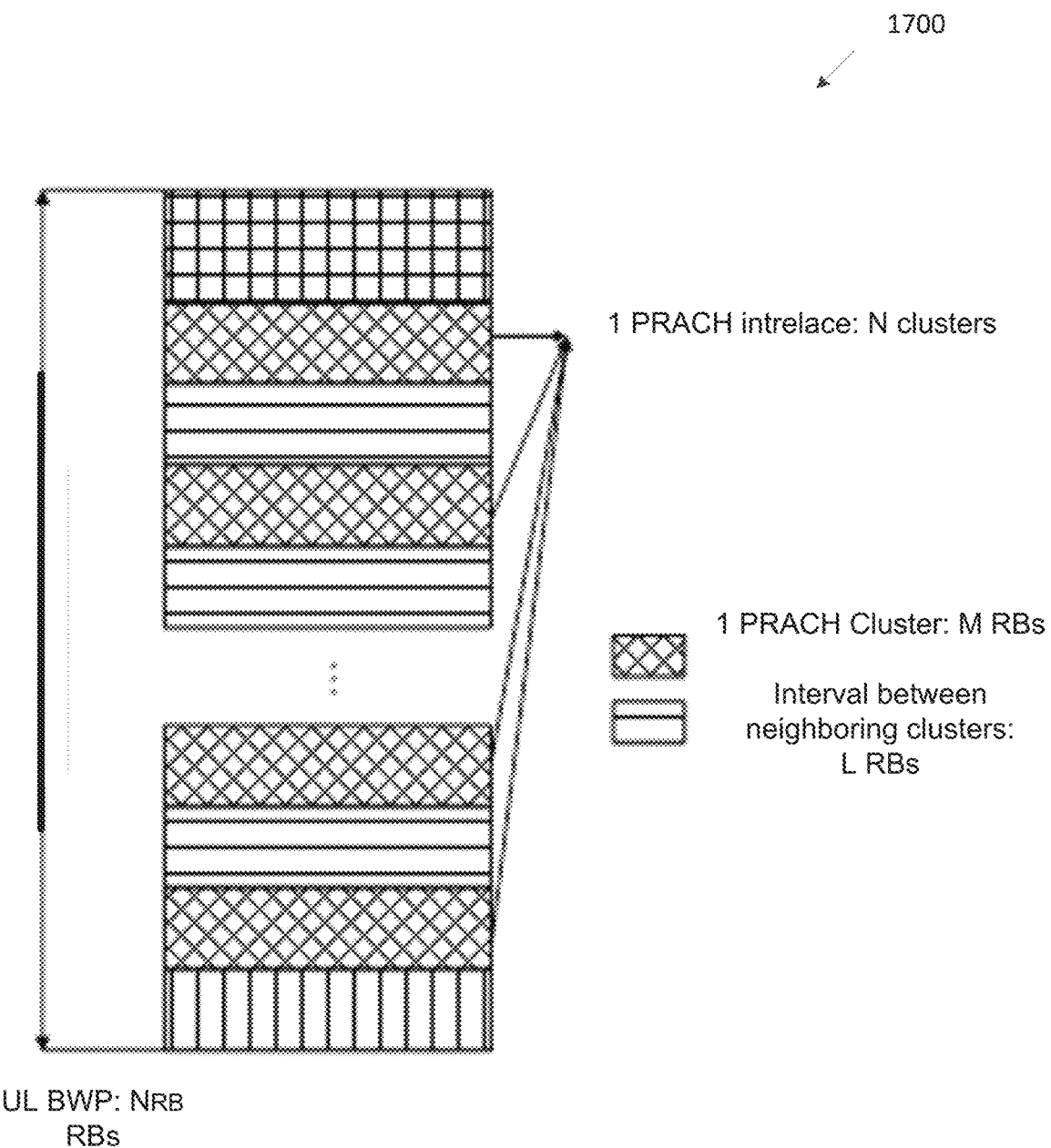
FIG. 17 illustrates an example interlace structure according to embodiments of the present disclosure.

FIG. 17 illustrates an example interlace structure 1700 according to embodiments of the present disclosure. The embodiment of the interlace structure 1700 illustrated in FIG. 17 is for illustration only. FIG. 17 does not limit the scope of this disclosure to any particular implementation.

In one sub-embodiment, each cluster can be based on group of RBs, single RB, or RE; which indicates M defined above can be an integer greater than 1, an integer equal to 1, or a fractional number. An illustration of the interlace structure is illustrated in FIG. 17. For example, when M>=1, the interlace is RB-level based. In another example, when M<1, and M*12 is an integer number, the interlace is an RE-level based, which means the cluster is in an integer number of REs.

In another sub-embodiment, NR-U can also support FDM'ed PRACH interlaces within the nominal BW (or UL BWP); and the FDM'ed PRACH interlaces can be consecutive in frequency domain in the sense that the clusters across different interlaces are consecutive and non-overlapping. In addition, the supported number of FDM'ed ROs can follow Component 2.

In another sub-embodiment, each FDM'ed interlace can have the same number of clusters within each interlace, such that the total number of RBs for each PRACH interlace is fixed to be $N_P$ (e.g., 12 PRBs). TABLE 3 and TABLE 4 illustrate two specific examples of the interlace design for FR1 NR-U with 20 MHz bandwidth and FR2 NR-U with 100 MHz bandwidth respectively, for various different PRACH SCS options and PRACH length of 12 PRBs.

In one sub-embodiment, all or a subset of the entries in TABLE 3 and TABLE 4 can be supported by NR-U, for PRACH, and potentially other uplink channels such as PUSCH and PUCCH. In addition, TABLE Sand TABLE 6 illustrate another two specific examples of the interlace design for FR1 NR-U with 20 MHz bandwidth and FR2 NR-U with 100 MHz bandwidth respectively, for various different PRACH SCS options and a fixed bandwidth for each cluster across different SCS, which can be applied to uplink channels such as PUSCH and PUCCH, and potentially PRACH as well.

In one sub-embodiment, different PRACH preamble sequence can be defined for NR-U if interlaced-structure is used. In one example, similar interlace structure can be defined for PRACH and PUSCH/PUSCH, such that interlace-based PRACH and interlaced-based PUSCH/PUCCH can be multiplexed in frequency domain. For instance, the PRACH and PUSCH/PUCCH interlace can be defined according to TABLE 5 or TABLE 6.

TABLE 3

| Interlace design | | | | |
|---|---|---|---|---|
| PRACH SCS | Maximum number of FDM'ed interlaces | M | N | L |
| 15 kHz | 8 | 1 | 12 | 7 |
| 30 kHz | 4 | 1 | 12 | 3 |
|  | 4 | 1/2 | 24 | 3/2 |
| 60 kHz | 2 | 1 | 12 | 1 |
|  | 2 | 1/2 | 24 | 1/2 |
|  | 2 | 1/4 | 48 | 1/4 |

TABLE 4

| Interlace design | | | | |
|---|---|---|---|---|
| PRACH SCS | Maximum number of FDM'ed interlaces | M | N | L |
| 60 kHz | 10 or 8 | 1 | 12 | 9 |
|  | 8 | 1/2 | 24 | 7/2 |
| 120 kHz | 5 or 4 | 1 | 12 | 4 |
|  | 4 | 1/2 | 24 | 3/2 |

TABLE 5

| Interlace design | | | | |
|---|---|---|---|---|
| PRACH SCS | Maximum number of FDM'ed interlaces | M | N | L |
| 15 kHz | 10 | 1 | 10 | 9 |
|  | 8 | 1 | 12 | 7 |
| 30 kHz | 10 | 1/2 | 10 | 9/2 |
|  | 8 | 1/2 | 12 | 7/2 |
| 60 kHz | 10 | 1/4 | 10 | 9/4 |
|  | 8 | 1/4 | 12 | 7/4 |

TABLE 6

Interlace design

| PRACH SCS | Maximum number of FDM'ed interlaces | M | N | L |
|---|---|---|---|---|
| 60 kHz | 10 | 1 | 12 | 9 |
| | 12 | 1 | 10 | 11 |
| | 12 | 1 | 11 | 11 |
| 120 kHz | 10 | 1/2 | 12 | 9/2 |
| | 12 | 1/2 | 10 | 11/2 |
| | 12 | 1/2 | 11 | 11/2 |

In another sub-embodiment, the PRACH waveform configuration including the number of RBs between neighboring clusters L, as well as the number of RBs per cluster number M and/or the number of clusters per interlace N, can indicated by higher layer parameters, such as through the SystemInformationBlockType1 (SIB1) or SIBs other than SIB1 from the RRC layer. As a result, based on these additional higher parameters, and existing higher layer parameters prach-FDM and prach-frequency-start supported by NR, the interlace-based resource allocation for PRACH in frequency domain can be determined.

In yet another embodiment, the PRACH waveform for NR-U can be constructed within a certain interval which supports multiple RACH occasions in time-domain and multiple FDM'ed RACH occasions in frequency domain; and the PRACH waveform in each RO is using continuous waveform such as in legacy NR PRACH, while the continuous PRACH waveform is cyclically repeated in the frequency domain within the remaining ROs of the interval, such that OCB regulation can be satisfied within the interval. This waveform can be referred to as the cyclically mapped PRACH waveform.

In one sub-embodiment, the interval can be one PRACH slot, or multiple consecutive PRACH slots, or a few PRACH OFDM symbols. In another sub-embodiment, the number of FDM'ed RACH occasions K in frequency domain can be chosen according to Component 2, such that K×$N_P$ satisfies the OCB regulation within the nominal bandwidth (e.g., 20 MHz for 5 GHz band), wherein $N_P$ is the number of RBs for PRACH.

In another sub-embodiment, the ROs in time domain within this interval can be consecutive, and LBT can be performed before the first available RO across the nominal BW or UL BWP that contains the ROs, according to procedures defined in Component 2.

In another sub-embodiment, the ROs in time domain within this interval can be non-consecutive, and LBT can be performed before each available RO.

Figure 18:
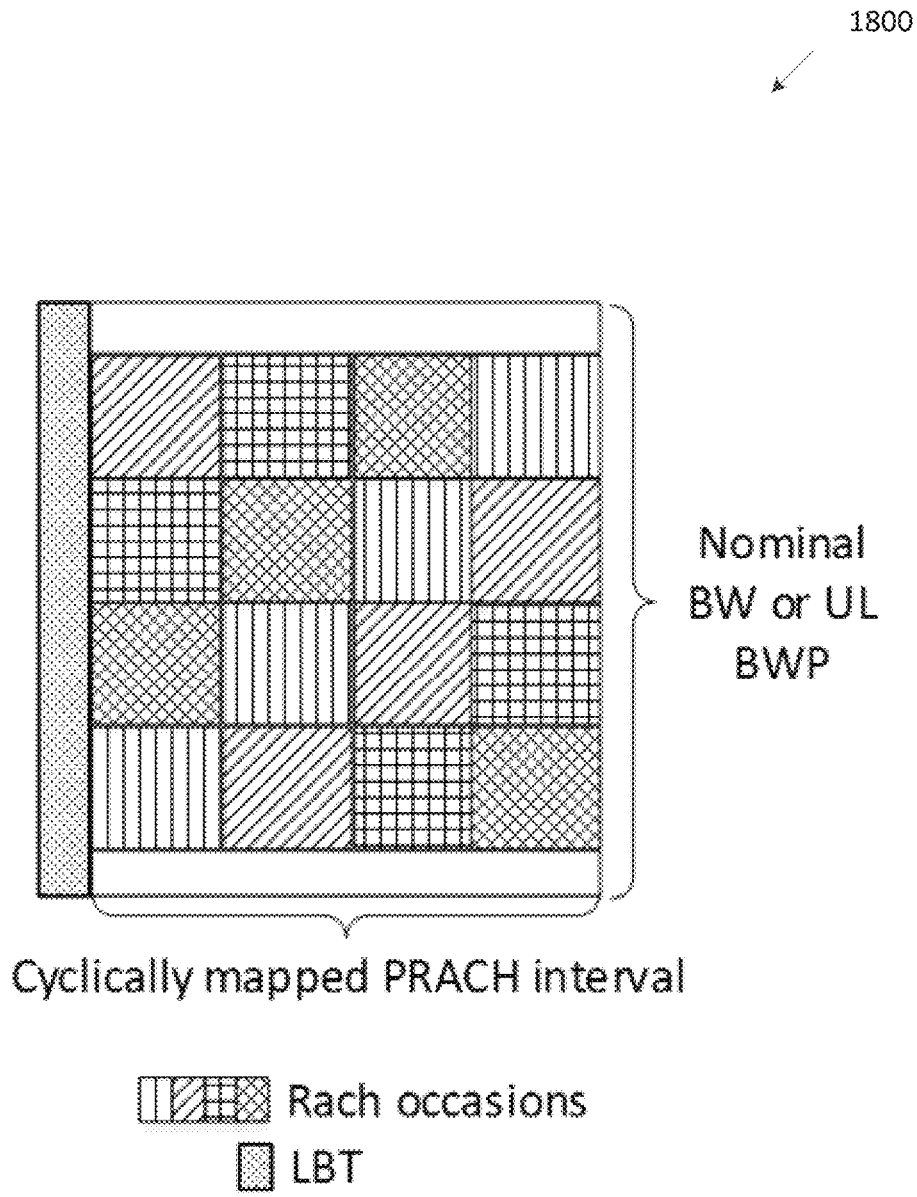
FIG. 18 illustrates an example RACH occasions according to embodiments of the present disclosure.

FIG. 18 illustrates an example RACH occasions 1800 according to embodiments of the present disclosure. The embodiment of the RACH occasions 1800 illustrated in FIG. 18 is for illustration only. FIG. 18 does not limit the scope of this disclosure to any particular implementation. An illustration when the ROs in time domain are consecutive is provided in FIG. 18.

In another sub-embodiment, if this PRACH waveform option is chosen, the time and frequency position for PRACH can be determined based on existing higher layer parameters of NR. Specifically, the starting frequency position for the first PRACH occasion of the UE can be determined as in NR PRACH (e.g., through prach-FDM and prach-frequency-start), while the remaining prach-FDM-1 ROs allocated to the PRACH can be cyclically mapped in time and frequency domain as illustrated in previous paragraph.

In another sub-embodiment, if this PRACH waveform option is chosen, the time and frequency position for PRACH can be determined through by introducing new parameters to PBCH or higher layer; and existing parameters of NR. For example, the new parameters can be chosen to indicate the LBT type of the cyclically mapped waveform.

Component 4: Time-Domain Enhancement to Increase Transmit Opportunities for Msg1.

Due to the LBT requirement for transmitting PRACH, the failure of PRACH LBT can cause significant delay to the overall RA procedure. As a result, enhancements for Msg1/PRACH to increase the transmission opportunities of PRACH given LBT can be adopted to decrease the overall RA delay.

In one embodiment, more than one transmission opportunities of PRACH in different time locations can be configured to a UE, such that each UE can be allocated multiple time-domain RACH occasions to attempt the PRACH transmission. In addition, this can be combined with all other enhancements in this disclosure, e.g., the enhancement to PRACH waveform for NR-U as detailed in Component 3, and/or enhancement to the PRACH configuration in time/frequency domain as detailed in Component 2.

In NR, a UE is provided a number of SS/PBCH blocks associated with one PRACH occasion by higher layer parameter (e.g., SSB-perRACH-OccasionAndCB-PreamblesPerSSB), based on this parameter, the selected SS/PBCH block index, and other higher layer parameters (e.g., prach-FDM, prach-frequency-start, PRACHConfigurationIndex), and the predefined mapping rule of SS/PBCH block and PRACH occasions, that the available time and frequency location of PRACH occasions can be inferred by the UE. In NR, SSB-perRACH-Occasion can be selected from {1/8, 1/4, 1/2, 1, 2, 4, 8, 16}.

In one embodiment, different value(s) of SSB-perRACH-Occasion from NR can be supported for NR-U. In one sub-embodiment, the new values can be a subset from {1/16, 1/32, 1/64}. In another sub-embodiment, a subset of the NR SSB-perRACH-Occasion values can be supported in addition to the new values of SSB-perRACH-Occasion for NR-U.

To enable the enhancement of supporting multiple Msg1s, following options can be applied. In one embodiment, in the following options in this component, RO can also be referred to as the ROW which is defined in Component 2.

In one sub-embodiment, ROW can be utilized such as when CAT-4 LBT is applied for PRACH.

In one sub-embodiment, each UE can be allocated multiple time-domain RACH occasions to attempt the PRACH transmission when ROW is utilized and that multiple candidate PRACH occasions are supported within the ROW, which is specified by the available time locations for PRACH occasions within the ROW in Component 2. In one example, the multiple time-domain ROs can be considered as belonging to the same ROW.

In one embodiment, NR-U can exploit the mapping between actually transmitted SS/PBCH blocks and the ROs from NR; such that within one time period for SSB to RO association (e.g., one or multiple PRACH configuration periods), each UE can be allocated multiple time-domain ROs to attempt PRACH transmission, wherein the LBT for associated ROs of the UE can follow one of the options detailed in Component 1. This option is can be easily enhanced from NR and is therefore easy to implement.

In one sub-embodiment, this mapping option can be applied to the scenarios where the number of actually transmitted SSBs is smaller than the number of available ROs in time domain within a mapping period for SSB to RO association. For example, this scenario can be achieved when many-to-one mapping or one-to-one mapping for SSB and RO is used (i.e., SSB-perRACH-Occasion<=1), and/or when multiple FDM'ed ROs are allowed; and/or when the number of actually transmitted SSB is small (e.g., using omni-directional or quasi-omni-directional beam for SSB), in which case even with one-to-many mapping for SSB and RO, each UE can have multiple ROs in time domain.

Figure 19:
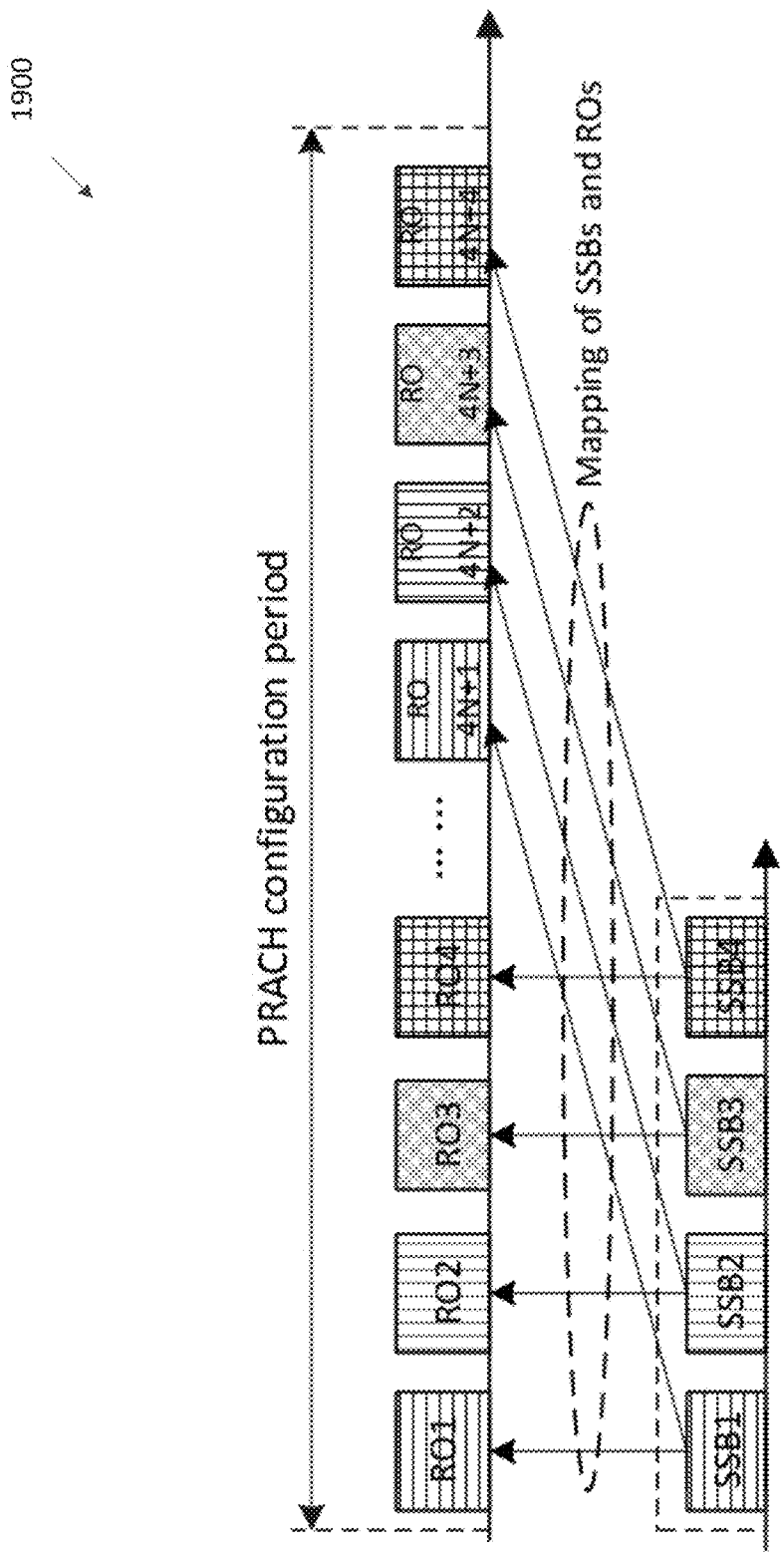
FIG. 19 illustrates an example PRACH configuration according to embodiments of the present disclosure.

FIG. 19 illustrates an example PRACH configuration 1900 according to embodiments of the present disclosure. The embodiment of the PRACH configuration 1900 illustrated in FIG. 19 is for illustration only. FIG. 19 does not limit the scope of this disclosure to any particular implementation.

One example with actually transmitted SSB N=4, an one-to-one mapping, and an SSB to RO association period equal to one PRACH configuration period, is illustrated in FIG. 19.

In another sub-embodiment, one of the options from Component 2 for incorporating the time-domain overhead for performing LBT on the available time-domain RACH occasions within RACH slot(s), e.g., the RACH occasions within the same RACH slot(s) can be consecutively allocated, or non-consecutively allocated to incorporate gap for LBT, or the ROW is utilized.

In one example of this sub-embodiment, LBT can be performed before each RO allocated to the UE, which can be applied to when in between the two neighboring time-domain ROs allocated to a UE, there exists RO(s) allocated to other UE(s) in the time domain.

In another example of this sub-embodiment, subject to one LBT, a UE can transmit in multiple time-domain ROs allocated to itself, without performing extra LBT. For instance, this can be applied to when one-to-many mapping is used, and the UE is allocated multiple neighboring ROs in time domain, wherein there can exist no gap between the two neighboring ROs. In another instance, this can be applied when ROW is allocated to the UE, and there exists multiple consecutively allocated ROs within the ROW. In this case, there can exist multiple Msg1 transmissions for the UE, which can be used for coverage enhancement or UE side beam training.

In another embodiment, how UE utilizes associated ROs to transmit the PRACH can be determined by spec, or up to UE implementation.

In one example, within current SSB to RO association period, a UE can utilize the UE's first available associated RO or associated FDM'ed ROs in time domain after the LBT is succeeded, to transmit PRACH preamble; and ROs after the RO(s) that it transmitted PRACH may not be utilized.

In another example, a UE can attempt to transmit PRACH preamble in all of the UE's associated ROs within current SSB to RO association period, as long as the UE can succeed in the LBT that corresponds to the RO. In one instance, each RO can be subject to a separate LBT. In another instance, one successful LBT at the UE can grant transmission of multiple PRACH transmissions. In this case, multiple Msg1 transmissions are supported by the UE.

In another example, a UE can attempt to transmit PRACH preamble in a subset of associated ROs within current SSB to RO association period.

In another sub-embodiment, the time period for SSB to RO association can be multiple PRACH configuration periods, such that a given desired number of cyclically mapped ROs in time domain can be achieved by UEs associated with one of the actually transmitted SS/PBCH blocks.

In one example, the allowed number of PRACH configuration periods for SSB to RO association depends on the RACH configuration period, which can be reused from NR, as shown in TABLE 7.

In another example, the maximum allowed period for SSB to RO association can be increased from NR, such as to $160 \times 2^n$ with n>0, and the supported mapping period set as shown in TABLE 7 can be modified accordingly.

In a specific example, if the actually transmitted SSB N=8, total number of ROs in both time and frequency within a PRACH configuration period is M=20, number of FDM'ed RO is F=2, and number of SS/PBCH blocks associated with one RO n=1, and the expected number of time-domain cyclic repetition for ROs associated with a SS/PBCH block is k=4, then the number of PRACH configuration period needed is at least 2, subject to the supported mapping period set.

Figure 20:
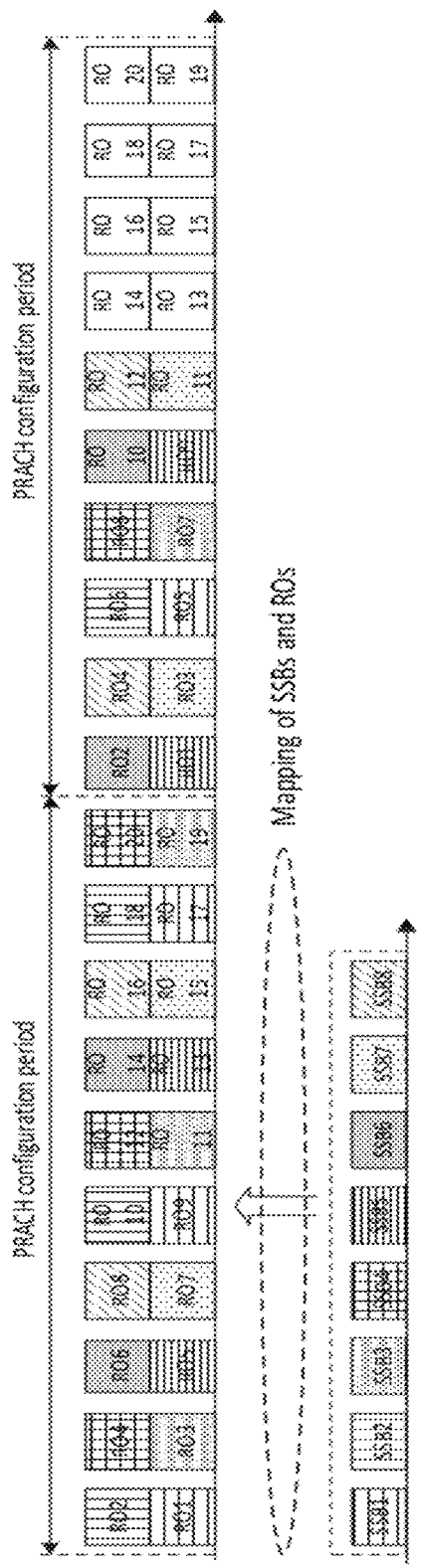
FIG. 20 illustrates another example PRACH configuration according to embodiments of the present disclosure.

FIG. 20 illustrates another example PRACH configuration 2000 according to embodiments of the present disclosure. The embodiment of the PRACH configuration 2000 illustrated in FIG. 20 is for illustration only. FIG. 20 does not limit the scope of this disclosure to any particular implementation. FIG. 20 provides an illustration of this example, with an SSB to RO association period equal to two PRACH configuration periods.

TABLE 7

| RACH configuration and mapping | |
|---|---|
| RACH configuration period (ms) | Mapping period set (# of RACH configuration period) |
| 10 | {1, 2, 4, 8, 16} |
| 20 | {1, 2, 4, 8} |
| 40 | {1, 2, 4} |
| 80 | {1, 2} |
| 160 | {1} |

In another embodiment, NR-U can map the ROs associated with the (actually transmitted) SS/PBCH block(s) in k>=1 time-domain ROs consecutively.

In one sub-embodiment, LBT for associated ROs of the UE can follow one of the options in Component 1, such that within one time period for SSB to RO association (e.g. one or multiple PRACH configuration periods), UEs associated with the (actually transmitted) SS/PBCH block(s) can be allocated multiple consecutive time-domain ROs to attempt PRACH transmission.

In one sub-embodiment, the ROs associated with SS/PBCH block in k>=1 time-domain ROs consecutively can indicate that the ROs associated an SS/PBCH block is allocated in a unit of k>=1 time-domain ROs, and in between the 1st RO to the k-th RO associated with the SS/PBCH block in the time-domain, there does not exist other time-domain ROs.

In one sub-embodiment, for the k>=1 consecutive time-domain ROs associated with an SS/PBCH block, there can exist an gap duration in between neighboring ROs or no gap duration in between the neighboring ROs.

In one sub-embodiment, if the desired number of consecutive time-domain ROs associated with SS/PBCH block(s) is k (k>=1), the mapping of ROs associated with SS/PBCH block(s) in the time domain can be allocated in the unit of k consecutive ROs. In addition, the frequency resource indexes can be allocated in increasing order if FDM'ed ROs are allowed. In the case of interlaced PRACH waveform, frequency resource index is increased with respect the lowest cluster of the interlace. In addition, compared to NR wherein the order of time multiplexed ROs is increased within one PRACH slot, the order of time multiplexed ROs can be increased within n>=1 PRACH slots (e.g., n=k).

In another sub-embodiment, in order to support configuring multiple time-domain ROs to be associated with SS/PBCH block(s) in a consecutive manner, the mapping between SS/PBCH block and ROs can be enhanced from NR.

In one example, the SS/PBCH block(s) are mapped to k consecutive ROs similar to NR, which is as follows: first, in increasing order of preamble indexes for the k consecutive PRACH occasions; second, in increasing order of frequency resource indexes for frequency multiplexed PRACH occasions; third, in increasing order of time resource indexes for time multiplexed k consecutive PRACH occasions within n PRACH slots; and fourth, in increasing order of indexes for next n PRACH slots.

Figure 21:
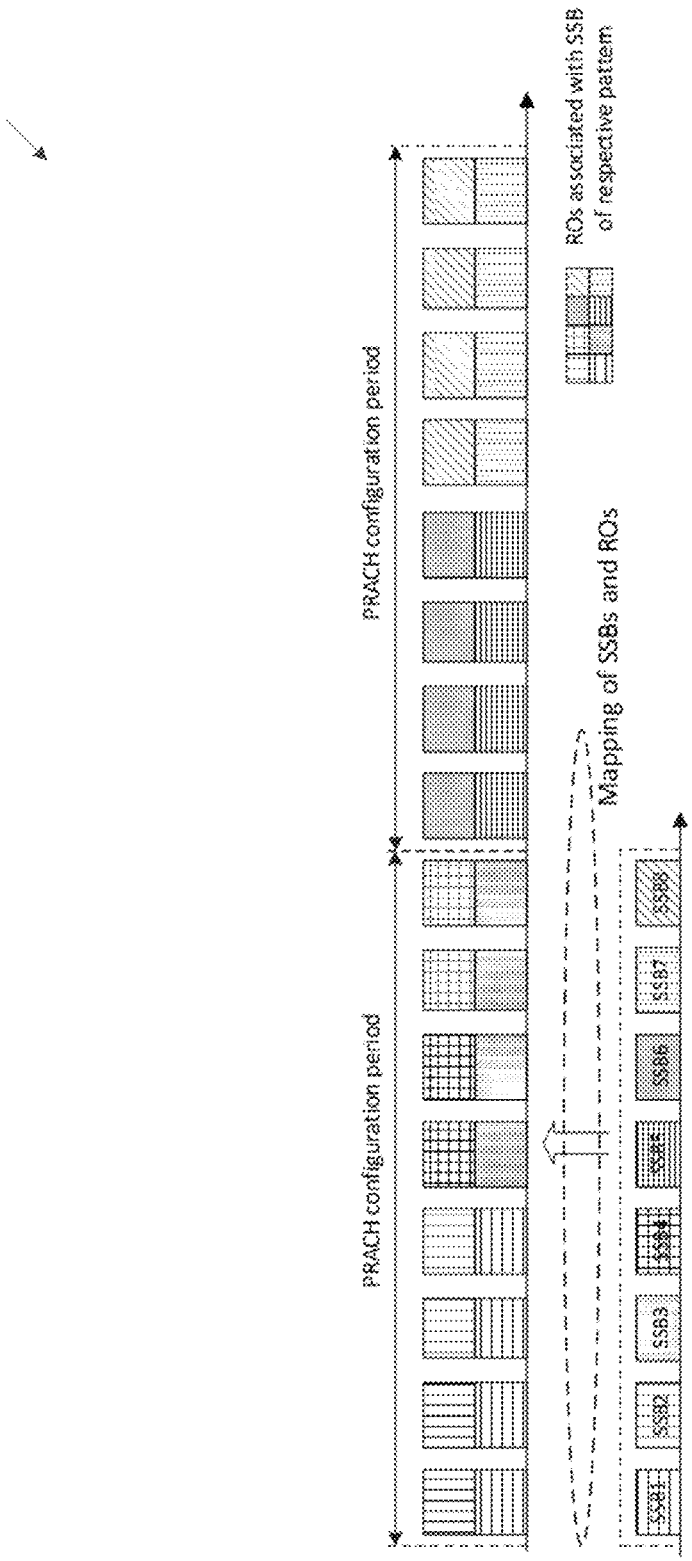
FIG. 21 illustrates yet another example PRACH configuration according to embodiments of the present disclosure.

FIG. 21 illustrates yet another example PRACH configuration 2100 according to embodiments of the present disclosure. The embodiment of the PRACH configuration 2100 illustrated in FIG. 21 is for illustration only. FIG. 21 does not limit the scope of this disclosure to any particular implementation.

FIG. 21 illustrates an example of this option, wherein the number of intended SSBs to transmit is 8, each SSB is mapped to k=4 ROs consecutive in time domain, the supported number of FDM'ed ROs is 2, and the mapping period for SSB to RO association is 2 PRACH configuration periods. In another example, the mapping between SS/PBCH block(s) and ROs can follow a flexible association as detailed in next component.

In another sub-embodiment, the cyclically mapped PRACH waveform defined in Component 3 can be utilized, wherein LBT can be performed before each available RO within the interval that constructs the cyclically mapped PRACH waveform. Specifically, each interval can include k consecutive ROs in time domain (potentially has gaps between ROs to incorporate LBT), and each RO is cyclically increased in frequency domain, as shown in. In addition, for FDM'ed intervals that occupy the same time domain resource, the frequency resource index is increased with respect to the frequency location of the first RO in the time domain of each interval. In addition, compared to NR wherein the order of time multiplexed ROs is increased within one PRACH slot, the order of time multiplexed ROs can be increased within n>=1 PRACH slots (e.g., n=k).

Therefore, in one example, the SS/PBCH block(s) are mapped to k consecutive ROs as follows: first, in increasing order of preamble indexes for the PRACH interval; second, in increasing order of frequency resource indexes for frequency multiplexed PRACH intervals; third, in increasing order of time resource indexes for time multiplexed PRACH intervals within n PRACH slots; and fourth, in increasing order of indexes for next n PRACH slots. In another example, the mapping between SS/PBCH block(s) and ROs can follow a flexible as detailed in next component.

Figure 22:
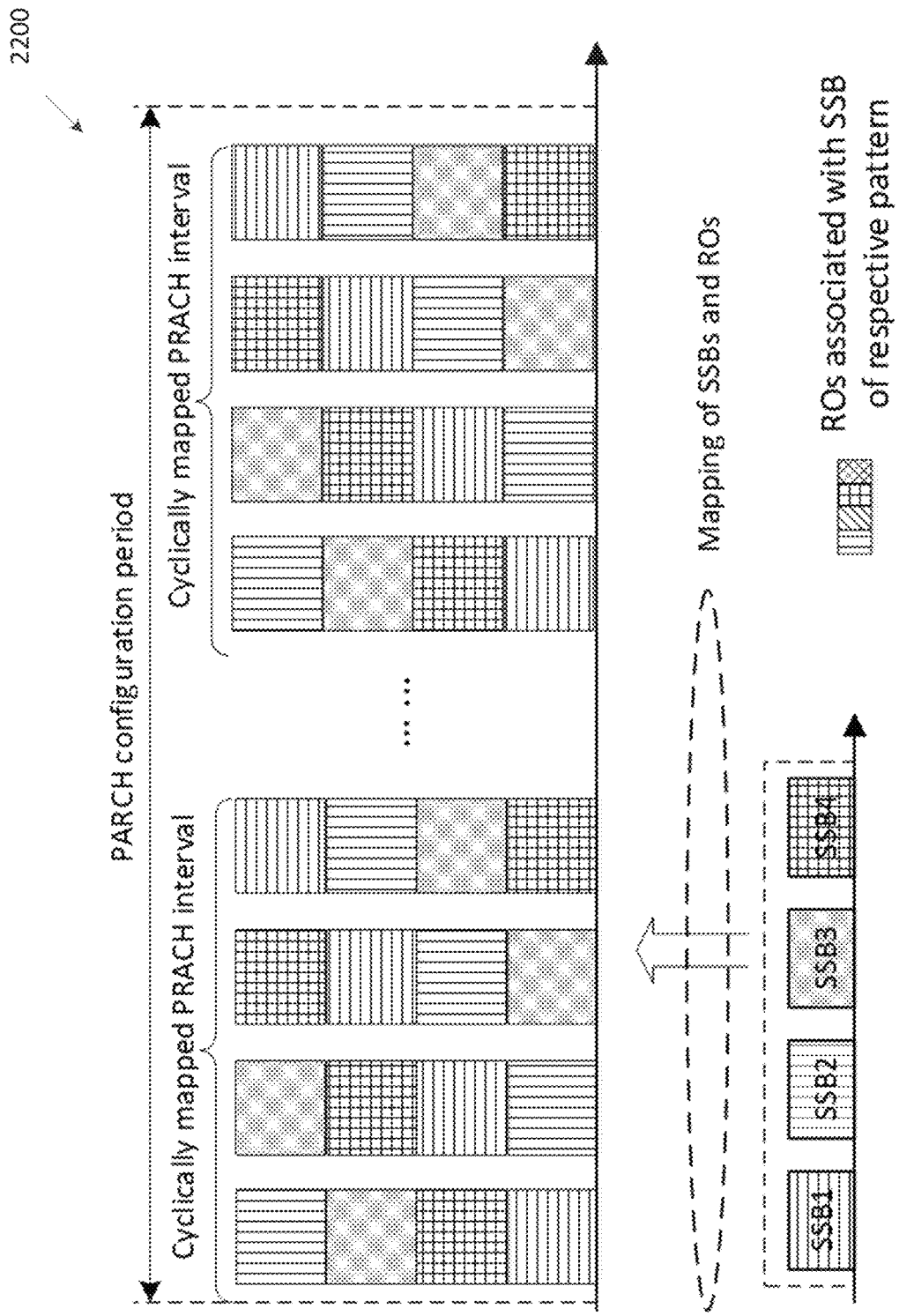
FIG. 22 illustrates an example mapping pattern according to embodiments of the present disclosure.

FIG. 22 illustrates an example mapping pattern 2200 according to embodiments of the present disclosure. The embodiment of the mapping pattern 2200 illustrated in FIG. 22 is for illustration only. FIG. 22 does not limit the scope of this disclosure to any particular implementation.

An illustration of this mapping pattern is illustrated in FIG. 22, wherein the number of intended SSBs to transmit is 4, each SSB is mapped to k=4 ROs within the cyclically mapped PRACH interval, and LBT can be performed before each RO; in addition, the cyclically mapped PRACH interval can be 1 PRACH slot, and PRACH configuration period can include 4 PRACH slots (i.e., 4 cyclically mapped PRACH intervals).

In another sub-embodiment, in order to map in the unit of k consecutive PRACH occasions, the number of PRACH configuration periods needed can be chosen to be at least ceil(number of actually transmitted SS blocks*k/number of available ROs within a PRACH configuration period), subject to the maximum supported mapping period from the mapping period set for the given PRACH configuration period.

In one example, the allowed number of PRACH configuration periods for SSB to RO association depends on the RACH configuration period, which can be reused from NR, as shown in TABLE 7.

In another example, the maximum allowed period for SSB to RO association can be increased from NR, such as to 160*$2^n$ with n>0, and the supported mapping period set as shown in TABLE 7 can be modified accordingly.

In another sub-embodiment, the indication to support multiple consecutive ROs, as well as the number of supported number of consecutive time-domain ROs k, can be explicitly indicated through PBCH, and/or through higher layer parameters, such as through the SystemInformationBlockType1 (SIB1) or SIBs other than SIB1 from the RRC layer; or implicitly indicated by adding new entries and/or adding new columns to the PRACH configuration table, and/or re-interpreting existing columns in the PRACH configuration table.

In another sub-embodiment, the supported number k can be chosen from all or subset of the following: {1, 2, 3, 4, 5, 6, 7, 8, 9, 10, 11, 12, 13, 14, 15, 16}. In one example, the supported number of k can be {1, 2, 4, 8}.

In another sub-embodiment, the supported k can be dependent on the corresponding PRACH preamble format. In one example, the supported number k can be higher for formats with smaller number of OFDM symbols. In another example, the supported number k can be the same for all supported PRACH preamble formats.

In another sub-embodiment, one of the options from Component 2 for incorporating the time-domain overhead for performing LBT on the available time-domain RACH occasions within RACH slot(s), e.g., the RACH occasions within the same RACH slot(s) can be consecutively allocated, or non-consecutively allocated to incorporate gap for LBT, or the ROW is utilized.

In one example of this sub-embodiment, LBT can be performed before each RO allocated to the UE.

In another example of this sub-embodiment, subject to one LBT, UE can transmit in multiple time-domain ROs allocated to itself, without performing extra LBT. For instance, this can be applied to when one-to-many mapping is used, and UE is allocated multiple neighboring ROs in time domain, wherein there can exist no gap between the two neighboring ROs. In another instance, this can be applied when ROW is allocated to the UE, and there exists multiple consecutively allocated ROs within the ROW. In this case, there can exist multiple Msg1 transmissions for the UE, which can be used for coverage enhancement or UE side beam training.

In another sub-embodiment, how UE utilizes associated ROs to transmit the PRACH can be determine by spec, or up to UE implementation.

In one example, within current SSB to RO association period, UE can utilize the first available associated RO or associated FDM'ed ROs in time domain after the LBT is succeeded, to transmit PRACH preamble; and ROs after the RO(s) that it transmitted PRACH may not be utilized.

In another example, a UE can attempt to transmit PRACH preamble in all of associated ROs within current SSB to RO association period, as long as the UE can succeed in the LBT that corresponds to the RO. In one instance, each RO can be subject to a separate LBT. In another instance, one successful LBT at the UE can grant transmission of multiple PRACH transmissions. In this case, multiple Msg1 transmissions are supported by the UE.

In another example, UE can attempt to transmit PRACH preamble in a subset of associated ROs within current SSB to RO association period.

In another embodiment, subject to the enhancement of SS/PBCH block design for NR-U, association of SSBs and ROs can be performed on a per SSB basis, which means each SSB is associated with ROs as in NR; or on a group of SSBs basis, such that a group of SSBs are associated with certain ROs in a many-to-many mapping fashion. For example, the SSBs within the same group can be using the same spatial TX parameters.

Component 5: Enhancement to the Association Between SSBs and RACH Occasions.

Depending on the LBT design for NR-U SSB, the SSBs within the SS burst set may not always be transmitted. Therefore, the ROs associated with SSB(s) that fail LBT may not be utilized, which reduce the resource utilization efficiency. Therefore, another enhancement needs to be considered is for SSBs within the SS burst set, if SSB(s) fails to be transmitted due to LBT failure, how to utilize the ROs that are associated with these SSB(s). This applies to both when enhancement to Msg1 transmission opportunities are increased as detailed in Component 4, and when such enhancement is not utilized. In addition, this also applies to all the PRACH waveform options for NR-U detailed in Component 3. In addition, RO can be referred to as the ROW which are defined in Component 2, if the ROW is utilized, such as when CAT-4 LBT is applied for PRACH.

In one embodiment, the association between SSBs and ROs can follow a similar fixed mapping rule of NR, such that each SSBs that are intended to be transmitted (e.g., the actually transmitted SSB configured in SIB1 or other higher layer parameter) may be mapped to ROs, and the ROs associated with SSBs that are not transmitted (e.g., due to LBT failure) may not be utilized.

In another embodiment, the network can dynamically indicate the indexes of SSBs that are successfully transmitted, such as through SIB1 or other SIBs, such that the association mapping between the transmitted SSBs and ROs can be dynamically adjusted. In one sub-embodiment, this dynamic indication of transmitted SS/PBCH block indexes can be performed periodically. In one example, the period can be the SS burst set period.

In another embodiment, the association between SSBs and ROs can follow a similar fixed mapping rule of NR, such that each SSBs that are intended to be transmitted (e.g., the actually transmitted SSB configured in SIB1 or other higher layer parameter) may be mapped to ROs; but UEs that have detected the transmitted SSBs can potentially be utilizing the ROs associated with un-transmitted SSBs opportunistically. Design consideration is how to indicate to UEs the un-occupied ROs and how to allocate them to the UEs.

In one sub-embodiment, after one SSB fails to be transmitted, the following SSBs can carry the failed SSB information through corresponding MIB/SIB1 or other SIBs; UEs associated with the those SSBs can opportunistically access the ROs not only with their designed ROs, but also ROs associated with the failed SSBs. In particular, these UEs can either access all the available ROs to increase transmit opportunity of PRACH, or can access a subset of all the available ROs. In one example, if denote by SSB-transmitted-SIB1 or SSB-transmitted the actually transmitted SSB indexes that is carried in SSB i, then the gNB can update SSB-transmitted-SIB1 or SSB-transmitted for SSB i to reflect the whether its preceding SSBs are transmitted or not; and the UEs associated with SSB i may be indicated if LBT for SSB i is successful.

In one example, the un-occupied ROs (e.g., associated with SSBs that failed LBT) can be associated with only one SSB (e.g., the first successful SSB that follows un-transmitted SSB(s)). In this case, the gNB can be using the spatial RX filter that corresponds to the SSB that actually utilizes the un-occupied ROs for receiving the PRACH preambles.

In another example, UEs associated with SSB i that succeed in LBT can utilize the un-occupied ROs associated with SSBs that failed LBT and are preceding SSB i, in addition to the ROs associated with SSB i. In this case, the un-occupied ROs can be shared by UEs associated with different SSBs, and the gNB can be using the spatial RX filter that corresponds to an omnidirectional or quasi-omnidirectional beam to receive the PRACH preambles in these un-occupied ROs.

In another example, the UEs associated with transmitted SSBs but using the un-occupied ROs can be assigned orthogonal preambles (e.g., if UEs associated with 2 transmitted SSBs share 1 un-occupied RO, 64 preambles can be allocated into 2 groups). In this case, a gNB can be using spatial RX filter that corresponds to a wide RX beam direction to cover the SSBs sharing the un-occupied RO, or use one of the spatial RX filter that corresponds to the SSBs sharing the un-occupied ROs.

This method may lead to UEs associated with later SSBs within the SS burst set more likely to associated with more ROs, compared to UEs associated with earlier SSBs within the SS burst set. In one example, one way to remedy this is shift (regularly or probabilistically) SSB beam directions/indexes across different SS burst set period.

Figure 23:
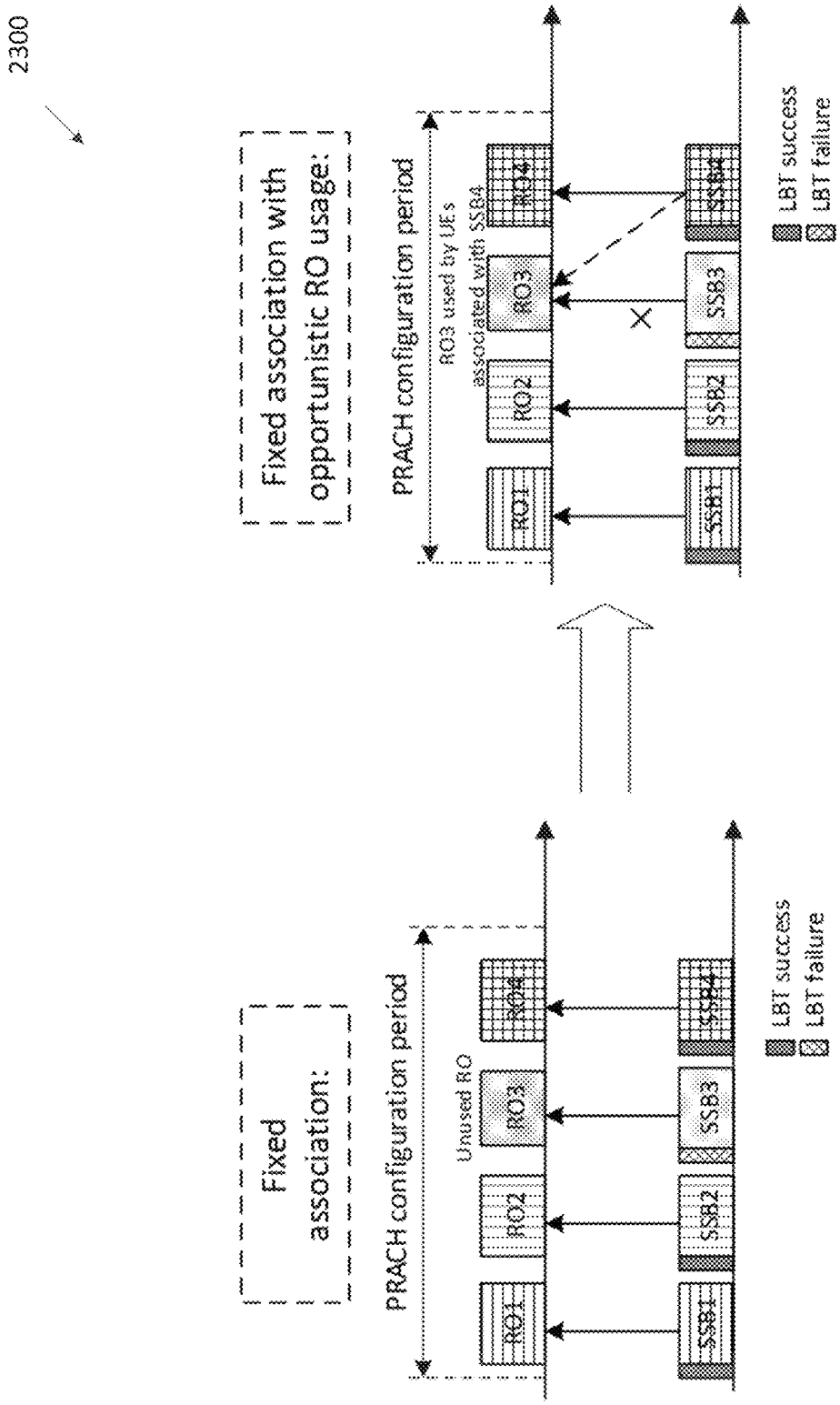
FIG. 23 illustrates an example fixed association with opportunistic RO utilization according to embodiments of the present disclosure.

FIG. 23 illustrates an example fixed association with opportunistic RO utilization 2300 according to embodiments of the present disclosure. The embodiment of the fixed association with opportunistic RO utilization 2300 illustrated in FIG. 23 is for illustration only. FIG. 23 does not limit the scope of this disclosure to any particular implementation.

An example of this fixed association with opportunistic RO utilization is illustrated in FIG. 23, wherein among 4 SSBs that are intended to be transmitted, LBT for SSB 3 fails. With opportunistic RO usage, the UEs associated with SSB4 can be opportunistically accessing the ROs associated with SSB3.

Fixed association SSBs and ROs has the issue that since SSBs are not guaranteed to always to be transmitted subject to LBT, thus either ROs associated with those failed SSBs may not utilized causing resource waste; or NR-U has to dynamically adjust the association of SSBs and ROs based on the transmission status of SSBs, which may also incur some system overhead.

An alternative approach to fixed association of SSBs and ROs as in NR is to have a non-fixed or a flexible association of SSBs and ROs, which means the ROs associated with SSB may not be deterministically as in NR. Therefore, in one embodiment, in addition to supporting the one-to-one, one-to-many, and many-to-one association between SSBs and ROs as NR; NR-U can support a flexible association (e.g., many-to-many association), wherein ROs mapped to a group of SSBs can be shared by the UEs associated with these group of SSBs.

In one sub-embodiment, for this flexible association between SSBs and ROs, the SSBs that are intended to be transmitted can be divided into N groups; and the ROs associated with the SSBs within the n-th group ($1<=n<=N$) can be determined by first determining the RO occasion(s) associated with each SSB within the n-th SSB group, and then the union of the RO occasion(s) associated with each SSB within the n-th SSB group can be shared by the UEs associated with the SSBs within the n-th SSB group. In one example, the RO occasion(s) associated with each SSB within the n-th SSB group can be determined by following same approach as in NR (e.g., determined through higher layer parameter SSB-perRACH-occasion), or with the potential enhancements to NR-U PRACH detailed in previous components.

In another sub-embodiment, for this flexible association, the ROs associated with the group of SSBs can be determined jointly. For example, for the n-th SSB group, the ROs associated with this SSB group can be determined based on a parameter that gives the number of ROs associated with a SSB group, e.g., SSB_group-perRACH-occasion, wherein SSB_group-perRACH-occasion=m/n means each SSB_group is mapped to m/n ROs.

In another sub-embodiment, the support of this flexible association and the number of SSBs per SSB group between SSBs and ROs can be indicated by one of the PBCH, MIB, remaining system information (i.e., SIB1), other system information (i.e., SIBs other than SIB1), or other higher layer information. For example, a parameter to indicate number of SSBs within a SSB group can be included, which has a default value of 1, and other supported values such as a subset from {1, 2, 4, 8, 12, 16, 20, 24, 28, 32, 36, 40, 44, 48, 52, 56, 60, 64}.

In another sub-embodiment, the SSBs within a same group of SSB can be allocated according to one of: SSBs within the same group can have consecutively increasing the SSB index; or the SSBs within the same SSB group can have consecutively increasing beam direction corresponding to the spatial TX filter for SSB; or SSBs within the same SSB group can be with the same spatial TX filter; or the SSBs within the same group can be quasi-co-located (QCL'ed). In addition, there can exist a configurable maximum number of SSBs within each SSB group.

In another sub-embodiment, all or part of the ROs associated with the group of SSBs can be shared by the UEs associated with the SSBs within this group; in addition, the UE can randomly choose one or multiple of the ROs, among all the available ROs associated with the group of SSBs.

In another sub-embodiment, in order to differentiate UEs that are associated with different SSBs from the same SSB group but sharing the same RO, UEs that are associated with different SSBs from the same SSB group can be assigned orthogonal PRACH preambles. In one example, if there are M PRACH preambles available at the gNB, and each SSB group has P SSBs within the group, the M available preambles can be equally distributed to UEs associated with each of the SSBs within the group. In this way, the gNB can differentiate the desired SSB from the UE through not only the UE's RO location, but also the UE's preamble index.

In another sub-embodiment, since the SSBs within a group of SSB may use different spatial TX filter, the spatial RX filter that a gNB uses in receiving the PRACH from the shared ROs can be chosen to correspond to the beam direction that can cover the beam directions corresponding to the spatial TX filters within this SSB group. In one example, the spatial RX filter of the gNB can be correspond to an omni-directional receive beam or quasi-omni-directional receive beam, which covers all the beam directions that correspond to the spatial TX filters within this SSB group.

Figure 24:
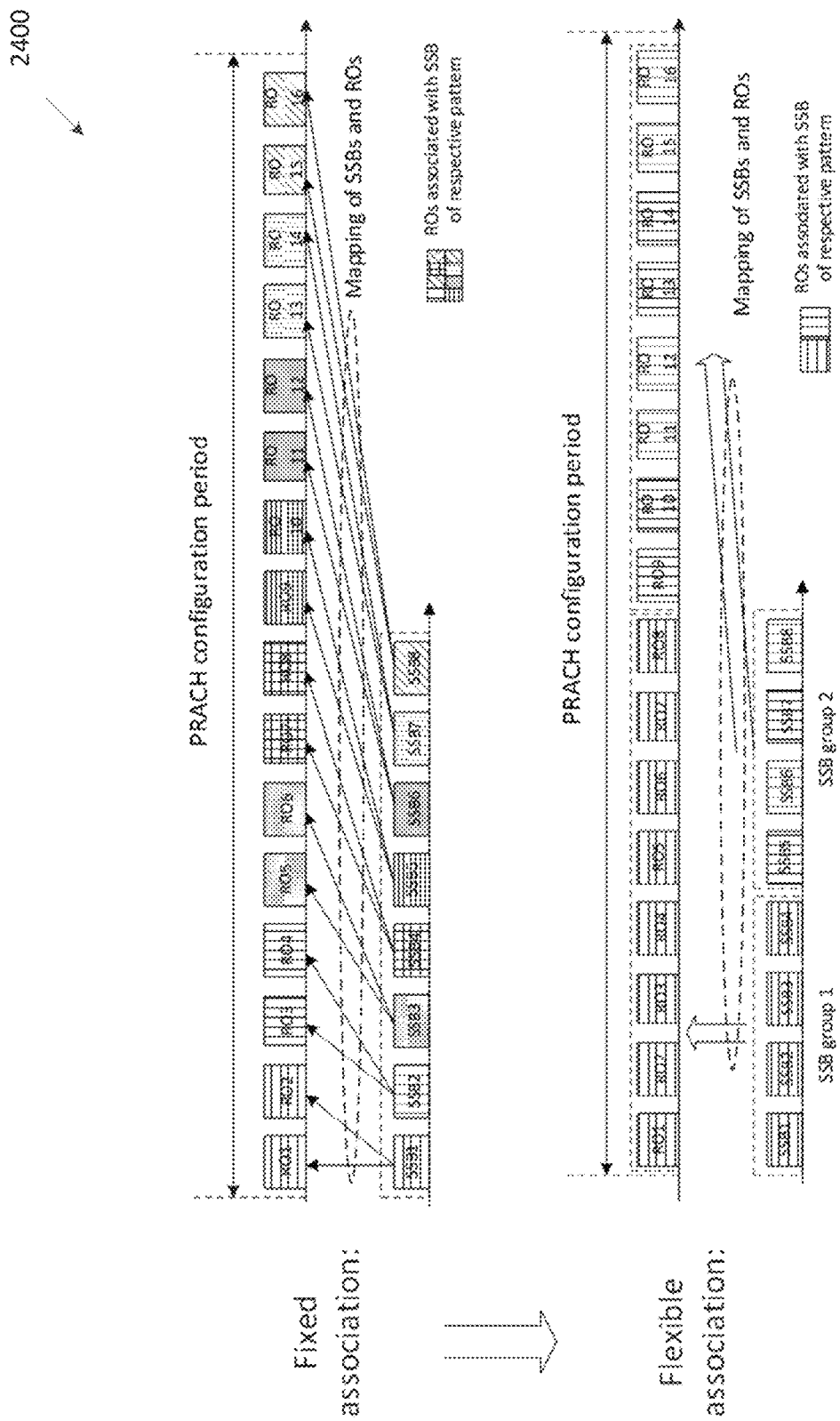
FIG. 24 illustrates an example flexible association according to embodiments of the present disclosure.

FIG. 24 illustrates an example flexible association 2400 according to embodiments of the present disclosure. The embodiment of the flexible association 2400 illustrated in FIG. 24 is for illustration only. FIG. 24 does not limit the scope of this disclosure to any particular implementation.

With this flexible association, the likelihood for RO being un-occupied can be significantly reduced, unless all the SSBs within the SSB group are not transmitted. An example of this flexible association is illustrated in FIG. 24, wherein the number of SSBs intended to be transmitted is 8, with each SSB group having 4 SSBs and the UEs associated with this SSB group can share 8 ROs; in addition, the UEs can randomly choose 4 out of the 8 ROs for PRACH transmission; in addition, the UEs associated with each SSB within the SSB group may have 16 available PRACH preambles with each SSB group has a total of 64 PRACH preambles.

Component 6: Enhancements to Remaining Procedures of Random Access.

For Msg1, in addition to the enhancements detailed in Component 1 to Component 5, another enhancement is that Msg1 can be used as the reference for contention window size (CWS) adaptation for the CAT-4 LBT of SS/PBCH block(s).

In one embodiment, if CAT-4 LBT is used to grant transmissions of K ($K>=1$) consecutive SS/PBCH blocks, the CWS adaptation for the CAT-4 LBT for the SS/PBCH blocks can be based on the transmission status of the RACH occasions associated with the K SS/PBCH blocks, wherein the RACH occasions can be allocated according to the enhancements detailed in Component 1 to Component 5.

In one sub-embodiment, within the current SSB to RO association period wherein the K SS/PBCH blocks are transmitted after CAT-4 LBT, each SS/PBCH block can be considered as transmitted without collision if there exists PRACH preamble transmission(s) in the RO(s) that are associated with this SS/PBCH block, which means the PRACH preamble that is utilized and/or the time and frequency position of the RO where the PRACH preamble is transmitted is associated with this SS/PBCH block. Otherwise, if none of the ROs associated with the SS/PBCH block has PRACH transmissions, this SS/PBCH block can be considered as subject to collision.

In another sub-embodiment, within the current SSB to RO association period wherein the K SS/PBCH blocks are transmitted after CAT-4 LBT, each SS/PBCH block can be considered as transmitted without collision if among all the ROs that are associated with this SS/PBCH block, the fraction of ROs wherein PRACH transmissions occurred is larger than a certain threshold $0<\tau<=1$; otherwise, this SS/PBCH block can be considered as subject to collision.

In another sub-embodiment, among the K ($K>=1$) consecutive SS/PBCH blocks that are transmitted after a successful CAT-4 LBT, this CAT-4 LBT can be considered successful if none of the SS/PBCH block is subject to collision.

In another sub-embodiment, among the K ($K>=1$) consecutive SS/PBCH blocks that are transmitted after a successful CAT-4 LBT, this CAT-4 LBT can be considered successful if the fraction of the SS/PBCH block that are subject to collision is larger than a certain threshold $0<\eta<=1$.

In another sub-embodiment, among the K (K>=1) consecutive SS/PBCH blocks that are transmitted after a successful CAT-4 LBT, this CAT-4 LBT can be considered successful if among all the ROs that are associated with the K (K>=1) SS/PBCH block, the fraction of ROs wherein PRACH transmissions occurred is larger than a certain threshold $0<=\tau<=1$.

In another sub-embodiment, if the CAT-4 LBT is considered successful, the CWS for the CAT-4 LBT that correspond these K (K>=1) SS/PBCH blocks is re-set to minimum for future transmissions. Otherwise, the CWS is increased to the next available value until the maximum allowed CWS is reached.

Besides Msg1, the remaining procedures of the 4-step RA also need enhancement to increase the transmit opportunities and/or reduce potential RA delay due to the LBT requirement.

For RAR (Msg2), enhancements in terms of LBT category, RAR window size can be considered.

In one embodiment, LBT for a RAR can be a single-shot based LBT.

In one sub-embodiment, single-shot LBT for RAR can be applied subject to certain condition. For example, single-shot LBT for RAR can be used when CAT-4 LBT is used for Msg1, and that the RAR can share MCOT corresponding to the Msg1 subject to successful single-shot LBT. In one sub-example, if RAR can start within SIFS duration (e.g., 16 µs for FR1 NR-U) after Msg1, no-LBT can be used for RAR to be transmitted. In another sub-example, single-shot LBT for a RAR can be applied is the gap between expected start position of RAR and end of the Msg1 transmission is larger than SIFS duration but within the PIFS duration (e.g., 25 µs for FR1 NR-U); otherwise if the gap is larger than the PIFS duration, the CAT-4 LBT may be used in order to transmit Msg2.

In another sub-embodiment, multiple transmit opportunities for RAR can be configured by the gNB, and each RAR is subject to a single-shot LBT. In this case, depending on how Msg1 transmission is configured, the gNB can either transmit only one RAR (subject to LBT), or transmit multiple RARs (subject to LBT). In one example, this sub-embodiment can be applied when the transmit opportunities for RAR can be transmitted within the MCOT of Msg1.

In another sub-embodiment, single-shot LBT for RAR can be used when RAR transmission can share the MCOT from a UE-initiated MCOT by a CAT-4 LBT from UE, or existing gNB-initiated MCOT by a CAT-4 LBT from the gNB. Otherwise, if RAR falls outside any existing MCOT, a CAT-4 LBT can be used.

In another sub-embodiment, the gNB can transmit only one RAR subject to successful LBT. For example, the RAR can correspond to the first Msg1 that the gNB receives from a UE.

In another sub-embodiment, when the gNB receives multiple Msg1s from a UE, the gNB can transmit respective RAR messages (subject to LBT) in a sequential order relative to the received Msg1s. In one example, if the single-shot LBT for RAR is allowed only by sharing with an existing MCOT from the UE/gNB; then the multiple RAR messages that fall within the shared MCOT can be subject to single-shot LBT, while those are outside any shared MCOT can only be transmitted subject to a CAT-4 LBT.

In another embodiment, LBT for a RAR can be CAT-4 based LBT.

In one sub-embodiment, CAT-4 LBT for RAR can be applied subject to certain condition. For example, CAT-4 LBT for RAR can be used when the RAR is outside the MCOT corresponding to CAT-4 LBT of Msg1, or that Msg1 is transmitted subject to CAT-2 LBT.

In one sub-embodiment, RAR can be transmitted if the CAT-4 LBT for RAR is successfully completed within certain time duration. In one example, this time duration can be contained within the RAR window, during which the UE attempts to detect the RAR. In another example, the RAR can be not transmitted if the CAT-4 LBT for RAR is not completed by the end of the RAR window.

In another sub-embodiment, multiple transmit opportunities for RAR can be configured by the gNB, and each RAR is subject to a CAT-4 LBT. In one example, the CAT-4 LBT can use a higher priority class (e.g., highest priority class). In another example, this can be applied when multiple Msg1s are transmitted.

Figure 25:
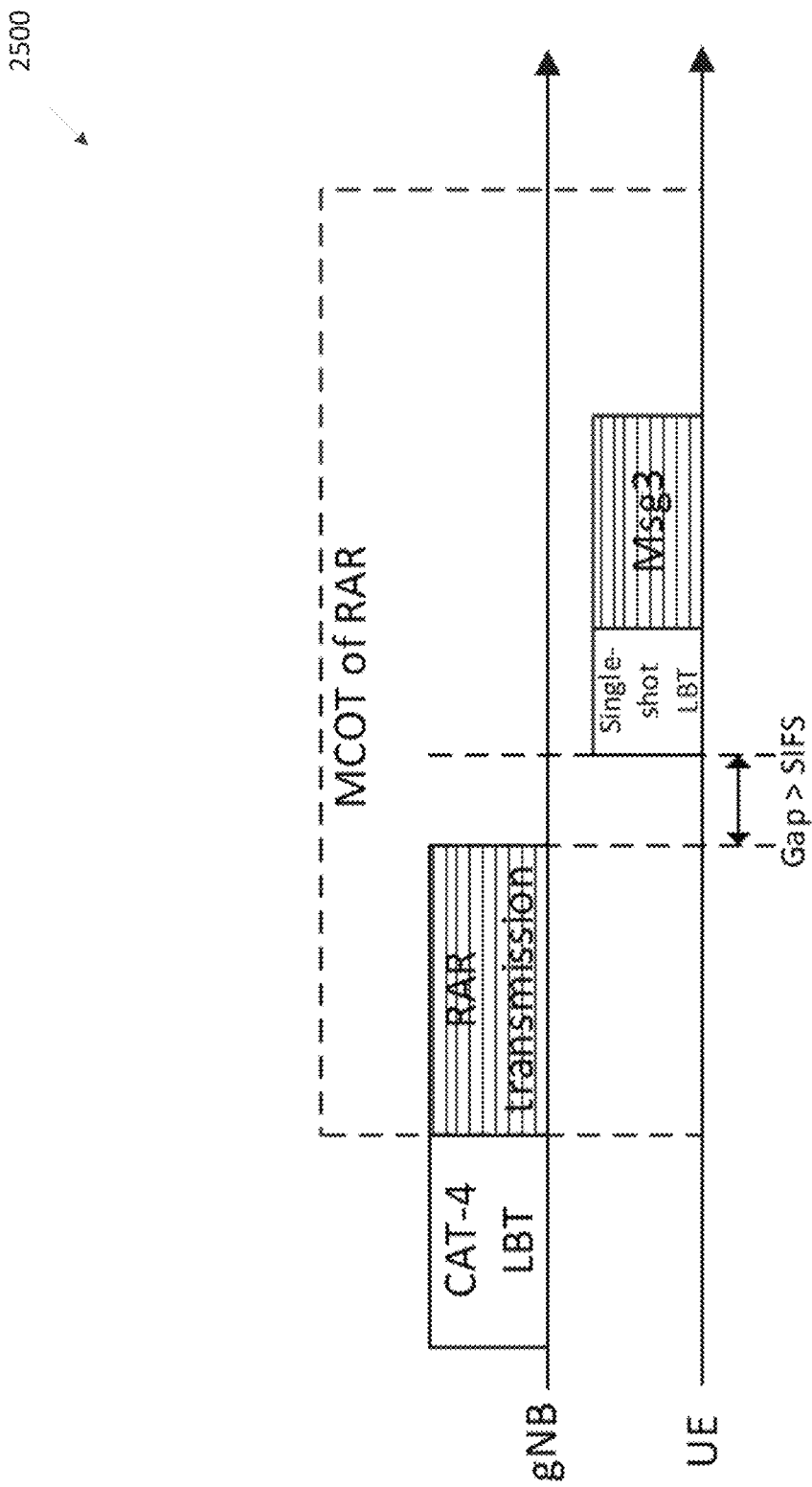
FIG. 25 illustrates an example LBT for an RAR according to embodiments of the present disclosure.

FIG. 25 illustrates an example LBT for an RAR 2500 according to embodiments of the present disclosure. The embodiment of the LBT for an RAR 2500 illustrated in FIG. 25 is for illustration only. FIG. 25 does not limit the scope of this disclosure to any particular implementation.

In another sub-embodiment, if the CAT-4 based LBT of RAR is successful, the Msg3 can share the MCOT of the RAR, and can be transmitted subject to one single-shot LBT (e.g., if the gap between Msg3 and RAR is greater than SIFS), or no LBT at all (e.g., if the gap between Msg3 and RAR is smaller than SIFS). FIG. 25 illustrates an example of this sub-embodiment.

In another sub-embodiment, the CWS adaptation for Msg2 can be based on the reception of Msg3. For example, if Msg3 that corresponds to this RAR is received, the Msg2 transmission is considered as successful and CWS for Msg2 LBT can reset to minimum. In another example, if Msg3 that corresponds to this RAR is not received (e.g., after certain duration following Msg2 transmission), this Msg2 transmission can be considered as subject to collision and CWS can be increased to the next available value.

In another sub-embodiment, the CWS adaptation for Msg2 can be based on the reception of HARQ-ACK that UE responds upon successful completion of the random access process. For example, if HARQ-ACK that corresponds to this RAR is received, the Msg2 transmission is considered as successful and CWS for Msg2 LBT can reset to minimum. In another example, if HARQ-ACK that corresponds to this RAR is not received (e.g., after certain duration following Msg2 transmission), this Msg2 transmission can be considered as subject to collision and CWS can be increased to the next available value. In another example, this can be applied to both 4-step random access as well as the 2-step random access procedure.

In another embodiment, multiple RAR transmission occasions can be configured, and the LBT type for each RAR occasion can depend on the timing position of the RAR occasion and/or the configuration of Msg1.

In one example of the embodiment, when CAT-4 LBT is used for Msg1, the LBT for a RAR occasion can be single-shot LBT if the RAR occasion is within the MCOT corresponding to the CAT-4 LBT of Msg1. In one sub-example, single-shot LBT attempt can always be allowed as long as the RAR occasion can be transmitted within the MCOT of Msg1 subject to a successful single-shot LBT. In another sub-example, single-shot LBT attempt can be allowed if the gap between start of RAR and end of Msg1 transmission is larger than the SIFS duration but shorter than the PIFS duration. In another sub-example, if a single-shot LBT attempts fails for one RAR occasion, the next single-shot LBT attempt can start at one of immediately following the previous single-shot LBT attempt, at the start of next OFDM symbol/min-slot/slot boundary, or at the end of the next OFDM symbol/min-slot/slot boundary.

In another example of this embodiment, if the RAR occasion is outside the MCOT of the Msg1 when Msg1 is transmitted subject to CAT-4 LBT, the LBT for a RAR occasion can be CAT-4 LBT. In one sub-example, this example can be applied when the RAR occasion is outside the MCOT of Msg1 but within the RAR window corresponding to the Msg1; otherwise the RAR occasion may not be utilized for transmission.

In another example of this embodiment, if the Msg1 is transmitted subject to CAT-2 LBT, the LBT for a RAR occasion can be CAT-4 LBT.

In another example of this embodiment, this embodiment can be applied to both scenarios when at most an Msg2 can be transmitted, and when multiple Msg2s can be transmitted.

Figure 26:
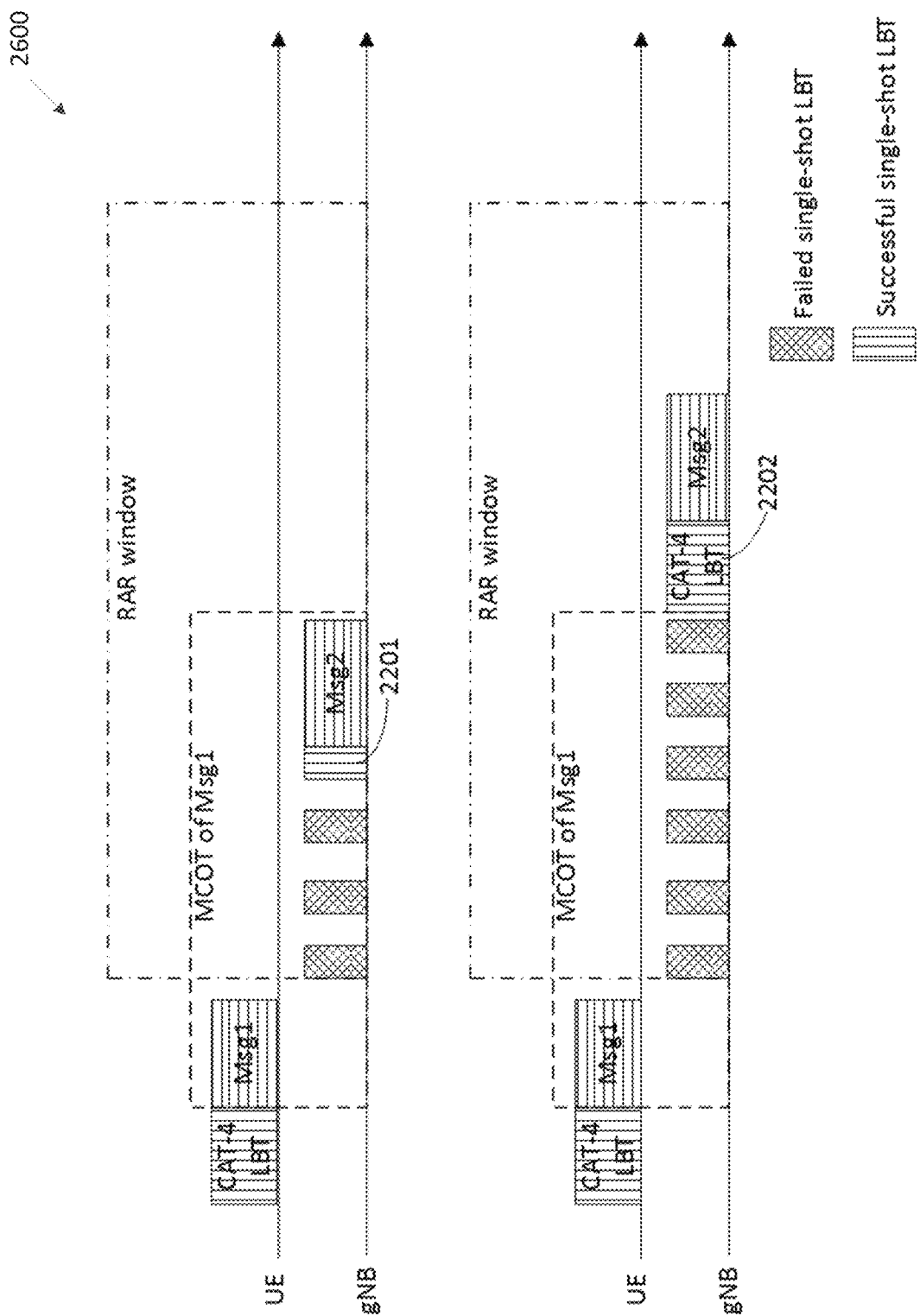
FIG. 26 illustrates an example RAR message transmission according to embodiments of the present disclosure.

FIG. 26 illustrates an example RAR message transmission 2600 according to embodiments of the present disclosure. The embodiment of the RAR message transmission 2600 illustrated in FIG. 26 is for illustration only. FIG. 26 does not limit the scope of this disclosure to any particular implementation.

FIG. 26 provides an instance of this embodiment for illustration purpose, wherein at most one RAR message can be transmitted, and if the Msg1 is transmitted subject to a CAT-4 LBT, the gNB can transmit a RAR within the MCOT of Msg1 subject to a successful CAT-2 LBT (2201); and if all the single-shot LBT attempts within the MCOT of Msg1 have all failed, the gNB can start a CAT-4 LBT process to attempt to transmit the RAR within the RAR window, and the RAR can be transmitted if the CAT-4 LBT is completed within the RAR window (2202).

In another embodiment, for both LBT scenarios, the RAR window can be increased from NR to have a more relaxed timing in order for the UE to detect the RAR. Specifically, the RAR window length for NR is min(10 ms, 1/2/4/8/10/20/40/80 slots with SCS of Type-0 PDCCH), which can be further increased for NR-U.

In one sub-embodiment, the maximum supported RAR window length in number of slots can be increased to be greater than 80 slots, such as $80 \times 2^u$ with u>0. For example, the supported number of slots for RAR window can be 1/2/4/8/10/20/40/80/160/320 slots. In another example, u can be either an integer or a fractional number.

In another sub-embodiment, the maximum supported RAR window length in millisecond can be increased to be greater than 10 ms, such as $10 \times 2^u$ with u>0. In one example, this value can be 20 ms, 40 ms or 80 ms. In another example, u can be either an integer or a fractional number.

In yet another embodiment, sub-band LBT can be performed in order to transmit the RAR, wherein a separate LBT process can be performed in parallel and each LBT process is performed over a sub-band. In one sub-embodiment, the sub-band can be performed in unit of nominal bandwidth for NR-U, which for example is 20 MHz for FR1 NR-U, and 50/100/200/400 MHz for FR2 NR-U.

For Msg3, enhancements in terms of waveform, LBT category can be considered.

In one embodiment, the Msg3 waveform for NR-U can follow that as in NR.

In one sub-embodiment, NR-U can utilize the frequency hopping of Msg3, which is already supported by NR, such that the OCB regulation can be met by the UE in transmitting Msg3 across multiple hops. In one example, denote by NO, the number of PRBs in UL BWP for Msg3 (e.g., initial active UL BWP), then the frequency offset for second hop of Msg3 can be chosen as: $N_{BWP}^{size}/2$.

In another sub-embodiment, NR-U can exploit the regulation to allow OCB to be temporarily less than 80% of nominal BW in unlicensed band, such that Msg3 waveform from NR can be used, irrespective of whether or not frequency hopping is used by Msg3.

In another sub-embodiment, the RAR grant content carried in RAR does not need any modification from NR to support this option.

In another embodiment, Msg3 can be transmitted using the B-IFDM based waveform, such that interlace-based structure is utilized in transmitting Msg3.

In one sub-embodiment, the interlace structure for Msg3 PUSCH for either FR1 NR-U or FR2 GHz NR-U can be following one of the interlace structures defined in Component 3.

In another sub-embodiment, frequency hopping does not need to be utilized, or turned off by default if this option is used. In this case, the one bit for "the frequency hopping flag" field, and the first one or two bits of "Msg3 PUSCH frequency resource allocation" field (depending on if the number of PRBs in UL BWP for Msg3 is smaller than 50 or not) in the RAR grant content, can be reserved for usage of other purpose.

In another sub-embodiment, the structure of B-IFDM based waveform can be either indicated in RAR grant from Msg2, or indicated by higher layer parameter such as through SIB1 or SIBS other than SIB1 from the RRC layer.

In another embodiment, LBT for Msg3 can be a single-shot LBT.

In one sub-embodiment, Msg3 can use the single-shot LBT if RAR is subject to CAT-4 LBT and Msg3 is within the MCOT of RAR.

In another sub-embodiment, Msg3 can use the single-shot LBT if RAR is subject to CAT-4 LBT, and Msg3 is within the MCOT of RAR, and the gap between end of RAR and expected start of Msg3 is larger than SIFS and shorter than PIFS duration.

Figure 27:
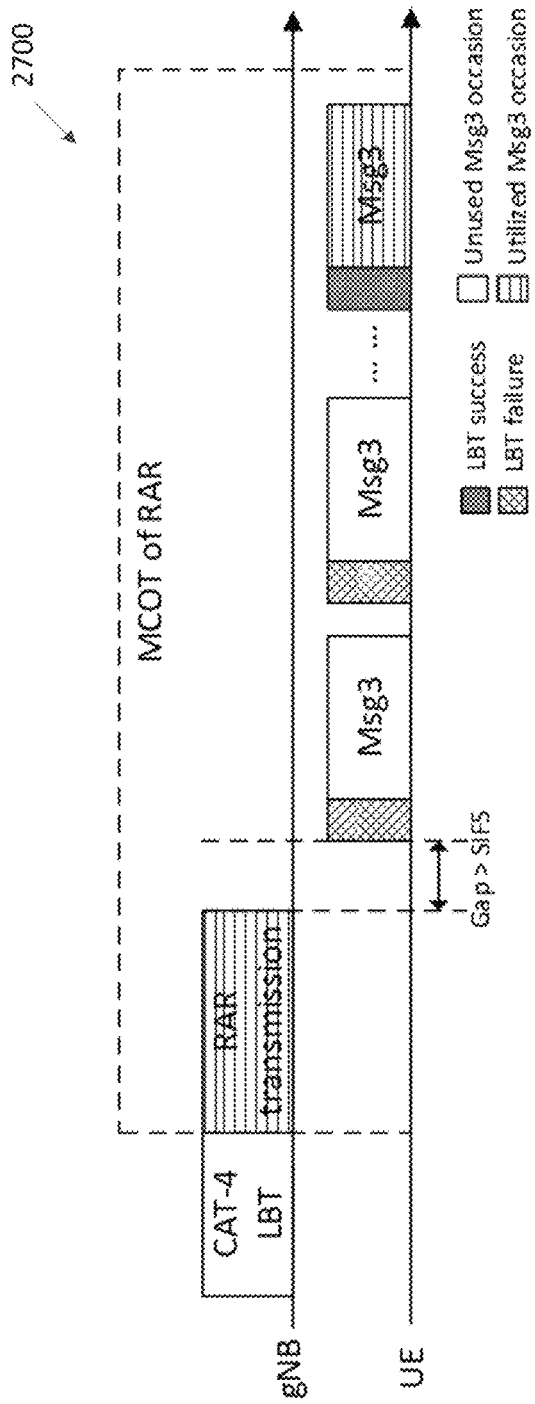
FIG. 27 illustrates an example Msg3 transmission according to embodiments of the present disclosure.

FIG. 27 illustrates an example Msg3 transmission 2700 according to embodiments of the present disclosure. The embodiment of the Msg3 transmission 2700 illustrated in FIG. 27 is for illustration only. FIG. 27 does not limit the scope of this disclosure to any particular implementation.

In another sub-embodiment, multiple Msg3 occasions can be configured, wherein each Msg3 can be subject to a single-shot LBT, and the first Msg3 that succeeds in the single-shot LBT can be utilized. FIG. 27 illustrates an example of this option.

In another embodiment, LBT for Msg3 can be a CAT-4 LBT.

In one sub-embodiment, the CAT-4 LBT for Msg3 can choose higher priority class in order to reduce Msg3 transmission delay, e.g., CAT-4 LBT priority class 1 or 2.

In one sub-embodiment, this can be utilized to the scenarios that Msg3 is outside the MCOT of RAR if RAR is subject to CAT-4 LBT; or if the RAR is subject to single-shot LBT.

In another sub-embodiment, the CWS adaptation for Msg3 can be based on the reception of Msg4. For example, if correct Msg4 that corresponds to this Msg3 is received, the Msg3 transmission is considered as successful and CWS for Msg3 LBT can reset to minimum. In another example, if the correct Msg4 that corresponds to this Msg3 is not received (e.g., after certain duration following Msg3 transmission), this Msg3 transmission can be considered as subject to collision and CWS can be increased to the next available value.

Figure 28:
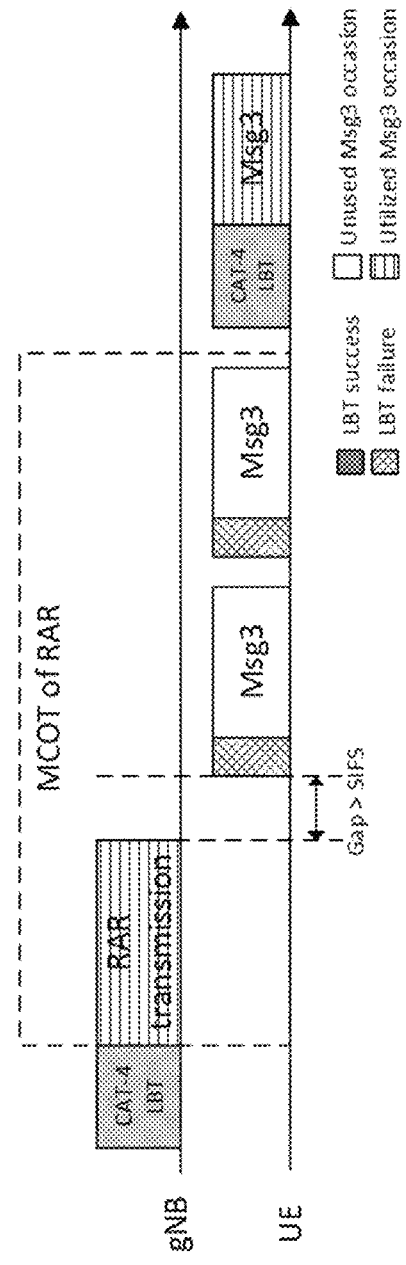
FIG. 28 illustrates another example Msg3 transmission according to embodiments of the present disclosure.

FIG. 28 illustrates another example Msg3 transmission 2800 according to embodiments of the present disclosure. The embodiment of the Msg3 transmission 2800 illustrated in FIG. 28 is for illustration only. FIG. 28 does not limit the scope of this disclosure to any particular implementation.

In another embodiment, one or multiple Msg3 occasions can be configured, such that the Msg3 occasions within the MCOT obtained by RAR can be subject to single-shot LBT, and the earliest Msg3 occasion that succeed in LBT can be utilized; otherwise if all Msg3 occasions within RAR MCOT fails, CAT-4 LBT can be performed outside RAR MCOT by UE to transmit Msg3. FIG. 28 illustrates an example of this option.

In another embodiment, the RAR grant content in Msg2 needs to be enhanced from NR to indicate the necessary enhancements for NR-U Msg3.

In one sub-embodiment, RAR grant can indicate the frequency allocation of Msg3 when B-IFDM waveform is used. For example, additional bit(s) can be used to indicate the usage of B-IFDM waveform or not (the 1 bit for "frequency hopping flag" from NR can replaced to indicate usage of B-IFDM waveform), and the existing bits in "Msg3 PUSCH frequency resource allocation" field can be used to indicate the interlace structure.

In another sub-embodiment, RAR grant can indicate the LBT type of Msg3. In one example, 1 bit can be used to indicate one-shot LBT or CAT-4 LBT. In another example, 2 bits can be used to indicate one-shot LBT or CAT-4 LBT with potentially different priority class. In another example, when multiple Msg3 occasions are configured, additional bits can be used to indicate how to configure multiple Msg3 occasions (e.g., 2 bits for allowing 1, 2, 4, 8 Msg3 occasions).

In another sub-embodiment, the additional contents of RAR grant to reflect NR-U Msg3 enhancements can be indicated through re-defining certain RAR grant field or use reserved bits from NR, or by introducing additional bits to RAR grant from NR.

For Msg4, enhancements regarding the LBT procedure can be considered.

In one embodiment, Msg4 can be transmitted subject to a CAT-4 LBT.

In one sub-embodiment, the CAT-4 LBT for Msg4 can follow higher LBT priority class.

In another sub-embodiment, with CAT-4 LBT for Msg4, the UE can respond the corresponding HARQ-ACK to Msg4 subject to single-shot LBT, if the UE is within the MCOT of Msg4. In addition, there can be multiple occasions within the MCOT of Msg4 wherein the UE can transmit HARQ-ACK subject to a single shot LBT.

In another sub-embodiment, if a UE is outside the MCOT of Msg4 or if single-shot LBT for UE HARQ-ACK fails during MCOT of Msg4, the UE can use CAT-4 LBT to respond HARQ-ACK corresponding to Msg4.

In another sub-embodiment, with CAT-4 LBT for Msg4, the UE can respond the corresponding HARQ-ACK to Msg4 subject to single-shot LBT, if the UE is within the MCOT of Msg4. In addition, there can be multiple occasions within the MCOT of Msg4 wherein the UE can transmit HARQ-ACK subject to a single shot LBT.

In one sub-embodiment, the CWS adaptation for Msg4 can be based on the reception of HARQ-ACK. For example, if HARQ-ACK that corresponds to this Msg4 is received, the Msg4 transmission is considered as successful and CWS for Msg4 LBT can reset to minimum. In another example, if HARQ-ACK that corresponds to this Msg4 is not received (e.g., after certain duration following Msg4 transmission), this Msg4 transmission ca be considered as subject to collision and CWS can be increased to the next available value.

In another embodiment, Msg4 can follow single-shot LBT.

In one sub-embodiment, Msg4 can use the single-shot LBT if Msg3 is subject to CAT-4 LBT and Msg4 is within the MCOT of Msg3.

In another sub-embodiment, Msg4 can use the single-shot LBT if Msg3 is subject to CAT-4 LBT, and Msg4 is within the MCOT of Msg3, and the gap between end of Msg3 and expected start of Msg4 is larger than SIFS and shorter than PIFS duration.

In another sub-embodiment, gNB can configure multiple occasions to attempt the single-shot LBT for Msg4, and the first Msg4 occasion that succeeds in LBT can be utilized to transmit Msg4.

In another sub-embodiment, the UE may need to perform at least a single-shot LBT or CAT-4 LBT (e.g., with higher priority class) to respond the HARQ-ACK.

In another embodiment, the COT corresponding to Msg4 can follow a self-contained COT structure, and HARQ-ACK corresponding to Msg4 can be replied using a no LBT option by the UE. This can be applied to either when Msg4 is using a CAT-4 LBT, or when Msg4 is using single-shot LBT.

Another random access procedure that potentially needs enhancement is regarding the power ramping procedure for PRACH re-transmissions, due to the unlicensed regulations such as LBT and power-spectral density (PSD) limit.

In one embodiment, the power ramping behavior from NR can be the baseline for NR-U.

In another embodiment, increment the preamble power ramping counter can depend on the LBT result for Msg1.

In one sub-embodiment, if UE fails LBT in current RACH occasion to transmit the PRACH, the preamble power ramping counter can remain unchanged when a UE re-attempts next PRACH transmission.

In another sub-embodiment, if a UE fails LBT in current RACH occasion to transmit the PRACH, the preamble power ramping counter can be incremented to the next available value with certain probability p (0<=p<1) when the UE re-attempts next PRACH transmission.

In another sub-embodiment, if a UE fails to transmit the PRACH in multiple associated ROs after K (K>=1) consecutive LBT attempts, the UE can increase the preamble power ramping counter to the next available value. In one example, the multiple associated ROs can be the ROs that UE is associated with within a SSB to RO association period.

In another sub-embodiment, for CAT-4 LBT, LBT failure can mean the LBT procedure is not completed within certain duration.

In another sub-embodiment, the preamble transmission counter remains unchanged if LBT fails for Msg1.

In another embodiment, if a UE passes LBT for Msg1 (s) and transmitted PRACH preamble(s) in associated RO(s), the preamble power ramping counter and/or preamble transmission counter can depend on the LBT result for Msg2.

In one sub-embodiment, if the LBT enhancement(s) for Msg2 in this component is used, and/or a UE monitors for a long RAR window, then the UE can increment the preamble transmission counter if RAR(s) that correspond to the UE transmitted PRACH preamble(s) is not received within the RAR window(s).

In another sub-embodiment, if the LBT enhancement(s) for Msg2 in this component is used, and/or a UE monitors for a long RAR window, then the UE can increment the preamble transmission counter with certain probability p ($0<=p<1$), if RAR(s) that correspond to the UE transmitted PRACH preamble(s) is not received within the RAR window(s).

In another sub-embodiment, if the LBT enhancement(s) for Msg2 in this component is used, and/or a UE monitors for a long RAR window, the preamble power ramping can be incremented to the next available value if RAR(s) that correspond to the UE transmitted PRACH preamble(s) is not received within the RAR window(s).

In another sub-embodiment, if the LBT enhancement(s) for Msg2 in this component is used, and/or a UE monitors for a long RAR window, the preamble power ramping can be incremented to the next available value with certain probability p ($0<=p<1$), if RAR(s) that correspond to the UE transmitted PRACH preamble(s) is not received within the RAR window(s).

In another embodiment, the PRACH transmission may not exceed the effective isotropic radiated power (E.I.R.P.) limit and mean E.I.R.P. limit of the operating unlicensed band for NR-U, and that the power ramping counter may be suspended by a UE if the EIRP or EIRP density limit cannot be met by PRACH transmissions in RO.

In one sub-embodiment, given the potential LBT failure for Msg1 and Msg2, the Msg1 can be transmitted using the maximum EIRP or EIRP density limit, i.e., min(EIRP limit, EIPR limit*PRACH bandwidth), wherein PRACH bandwidth for interlaced-waveform can be the frequency range of the PRACH interlace.

Figure 29:
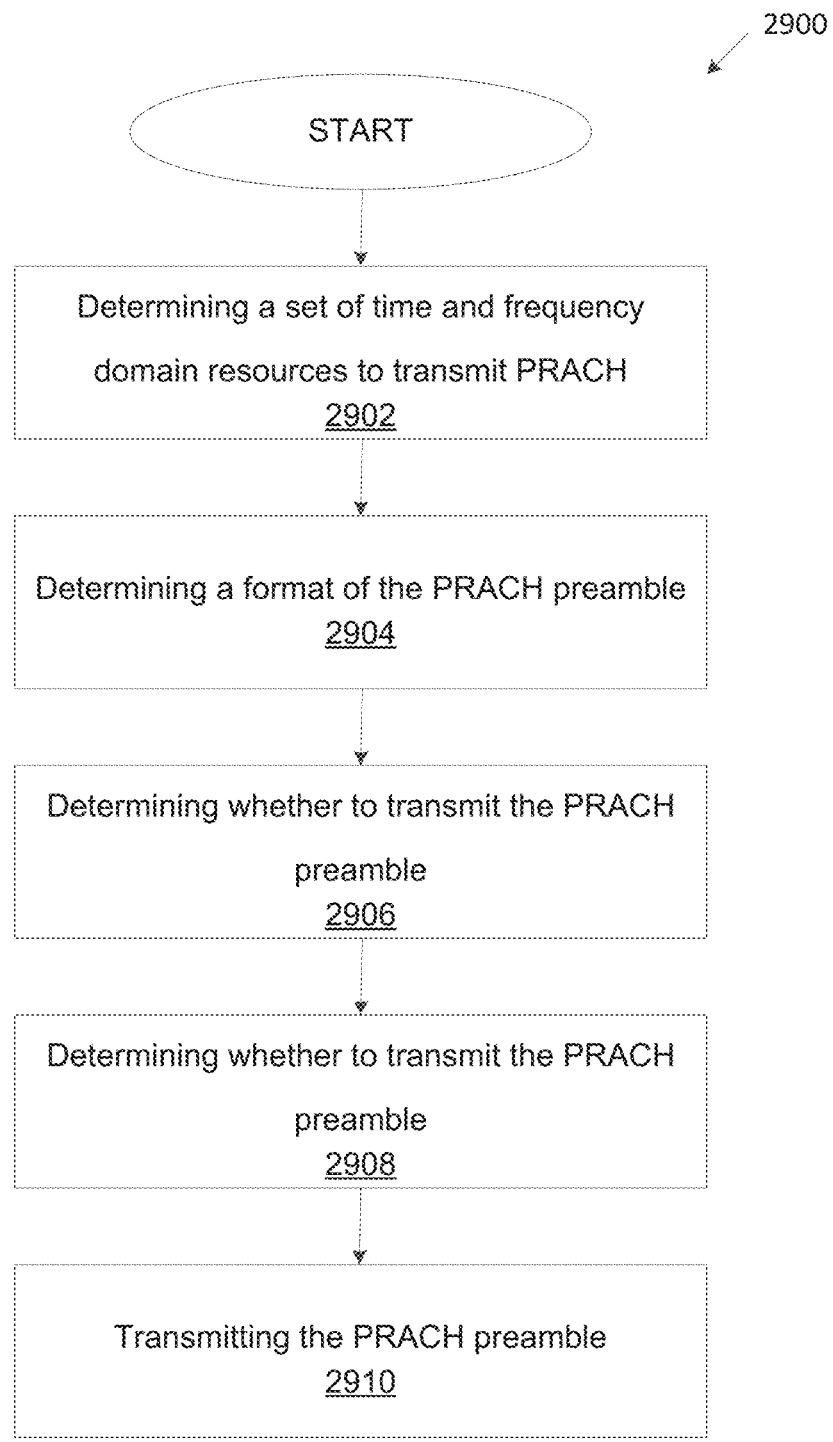
FIG. 29 illustrates a flow chart of a method for NR random access according to embodiments of the present disclosure.

FIG. 29 illustrates a flow chart of a method for NR random access 2900, as may be formed by a user equipment (UE) (e.g., 111-116 as shown in FIG. 1) according to embodiments of the present disclosure. The embodiment of the method for NR random access 2900 illustrated in FIG. 29 is for illustration only. FIG. 29 does not limit the scope of this disclosure to any particular implementation.

As illustrated in FIG. 29, the method 2900 begins at step 2902. In step 2902, a UE determines a set of time and frequency domain resources to transmit a physical random access channel (PRACH) preamble over a PRACH.

In step 2904, the UE determines a format of the PRACH preamble, wherein the PRACH preamble includes one or more repeated preambles based on a sequence and a cyclic prefix (CP) preceding repeated preamble sequences for the one or more repeated preambles.

In step 2906, the UE determines a set of time and frequency domain resources to perform a listen-before-talk (LBT) operation in an unlicensed spectrum.

In one embodiment, the LBT operation comprises a configurable sensing duration and an adaptable CWS, and the adaptable CWS is increased to a next available CWS value based on one of a random access response (RAR) message in response to the PRACH preamble is not received within a RAR monitoring window or a contention resolution message indicating that the PRACH preamble is not detected.

In such embodiment, a frequency domain granularity for the LBT operation is determined by one of an initial active UL bandwidth part (BWP), an active UL BWP in which the UE transmits the PRACH preamble, a nominal channel bandwidth of the unlicensed spectrum, or an entire UL system bandwidth.

In one embodiment, a set of time and frequency domain resources to transmit the PRACH preamble comprise at least one RACH occasion (RO), a configuration of time domain positions of the at least one RO is determined by at least one of neighboring ROs that are non-consecutive, with a gap duration between two neighboring ROs for an LBT time domain overhead, the gap duration being determined based on the LBT operation or ROs allocated to the UE are confined within a RACH occasion window (ROW), the ROW being one of an integer number of PRACH slots, an integer number of symbols, or a fixed duration.

In one embodiment, the time domain positions of the ROs within the ROW determined by one of earliest RO among pre-allocated ROs locations within the ROW upon successful LBT operation, a start instance at an earliest symbol after LBT operation is completed within the ROW or a start instance at an earliest symbol within a given subset of symbols within the ROW upon successful LBT operation.

In one embodiment, a configuration of the frequency domain resources for ROs indicates one of consecutively allocated resources in a frequency domain without gaps between two neighboring ROs, a number of RO groups wherein ROs within a same RO group are consecutively allocated without frequency gaps and ROs across different RO groups, or non-consecutively allocated resources in the frequency domain.

In one embodiment, a number of neighboring ROs in the frequency domain is determined by at least one of subset from {1, 2, 4, 8} or at least one number other than {1, 2, 4, 8}.

In such embodiment, a waveform of the PRACH preamble comprises one of a continuous waveform with an integer number of repetitions of a PRACH preamble sequence in a frequency domain, ROs are determined from synchronization signals and physical broadcast channel (SS/PBCH) blocks based on a mapping rule, and each SS/PBCH block is mapped to ROs in a unit of one or more than one consecutive time-domain ROs.

In such embodiment, the SS/PBCH blocks are divided into one or more SS/PBCH block groups, the SS/PBCH blocks within a same SS/PBCH block group include an incremental SS/PBCH block index, or a same spatial TX parameter within the SS/PBCH group or are quasi-co-located (QCL'ed), and the UE is associated with the ROs associated with the SS/PBCH block group that includes the UE selected SS/PBCH block.

In one embodiment, after transmitting the PRACH preamble, an RAR message is received within an RAR window based on a configurable number of NR-U slots, a maximum number of NR-U slots is larger than 80 NR-U slots with a maximum allowed duration, Message 3 (Msg3) of a random access procedure is transmitted when an RAR message is detected within an RAR window that corresponds to the PRACH preamble, and Msg3 occasions configured in an UL grant from the RAR message and the LBT operation for the Msg3 occasions comprise one of an LBT process with fixed sensing duration when the Msg3 shares a channel occupancy time of the RAR message, or an LBT process with configurable sensing duration and an adaptable CWS when the Msg3 does not share the channel occupancy time of the RAR message.

In step 2908, the UE determines whether to transmit the PRACH preamble associated with the LBT operation in the unlicensed spectrum.

In step 2910, the UR transmits, to a base station (BS), the PRACH preamble in the unlicensed spectrum based on a result of the determination of the LBT operation to transmit PRACH preamble.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication network, the UE comprising:
    a processor configured to:
        determine a set of time and frequency domain resources to transmit a physical random access channel (PRACH) preamble over a PRACH;
        determine a format of the PRACH preamble, wherein the PRACH preamble includes one or more repeated preambles based on a sequence and a cyclic prefix (CP) preceding repeated preamble sequences for the one or more repeated preambles;
        determine a set of time and frequency domain resources to perform a listen-before-talk (LBT) operation in an unlicensed spectrum; and
        determine whether to transmit the PRACH preamble associated with the LBT operation in the unlicensed spectrum; and
    a transceiver operably connected to the processor, the transceiver configured to:
        transmit, to a base station (BS), the PRACH preamble in the unlicensed spectrum based on a result of the determination of the LBT operation to transmit the PRACH preamble;
        after transmitting the PRACH preamble, receive a random access response (RAR) message corresponding to the PRACH preamble within an RAR window based on a configurable number of NR-U slots, wherein a maximum number of NR-U slots is larger than 80 NR-U slots with a maximum allowed duration; and
        transmit a Message 3 (Msg3) of a random access procedure when the RAR message is received within the RAR window corresponding to the PRACH preamble, wherein Msg3 occasions configured in an uplink (UL) grant from the RAR message and the LBT operation for the Msg3 occasions comprise one of:
            an LBT process with fixed sensing duration when the Msg3 shares a channel occupancy time of the RAR message, or
            an LBT process with configurable sensing duration and an adaptable contention window size (CWS) when the Msg3 does not share the channel occupancy time of the RAR message.

2. The UE of claim 1, wherein:
    the LBT operation comprises a configurable sensing duration and an adaptable CWS, and the adaptable CWS is increased to a next available CWS value based on one of:
        the RAR message in response to the PRACH preamble is not received within a RAR monitoring window; or
        a contention resolution message indicating that the PRACH preamble is not detected.

3. The UE of claim 2, wherein a frequency domain granularity for the LBT operation is determined by one of:
    an initial active UL bandwidth part (BWP);
    an active UL BWP in which the UE transmits the PRACH preamble;
    a nominal channel bandwidth of the unlicensed spectrum; or
    an entire UL system bandwidth.

4. The UE of claim 1, wherein:
    the set of time and frequency domain resources to transmit the PRACH preamble comprise at least one RACH occasion (RO);
    a configuration of time domain positions of the at least one RO is determined by at least one of:
        neighboring ROs that are non-consecutive, with a gap duration between two neighboring ROs for an LBT time domain overhead, the gap duration being determined based on the LBT operation; or
        ROs allocated to the UE are confined within a RACH occasion window (ROW), the ROW being one of an integer number of PRACH slots, an integer number of symbols, or a fixed duration; and
    a set of time domain positions of the ROs within the ROW determined by one of:
        earliest RO among pre-allocated ROs locations within the ROW upon successful LBT operation;
        a start instance at an earliest symbol after LBT operation is completed within the ROW; or
        a start instance at an earliest symbol within a given subset of symbols within the ROW upon successful LBT operation.

5. The UE of claim 1, wherein:
    a configuration of the frequency domain resources for ROs indicates one of:
        consecutively allocated resources in a frequency domain without gaps between two neighboring ROs;
        a number of RO groups wherein ROs within a same RO group are consecutively allocated without frequency gaps and ROs across different RO groups; or
        non-consecutively allocated resources in the frequency domain; and
    a number of neighboring ROs in the frequency domain is determined by at least one of subset from $\{1, 2, 4, 8\}$ or at least one number other than $\{1, 2, 4, 8\}$.

6. The UE of claim 1, wherein:
    a waveform of the PRACH preamble comprises one of a continuous waveform with an integer number of repetitions of a PRACH preamble sequence in a frequency domain;
    the processor is further configured to determine ROs from synchronization signals and physical broadcast channel (SS/PBCH) blocks based on a mapping rule; and
    each SS/PBCH block is mapped to ROs in a unit of one or more than one consecutive time-domain ROs.

7. The UE of claim 6, wherein:
    the SS/PBCH blocks are divided into one or more SS/PBCH block groups;
    the SS/PBCH blocks within a same SS/PBCH block group include an incremental SS/PBCH block index, or a same spatial TX parameter within the SS/PBCH group or are quasi-co-located (QCL'ed); and
    UE is associated with the ROs associated with the SS/PBCH block group that includes a UE selected SS/PBCH block.

8. A base station (BS) in a wireless communication network, the BS comprising:
a transceiver configured to:
receive, from a user equipment (UE), a physical random access channel (PRACH) preamble in an unlicensed spectrum based on a listen-before-talk (LBT) operation, wherein:
a set of time and frequency domain resources is determined, by the UE, for the PRACH preamble over a PRACH,
a format of the PRACH preamble that is determined by the UE includes one or more repeated preambles based on a sequence and a cyclic prefix (CP) preceding repeated preamble sequences for the one or more repeated preambles, and
a set of time and frequency domain resources is determined, by the UE, to perform the LBT operation in the unlicensed spectrum;
after receiving the PRACH preamble, transmit a random access response (RAR) message corresponding to the PRACH preamble within an RAR window based on a configurable number of NR-U slots, wherein a maximum number of NR-U slots is larger than 80 NR-U slots with a maximum allowed duration; and
receive a Message 3 (Msg3) of a random access procedure when the RAR message is transmitted within the RAR window corresponding to the PRACH preamble, wherein Msg3 occasions configured in an uplink (UL) grant from the RAR message and the LBT operation for the Msg3 occasions comprise one of:
an LBT process with fixed sensing duration when the Msg3 shares a channel occupancy time of the RAR message, or
an LBT process with configurable sensing duration and an adaptable contention window size (CWS) when the Msg3 does not share the channel occupancy time of the RAR message.

9. The BS of claim 8, wherein:
the set of time and frequency domain resources for the PRACH preamble comprise at least one RACH occasion (RO);
a configuration of time domain positions of the at least one RO is determined by at least one of:
neighboring ROs that are non-consecutive, with a gap duration between two neighboring ROs for an LBT time-domain overhead, the gap duration being determined based on the LBT operation; or
ROs allocated to the UE are confined within a RACH occasion window (ROW), the ROW being one of an integer number of PRACH slots, an integer number of symbols, or a fixed duration; and
the time domain positions of the ROs within the ROW is determined by one of:
earliest RO among pre-allocated ROs locations within the ROW upon successful LBT operation;
a start instance at an earliest symbol after LBT operation is completed within the ROW; or
a start instance at an earliest symbol within a given subset of symbols within the ROW upon successful LBT operation.

10. The BS of claim 8, wherein:
frequency domain resources for ROs are configured by at least one of:
consecutively allocated resources in a frequency domain without gaps between two neighboring ROs;
a number of RO groups wherein ROs within a same RO group are consecutively allocated without frequency gaps and ROs across different RO groups; or
non-consecutively allocated resources in the frequency domain, and
a number of neighboring ROs in the frequency domain is configured by at least one of subset from $\{1, 2, 4, 8\}$ or at least one number other than $\{1, 2, 4, 8\}$.

11. The BS of claim 8, wherein the LBT operation to transmit the RAR message comprises one of:
the LBT process with fixed sensing duration; or
the LBT process with configurable sensing duration and the adaptable CWS, and
wherein the adaptable CWS is increased to a next available CWS value based on one of:
the Msg3 a message 3 (Msg3) from the UE in response to the transmitted RAR is not received; or
a hybrid automatic repeat and request-acknowledgement (HARQ-ACK) message from the UE indicating the random access procedure is not successfully completed.

12. A method of a user equipment (UE) in a wireless communication network, the method comprising:
determining a set of time and frequency domain resources to transmit a physical random access channel (PRACH) preamble over a PRACH;
determining a format of the PRACH preamble, wherein the PRACH preamble includes one or more repeated preambles based on a sequence and a cyclic prefix (CP) preceding repeated preamble sequences for the one or more repeated preambles;
determining a set of time and frequency domain resources to perform a listen-before-talk (LBT) operation in an unlicensed spectrum;
determining whether to transmit the PRACH preamble associated with the LBT operation in the unlicensed spectrum;
transmitting, to a base station (BS), the PRACH preamble in the unlicensed spectrum based on a result of the determination of the LBT operation to transmit PRACH preamble,
after transmitting the PRACH preamble, receiving a random access response (RAR) message corresponding to the PRACH preamble within an RAR window based on a configurable number of NR-U slots, wherein a maximum number of NR-U slots is larger than 80 NR-U slots with a maximum allowed duration; and
transmitting a Message 3 (Msg3) of a random access procedure when the RAR message is received within the RAR window corresponding to the PRACH preamble, wherein Msg3 occasions configured in an uplink (UL) grant from the RAR message and the LBT operation for the Msg3 occasions comprise one of:
an LBT process with fixed sensing duration when the Msg3 shares a channel occupancy time of the RAR message, or
an LBT process with configurable sensing duration and an adaptable contention window size (CWS) when the Msg3 does not share the channel occupancy time of the RAR message.

13. The method of claim 12, wherein:
the LBT operation comprises a configurable sensing duration and an adaptable CWS, and
the adaptable CWS is increased to a next available CWS value based on one of:
the RAR message in response to the PRACH preamble is not received within a RAR monitoring window; or a contention resolution message indicating that the PRACH preamble is not detected.

14. The method of claim 13, wherein a frequency domain granularity for the LBT operation is determined by one of:
   an initial active UL bandwidth part (BWP);
   an active UL BWP in which the UE transmits the PRACH preamble;
   a nominal channel bandwidth of the unlicensed spectrum; or
   an entire UL system bandwidth.

15. The method of claim 12, wherein:
   the set of time and frequency domain resources to transmit the PRACH preamble comprise at least one RACH occasion (RO);
   a configuration of time domain positions of the at least one RO is determined by at least one of:
      neighboring ROs that are non-consecutive, with a gap duration between two neighboring ROs for an LBT time domain overhead, the gap duration being determined based on the LBT operation; or
      ROs allocated to the UE are confined within a RACH occasion window (ROW), the ROW being one of an integer number of PRACH slots, an integer number of symbols, or a fixed duration; and
   the time domain positions of the ROs within the ROW determined by one of:
      earliest RO among pre-allocated ROs locations within the ROW upon successful LBT operation;
      a start instance at an earliest symbol after LBT operation is completed within the ROW; or
      a start instance at an earliest symbol within a given subset of symbols within the ROW upon successful LBT operation.

16. The method of claim 12, wherein:
   a configuration of the frequency domain resources for ROs indicates one of:
      consecutively allocated resources in a frequency domain without gaps between two neighboring ROs;
      a number of RO groups wherein ROs within a same RO group are consecutively allocated without frequency gaps and ROs across different RO groups; or
      non-consecutively allocated resources in the frequency domain; and
   a number of neighboring ROs in the frequency domain is determined by at least one of subset from $\{1, 2, 4, 8\}$ or at least one number other than $\{1, 2, 4, 8\}$.

17. The method of claim 12, wherein:
   a waveform of the PRACH preamble comprises one of a continuous waveform with an integer number of repetitions of a PRACH preamble sequence in a frequency domain;
   ROs are determined from synchronization signals and physical broadcast channel (SS/PBCH) blocks based on a mapping rule; and
   each SS/PBCH block is mapped to ROs in a unit of one or more than one consecutive time-domain ROs.

18. The method of claim 17, wherein:
   the SS/PBCH blocks are divided into one or more SS/PBCH block groups;
   the SS/PBCH blocks within a same SS/PBCH block group include an incremental SS/PBCH block index, or a same spatial TX parameter within the SS/PBCH group or are quasi-co-located (QCL'ed); and
   the UE is associated with the ROs associated with the SS/PBCH block group that includes a UE selected SS/PBCH block.

* * * * *